(12) United States Patent
Kokubun

(10) Patent No.: US 12,063,438 B2
(45) Date of Patent: *Aug. 13, 2024

(54) IMAGING APPARATUS, CONTROL DEVICE, OPERATION METHOD OF IMAGING APPARATUS, AND PROGRAM

(71) Applicant: FUJIFILM Corporation, Tokyo (JP)

(72) Inventor: Hideaki Kokubun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 17/851,940

(22) Filed: Jun. 28, 2022

(65) Prior Publication Data

US 2022/0337757 A1      Oct. 20, 2022

Related U.S. Application Data

(63) Continuation of application No. PCT/JP2020/040813, filed on Oct. 30, 2020.

(30) Foreign Application Priority Data

Feb. 20, 2020  (JP) .................................. 2020-027211

(51) Int. Cl.
*H04N 23/67*     (2023.01)
*H04N 23/66*     (2023.01)

(52) U.S. Cl.
CPC .......... *H04N 23/675* (2023.01); *H04N 23/66* (2023.01)

(58) Field of Classification Search
CPC .............................. H04N 23/675; H04N 23/66
See application file for complete search history.

(56) References Cited

U.S. PATENT DOCUMENTS

2009/0148147 A1   6/2009  Fujii et al.
2018/0059360 A1   3/2018  Omata
(Continued)

FOREIGN PATENT DOCUMENTS

JP    2009-139795 A    6/2009
JP    2011-090048 A    5/2011
(Continued)

OTHER PUBLICATIONS

International Search Report issued in PCT/JP2020/040813; mailed Jan. 19, 2021.
(Continued)

*Primary Examiner* — Girumsew Wendmagegn
(74) *Attorney, Agent, or Firm* — Studebaker & Brackett PC

(57) ABSTRACT

An imaging apparatus includes a processor, and an image sensor, in which a focus lens is moved while avoiding a period of main exposure by the image sensor in accordance with an instruction of the processor and the main exposure is continuously performed to perform continuous imaging at a predetermined time interval, and a processor calculates a first focus position of the focus lens with respect to a specific subject in a specific frame in which the main exposure is performed in a continuous imaging period, predicts a second focus position of the focus lens with respect to the specific subject in a frame ahead of the specific frame by a plurality of frames with reference to the first focus position in the continuous imaging period, and moves the focus lens toward the second focus position.

26 Claims, 27 Drawing Sheets

(56) References Cited

U.S. PATENT DOCUMENTS

2018/0063416 A1    3/2018  Kimoto
2020/0195855 A1*   6/2020  Sakato .................. G03B 13/32

FOREIGN PATENT DOCUMENTS

| JP | 2016-218106 A | 12/2016 |
| JP | 2018-031877 A | 3/2018 |
| JP | 2018-037959 A | 3/2018 |
| JP | 2018-107547 A | 7/2018 |

OTHER PUBLICATIONS

International Preliminary Report on Patentability and Written Opinion issued in PCT/JP2020/040813; issued Aug. 23, 2022.

* cited by examiner

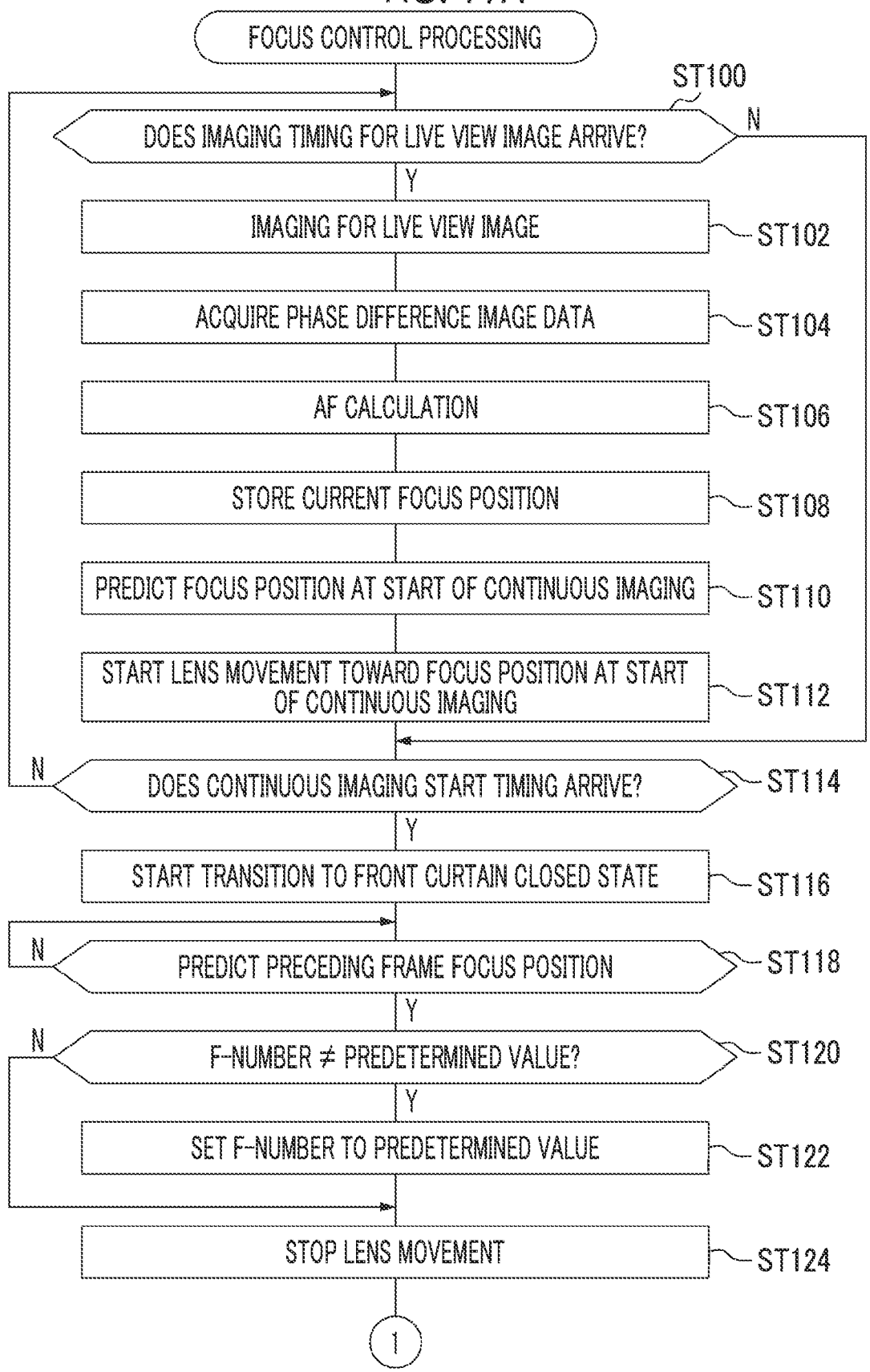

IMAGING APPARATUS, CONTROL DEVICE, OPERATION METHOD OF IMAGING APPARATUS, AND PROGRAM

CROSS-REFERENCE TO RELATED APPLICATIONS

This application is a Continuation of PCT International Application No. PCT/JP2020/040813 filed on Oct. 30, 2020, which claims priority under 35 U.S.C § 119(a) to Japanese Patent Application No. 2020-027211 filed on Feb. 20, 2020. Each of the above application(s) is hereby expressly incorporated by reference, in its entirety, into the present application.

BACKGROUND OF THE INVENTION

1. Field of the Invention

The technology of the present disclosure relates to an imaging apparatus, a control device, an operation method of an imaging apparatus, and a non-transitory computer recording medium storing a program.

2. Description of the Related Art

JP2016-218106A discloses an imaging apparatus capable of performing an automatic focusing operation following a movement of a specific subject. The imaging apparatus disclosed in JP2016-218106A comprises an imaging unit that continuously images the subject in a frame unit to generate a captured image, a display unit that displays the captured image generated by the imaging unit in real time, and a control unit that displays an AF frame indicating a region to be automatically focused by superimposing the AF frame on the captured image displayed in real time on the display unit, in which the control unit detects the movement of the specific subject from the captured image of a preceding frame, predicts a position of the specific subject in the captured image of a current frame based on the detected movement, and displays the AF frame in the captured image displayed on the display unit based on the predicted position.

JP2018-107547A discloses an imaging apparatus including an imaging optical system including an optical system that can adjust focus, an imaging element that arranges a plurality of first focus detection pixels that receive luminous flux passing through a first pupil portion region of the imaging optical system and a plurality of second focus detection pixels that receive luminous flux passing through a second pupil portion region of the imaging optical system different from the first pupil portion region, and photoelectrically converts an image formed by the imaging optical system, a subject region detection unit that detects a subject from an output signal of the imaging element and detects a first region, a second region, and a third region, which are focus detection regions, from the subject, a focus detection unit that detects the focus of the first region and the second region of the subject, a focus adjustment unit that adjusts the focus based on a focus detection result of the second region, a speed detection unit that detects a movement speed of the subject based on the focus detection results of the first, second, and third regions, a prediction unit that predicts a position of the subject based on the movement speed by the speed detection unit, and a focus detection region change unit that changes a focus detection region to the position of the subject predicted by the prediction unit.

SUMMARY OF THE INVENTION

One embodiment of the technology of the present disclosure provides an imaging apparatus, a control device, an operation method of an imaging apparatus, and a program which can make a focus position of a focus lens follow a specific subject without increasing a time interval of continuous imaging in a case in which continuous imaging is performed on the specific subject.

A first aspect according to the technology of the present disclosure relates to an imaging apparatus comprising a processor, and an image sensor in which light is imaged by an imaging lens including a focus lens, in which the focus lens is moved while avoiding a period of main exposure by the image sensor in accordance with an instruction of the processor and the main exposure is continuously performed by the image sensor at a predetermined time interval to perform continuous imaging, and the processor calculates a first focus position of the focus lens with respect to a specific subject in a specific frame in which the main exposure is performed in a continuous imaging period, predicts a second focus position of the focus lens with respect to the specific subject in a frame ahead of the specific frame by a plurality of frames with reference to the first focus position in the continuous imaging period, and moves the focus lens toward the second focus position.

A second aspect according to the technology of the present disclosure relates to the imaging apparatus according to the first aspect, in which the specific frame is each frame in which the main exposure is performed.

A third aspect according to the technology of the present disclosure relates to the imaging apparatus according to the first or second aspect, in which the processor predicts the second focus position in a frame ahead of the specific frame by two or more frames with reference to the first focus position.

A fourth aspect according to the technology of the present disclosure relates to the imaging apparatus according to the third aspect, in which the processor predicts the second focus position in a frame ahead of the specific frame by two frames with reference to the first focus position.

A fifth aspect according to the technology of the present disclosure relates to the imaging apparatus according to the third aspect, in which the processor predicts the second focus position in a frame ahead of the specific frame by three or more frames with reference to the first focus position.

A sixth aspect according to the technology of the present disclosure relates to the imaging apparatus according to any one of the third to fifth aspects, in which the processor predicts the second focus position for each frame in which the main exposure is performed.

A seventh aspect according to the technology of the present disclosure relates to the imaging apparatus according to any one of the first to sixth aspects, in which the processor moves the focus lens toward a predicted latest second focus position.

An eighth aspect according to the technology of the present disclosure relates to the imaging apparatus according to the first or second aspect, in which the processor increases the number of frames from the specific frame to a destination frame in which the second focus position is predicted, as a frame rate for the continuous imaging by the image sensor is increased.

A ninth aspect according to the technology of the present disclosure relates to the imaging apparatus according to any one of the first to eighth aspects, in which the processor predicts the second focus position with reference to the first focus position for a plurality of frames.

A tenth aspect according to the technology of the present disclosure relates to the imaging apparatus according to the ninth aspect, in which the processor predicts the second focus position with reference to a plurality of the first focus positions including the first focus position obtained by calculation in a latest frame in which a latest main exposure is performed and the first focus position obtained by calculation in a past frame temporally adjacent to the latest frame.

An eleventh aspect according to the technology of the present disclosure relates to the imaging apparatus according to any one of the first to tenth aspects, in which the processor causes the image sensor to perform imaging for a live view image in a continuous imaging interval.

A twelfth aspect according to the technology of the present disclosure relates to the imaging apparatus according to the eleventh aspect, in which the processor calculates the first focus position within an imaging period for the live view image based on image data obtained by imaging by the image sensor in the imaging period.

A thirteenth aspect according to the technology of the present disclosure relates to the imaging apparatus according to the twelfth aspect, in which the processor uses the imaging period to move the focus lens.

A fourteenth aspect according to the technology of the present disclosure relates to the imaging apparatus according to the thirteenth aspect, further comprising a stop with an aperture having a variable size, in which the processor controls the stop to set the aperture in the period in which the main exposure is performed to have a first size and to set the aperture in the imaging period to have a second size larger than the first size.

A fifteenth aspect according to the technology of the present disclosure relates to the imaging apparatus according to any one of the eleventh to fourteenth aspects, in which the processor causes the image sensor to perform the imaging for the live view image for a plurality of frames in the continuous imaging interval, and calculates the first focus position each time the image sensor is caused to perform the imaging for the live view image.

A sixteenth aspect according to the technology of the present disclosure relates to the imaging apparatus according to any one of the first to fifteenth aspects, in which the image sensor includes a phase difference pixel group, and the processor calculates the first focus position based on phase difference pixel data obtained by imaging with the phase difference pixel group.

A seventeenth aspect according to the technology of the present disclosure relates to the imaging apparatus according to any one of the first to sixteenth aspects, further comprising a mechanical shutter, in which the processor moves the focus lens while avoiding a winding period required for winding the mechanical shutter.

An eighteenth aspect according to the technology of the present disclosure relates to the imaging apparatus according to the seventeenth aspect, in which the processor transmits a command signal for instructing the imaging lens including the focus lens to move the focus lens, and the processor transmits the command signal to the imaging lens earlier than end of the winding by a communication time lag with the imaging lens.

A nineteenth aspect according to the technology of the present disclosure relates to the imaging apparatus according to any one of the first to eighteenth aspects, in which, in a case in which a start timing of the main exposure arrives before the focus lens reaches the second focus position, the processor stops the focus lens and causes the image sensor to start the main exposure.

A twentieth aspect according to the technology of the present disclosure relates to the imaging apparatus according to any one of the first to nineteenth aspects, in which the processor predicts a third focus position of the focus lens with respect to the specific subject in a first frame of the continuous imaging in a previous stage of start of the continuous imaging by the image sensor, and moves the focus lens toward the third focus position before the main exposure of the first frame is started.

A twenty-first aspect according to the technology of the present disclosure relates to the imaging apparatus according to the twentieth aspect, in which, in a case in which a start timing of the main exposure of the first frame arrives before the focus lens reaches the third focus position, the processor stops the focus lens and causes the image sensor to start the main exposure.

A twenty-second aspect according to the technology of the present disclosure relates to the imaging apparatus according to any one of the first to twenty-first aspects, in which the processor predicts a fourth focus position of the focus lens with respect to the specific subject in a second frame of the continuous imaging in a previous stage of start of the continuous imaging by the image sensor or while the main exposure of a first frame of the continuous imaging is performed, and moves the focus lens toward the fourth focus position before the main exposure of the second frame is started.

A twenty-third aspect according to the technology of the present disclosure relates to the imaging apparatus according to the twenty-second aspect, in which, in a case in which a start timing of the main exposure of the second frame arrives before the focus lens reaches the fourth focus position, the processor stops the focus lens and causes the image sensor to start the main exposure.

A twenty-fourth aspect according to the technology of the present disclosure relates to a control device comprising a processor, and a memory built in or connected to the processor, in which the control device is applied to an imaging apparatus in which a focus lens is moved while avoiding a period of main exposure by an image sensor in which light is imaged by an imaging lens including the focus lens in accordance with an instruction of the processor and the main exposure is continuously performed by the image sensor at a predetermined time interval to perform continuous imaging, and the processor calculates a first focus position of the focus lens with respect to a specific subject in a specific frame in which the main exposure is performed in a continuous imaging period, predicts a second focus position of the focus lens with respect to the specific subject in a frame ahead of the specific frame by a plurality of frames with reference to the first focus position in the continuous imaging period, and moves the focus lens toward the second focus position.

A twenty-fifth aspect according to the technology of the present disclosure relates to an operation method of an imaging apparatus including a processor, and an image sensor in which light is imaged by an imaging lens including a focus lens, in which the focus lens is moved while avoiding a period of main exposure by the image sensor in accordance with an instruction of the processor and the main exposure is continuously performed by the image sensor at a predetermined time interval to perform continuous imaging, the method comprising calculating a first focus position of the focus lens with respect to a specific subject in a specific frame in which the main exposure is performed in a continuous imaging period, predicting a second focus position of the focus lens with respect to the specific subject in a frame ahead of the specific frame by a plurality of frames with reference to the first focus position in the continuous imaging period, and moving the focus lens toward the second focus position.

A twenty-sixth aspect according to the technology of the present disclosure relates to a non-transitory computer recording medium storing a program causing a computer applied to an imaging apparatus including a processor, and an image sensor in which light is imaged by an imaging lens including a focus lens, in which the focus lens is moved while avoiding a period of main exposure by the image sensor in accordance with an instruction of the processor and the main exposure is continuously performed by the image sensor at a predetermined time interval to perform continuous imaging, the program causing the computer to perform a process comprising calculating a first focus position of the focus lens with respect to a specific subject in a specific frame in which the main exposure is performed in a continuous imaging period, predicting a second focus position of the focus lens with respect to the specific subject in a frame ahead of the specific frame by a plurality of frames with reference to the first focus position in the continuous imaging period, and moving the focus lens toward the second focus position.

BRIEF DESCRIPTION OF THE DRAWINGS

FIG. 19A is a flowchart showing an example of a flow of the focus control processing according to the embodiment.

DESCRIPTION OF THE PREFERRED EMBODIMENTS

In the following, an example of embodiments of an imaging apparatus and an operation method of an imaging apparatus according to the technology of the present disclosure will be described in accordance with the appended drawings.

First, the terms used in the following description will be described.

CPU refers to an abbreviation of "central processing unit". RAM refers to an abbreviation of "random access memory". IC refers to an abbreviation of "integrated circuit". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". SSD refers to an abbreviation of "solid state drive". USB refers to an abbreviation of "universal serial bus". HDD refers to an abbreviation of "hard disk drive". EEPROM refers to an abbreviation of "electrically erasable and programmable read only memory". EL refers to an abbreviation of "electro-luminescence". I/F refers to an abbreviation of "interface". UI refers to an abbreviation of "user interface". TOF refers to an abbreviation of "time of flight". fps refers to an abbreviation of "frame per second". MF refers to an abbreviation of "manual focus". AF refers to an abbreviation of "auto focus".

In the description of the present specification, "vertical" refers to the vertical in the sense of including an error generally allowed in the technical field to which the technology of the present disclosure belongs, in addition to the exact vertical. In the description of the present specification, "match" refers to the match in the sense of including an error generally allowed in the technical field to which the technology of the present disclosure belongs, in addition to the exact match.

Figure 1:
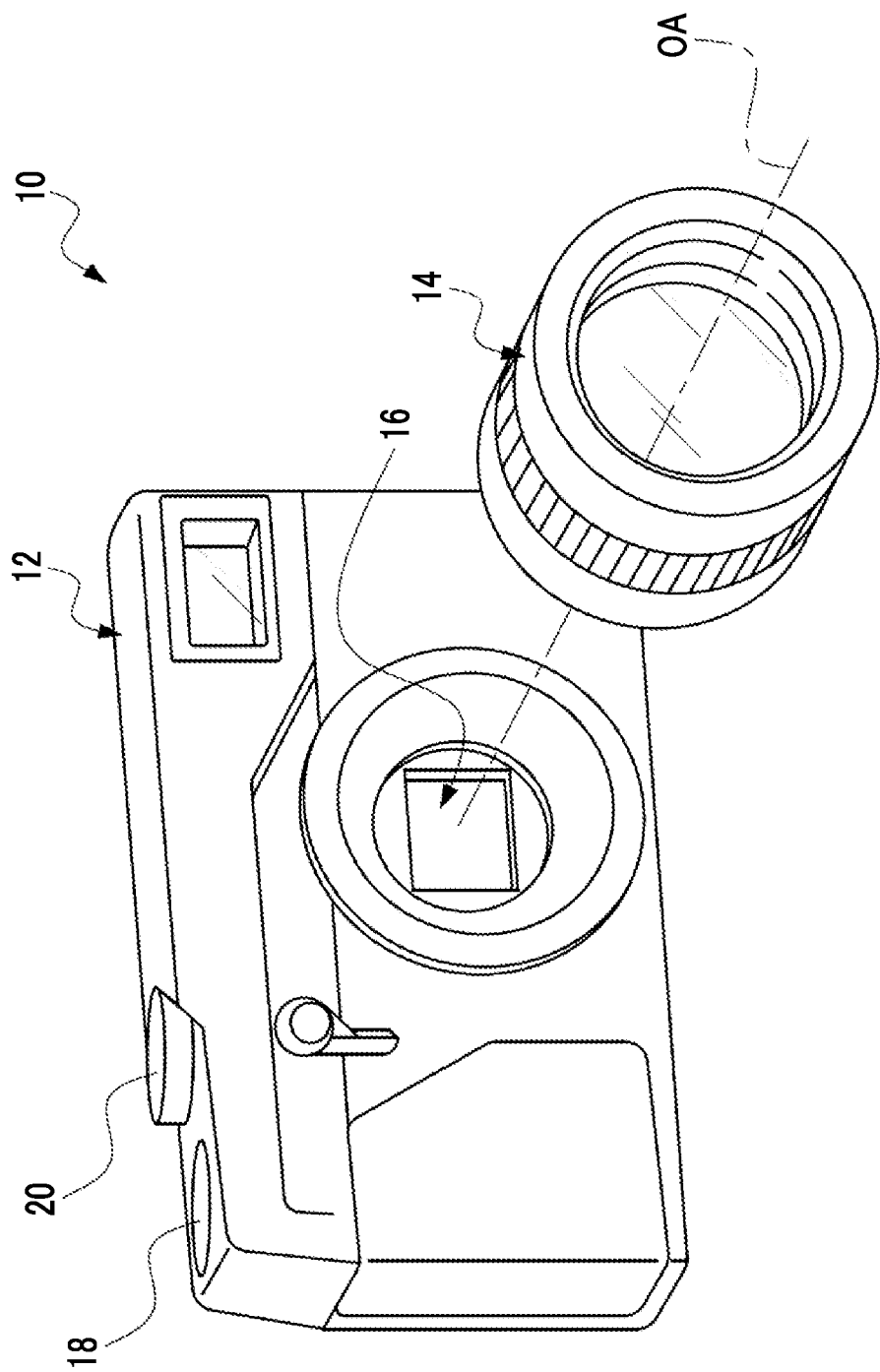
FIG. 1 is a perspective view showing an example of an appearance of an imaging apparatus according to an embodiment.

As an example, as shown in FIG. 1, an imaging apparatus 10 is a digital camera having an interchangeable lens and omitting a reflex mirror. The imaging apparatus 10 comprises an imaging apparatus body 12 and an interchangeable lens 14 that is interchangeably mounted on the imaging apparatus body 12. It should be noted that, here, as an example of the imaging apparatus 10, a digital camera having an interchangeable lens and omitting a reflex mirror is described, but the technology of the present disclosure is not limited to this. A digital camera having a stationary lens may be used, or a digital camera built in various electronic apparatuses, such as a smart device, a wearable terminal, a cell observation device, an ophthalmologic observation device, and a surgical microscope, may be used.

An image sensor 16 is provided in the imaging apparatus body 12. The image sensor 16 is a CMOS image sensor. In a case in which the interchangeable lens 14 is mounted on the imaging apparatus body 12, subject light indicating a subject is transmitted through the interchangeable lens 14 and imaged on the image sensor 16, so that image data indicating the image of the subject is generated by the image sensor 16.

It should be noted that, in the present embodiment, the CMOS image sensor is described as the image sensor 16, but the technology of the present disclosure is not limited to this. For example, the technology of the present disclosure is established even in a case in which the image sensor 16 is another type of image sensor, such as a CCD image sensor.

A release button 18 and a dial 20 are provided on an upper surface of the imaging apparatus body 12. The dial 20 is operated in a case of setting an operation mode of an imaging system, an operation mode of a playback system, and the like, and by operating the dial 20, the imaging apparatus 10 selectively sets an imaging mode and a playback mode as the operation modes.

The release button 18 functions as an imaging preparation instruction unit and an imaging instruction unit, and a push operation of two stages of an imaging preparation instruction state and an imaging instruction state can be detected. For example, the imaging preparation instruction state refers to a state in which the release button 18 is pushed to an intermediate position (half push position) from a standby position, and the imaging instruction state refers to a state in which the release button 18 is pushed to a final push position (full push position) beyond the intermediate position. It should be noted that, in the following, the "state in which the release button 18 is pushed to the half push position from the standby position" will be referred to as a "half push state", and the "state in which the release button 18 is pushed to the full push position from the standby position" will be referred to as a "full push state". Depending on the configuration of the imaging apparatus 10, the imaging preparation instruction state may be a state in which a finger of a user is in contact with the release button 18, and the imaging instruction state may be a state in which the finger of the user who performs operation proceeds from the state of being in contact with the release button 18 to a state of being separated from the release button 18.

The release button 18 is also operated in a case in which an instruction for continuous imaging is given to the imaging apparatus 10. The continuous imaging is imaging for continuous still pictures with main exposure by the image sensor 16. In a situation in which the imaging mode is set for the imaging apparatus 10, in a case in which the full push state of the release button 18 continues for a certain period of time (for example, 0.5 seconds) or longer, the continuous imaging is started. The continuous imaging is performed until the full push state is released. In the imaging apparatus 10, the continuous imaging is performed by continuously performing the main exposure at a predetermined time interval by the image sensor 16. Here, the predetermined time interval refers to a time interval for one frame determined by, for example, a frame rate for the continuous imaging of several fps (for example, 8 fps).

Figure 2:
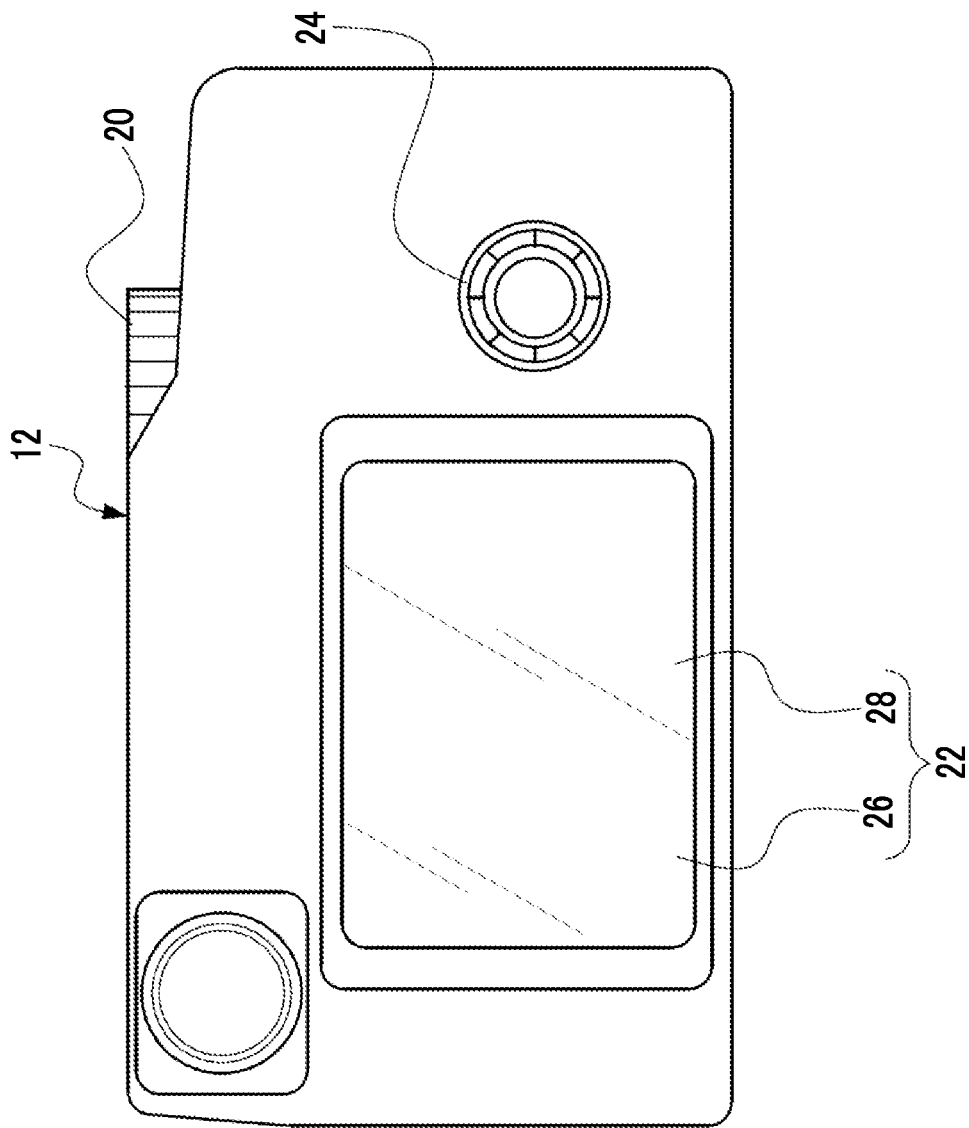
FIG. 2 is a rear view showing an example of the appearance of the imaging apparatus on a rear side shown in FIG. 1.

As an example, as shown in FIG. 2, a touch panel display 22 and an instruction key 24 are provided on a rear surface of the imaging apparatus body 12.

Figure 3:
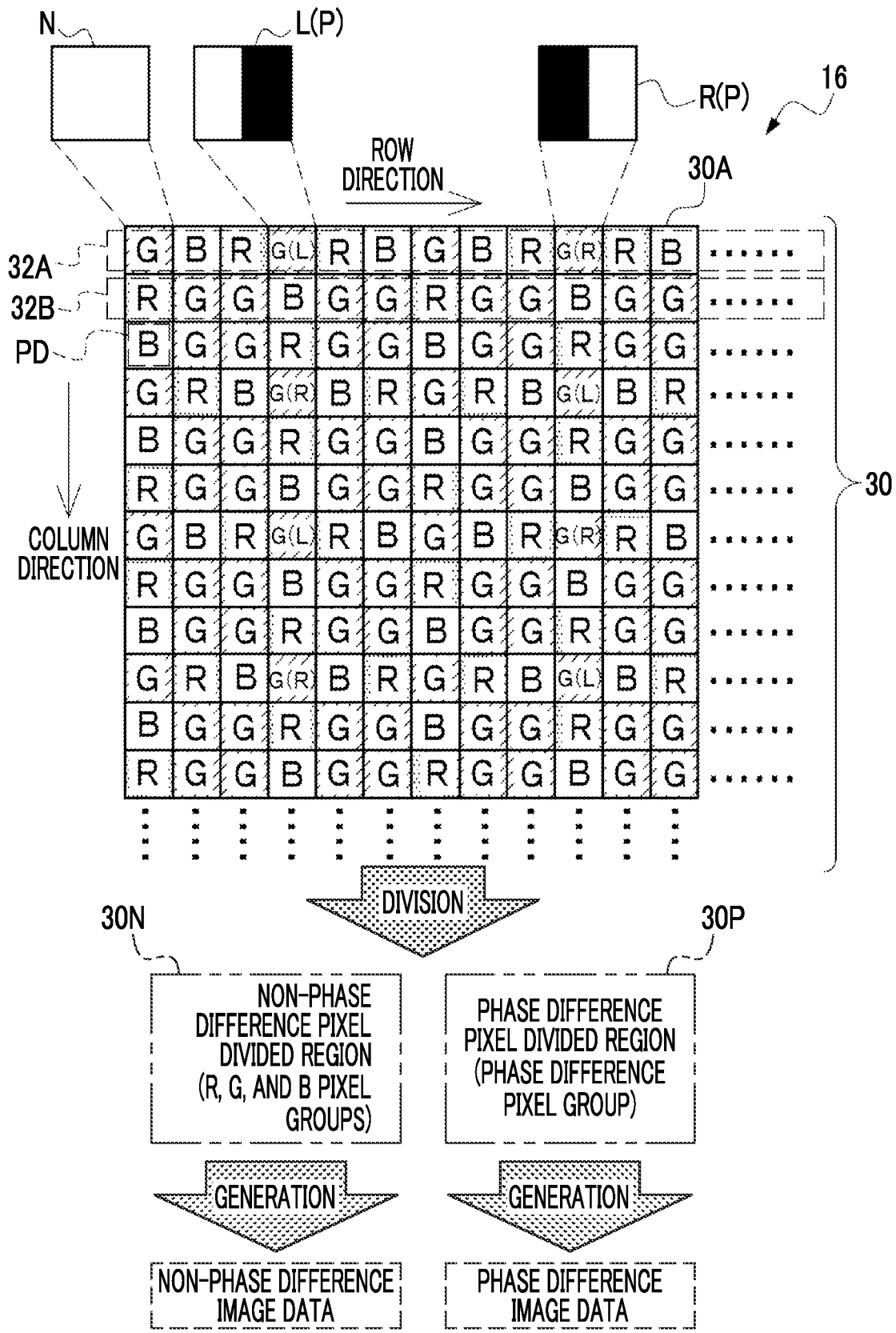
FIG. 3 is a schematic view showing an example of the arrangement of pixels included in a photoelectric conversion element of the imaging apparatus according to the embodiment.

The touch panel display 22 comprises a display 26 and a touch panel 28 (see FIG. 3). Examples of the display 26 include an organic EL display. The display 26 does not have to be the organic EL display, and other displays, such as a liquid crystal display, may be used.

The display 26 displays an image and/or text information. The display 26 is used for imaging for the live view image, that is, for displaying the live view image obtained by performing the continuous imaging in a case in which the imaging apparatus 10 is in the imaging mode. The imaging for the live view image (hereinafter, also referred to as "imaging for the live view image") is performed in accordance with, for example, a frame rate of 60 fps.

Here, the "live view image" refers to a motion picture for displaying based on the image data obtained by imaging performed by the image sensor 16. The live view image is also generally referred to as a live preview image. In addition, the display 26 is also used for displaying the still picture obtained by performing the imaging for the still picture in a case in which the imaging apparatus 10 is instructed to capture the still picture via the release button 18. Further, the display 26 is used for displaying a playback image and displaying a menu screen and the like in a case in which the imaging apparatus 10 is in the playback mode.

The touch panel 28 is a transmissive touch panel, and is superimposed on a surface of a display region of the display 26. The touch panel 28 receives an instruction from the user by detecting a contact of an indicator, such as a finger or a stylus pen. It should be noted that, in the present embodiment, the continuous imaging instruction to the imaging apparatus 10 is also performed via the touch panel 28. That is, the continuous imaging is started by the user remaining turning on a soft key for starting the imaging displayed on the display 26 via the touch panel 28. The continuous imaging is continued until the turned-on state of the soft key for starting the imaging via the touch panel 28 is released. It should be noted that, in the following, for convenience of description, the "full push state" described above includes a state in which the user turns on the soft key for starting the imaging via the touch panel 28.

It should be noted that, in the present embodiment, examples of the touch panel display 22 include an out-cell type touch panel display in which the touch panel 28 is superimposed on the surface of the display region of the display 26, but this is merely an example. For example, the on-cell type or in-cell type touch panel display can be applied as the touch panel display 22.

The instruction key 24 receives various instructions. Here, the "various instructions" refers to various instructions, for example, an instruction for displaying a menu screen on which various menus can be selected, an instruction for selecting one or a plurality of menus, an instruction for confirming a selected content, an instruction for deleting the selected content, zooming in, zooming out, and frame advance. In addition, these instructions may be given by the touch panel 28.

As an example, as shown in FIG. 3, the image sensor 16 comprises a photoelectric conversion element 30. The photoelectric conversion element 30 has a light-receiving surface 30A. The photoelectric conversion element 30 is disposed in the imaging apparatus body 12 (see FIG. 1) such that the center of the light-receiving surface 30A and an optical axis OA (see FIG. 1) match each other. The photoelectric conversion element 30 has a plurality of photosensitive pixels disposed in a matrix, and the light-receiving surface 30A is formed by the plurality of photosensitive pixels. The photosensitive pixel is a pixel having a photodiode PD, photoelectrically converts the received light, and outputs an electric signal in accordance with a light-receiving amount. The type of the photosensitive pixel included in the photoelectric conversion element 30 is two types of a phase difference pixel P and a non-phase difference pixel N which is a pixel different from the phase difference pixel P.

A color filter is disposed on the photodiode PD. The color filters include a green (G) filter corresponding to a G wavelength range which contributes most to obtaining a brightness signal, a red (R) filter corresponding to an R wavelength range, and a blue (B) filter corresponding to a B wavelength range.

Generally, the non-phase difference pixel N is also referred to as a normal pixel. The photoelectric conversion element 30 has three types of photosensitive pixels of R pixel, G pixel, and B pixel, as the non-phase difference pixel N. The R pixel, the G pixel, the B pixel, and the phase difference pixel P are regularly disposed with a predetermined periodicity in a row direction (for example, a horizontal direction in a state in which a bottom surface of the imaging apparatus body 12 is in contact with a horizontal surface) and a column direction (for example, a vertical direction which is a direction perpendicular to the horizontal direction). The R pixel is a pixel corresponding to the photodiode PD in which the R filter is disposed, the G pixel and the phase difference pixel P are pixels corresponding to the photodiode PD in which the G filter is disposed, and the B pixel is a pixel corresponding to the photodiode PD in which the B filter is disposed.

A plurality of phase difference pixel lines 32A and a plurality of non-phase difference pixel lines 32B are arranged on the light-receiving surface 30A. The phase difference pixel line 32A is a horizontal line including the phase difference pixels P. Specifically, the phase difference pixel line 32A is the horizontal line in which the phase difference pixels P and the non-phase difference pixels N are mixed. The non-phase difference pixel line 32B is a horizontal line including only a plurality of non-phase difference pixels N.

On the light-receiving surface 30A, the phase difference pixel lines 32A and the non-phase difference pixel lines 32B for a predetermined number of lines are alternately disposed along the column direction. For example, the "predetermined number of lines" used herein refers to two lines. It should be noted that, here, the predetermined number of lines is described as two lines, but the technology of the present disclosure is not limited to this, and the predetermined number of lines may be three or more lines, dozen lines, a few tens of lines, a few hundred lines, and the like.

The phase difference pixel lines 32A are arranged in the column direction by skipping two lines from the first row to the last row. A part of the pixels of the phase difference pixel lines 32A is the phase difference pixel P. Specifically, the phase difference pixel line 32A is a horizontal line in which the phase difference pixels P and the non-phase difference pixels N are periodically arranged. The phase difference pixels P are roughly divided into a first phase difference pixel L and a second phase difference pixel R. In the phase difference pixel lines 32A, the first phase difference pixels L and the second phase difference pixels R are alternately disposed at intervals of a few pixels in a line direction as the G pixels.

The first phase difference pixels L and the second phase difference pixels R are disposed to alternately be present in the column direction. In the example shown in FIG. 3, in the fourth column, the first phase difference pixel L, the second phase difference pixel R, the first phase difference pixel L, and the second phase difference pixel R are disposed in this order along the column direction from the first row. That is, the first phase difference pixels L and the second phase difference pixels R are alternately disposed along the column direction from the first row. In addition, in the example shown in FIG. 3, in the tenth column, the second phase difference pixel R, the first phase difference pixel L, the second phase difference pixel R, and the first phase difference pixel L are disposed in this order along the column direction from the first row. That is, the second phase difference pixels R and the first phase difference pixels L are alternately disposed along the column direction from the first row.

The photoelectric conversion element 30 is divided into two regions. That is, the photoelectric conversion element 30 includes a non-phase difference pixel divided region 30N and a phase difference pixel divided region 30P. The phase difference pixel divided region 30P is a phase difference pixel group composed of a plurality of phase difference pixels P, and receives the subject light to generate phase difference image data as the electric signal in accordance with the light-receiving amount. The phase difference image data is used, for example, for distance measurement. The non-phase difference pixel divided region 30N is a non-phase difference pixel group composed of the plurality of non-phase difference pixels N, and receives the subject light to generate non-phase difference image data as the electric signal in accordance with the light-receiving amount. The non-phase difference image data is displayed on the display 26 (see FIG. 2) as, for example, a visible light image.

Figure 4:
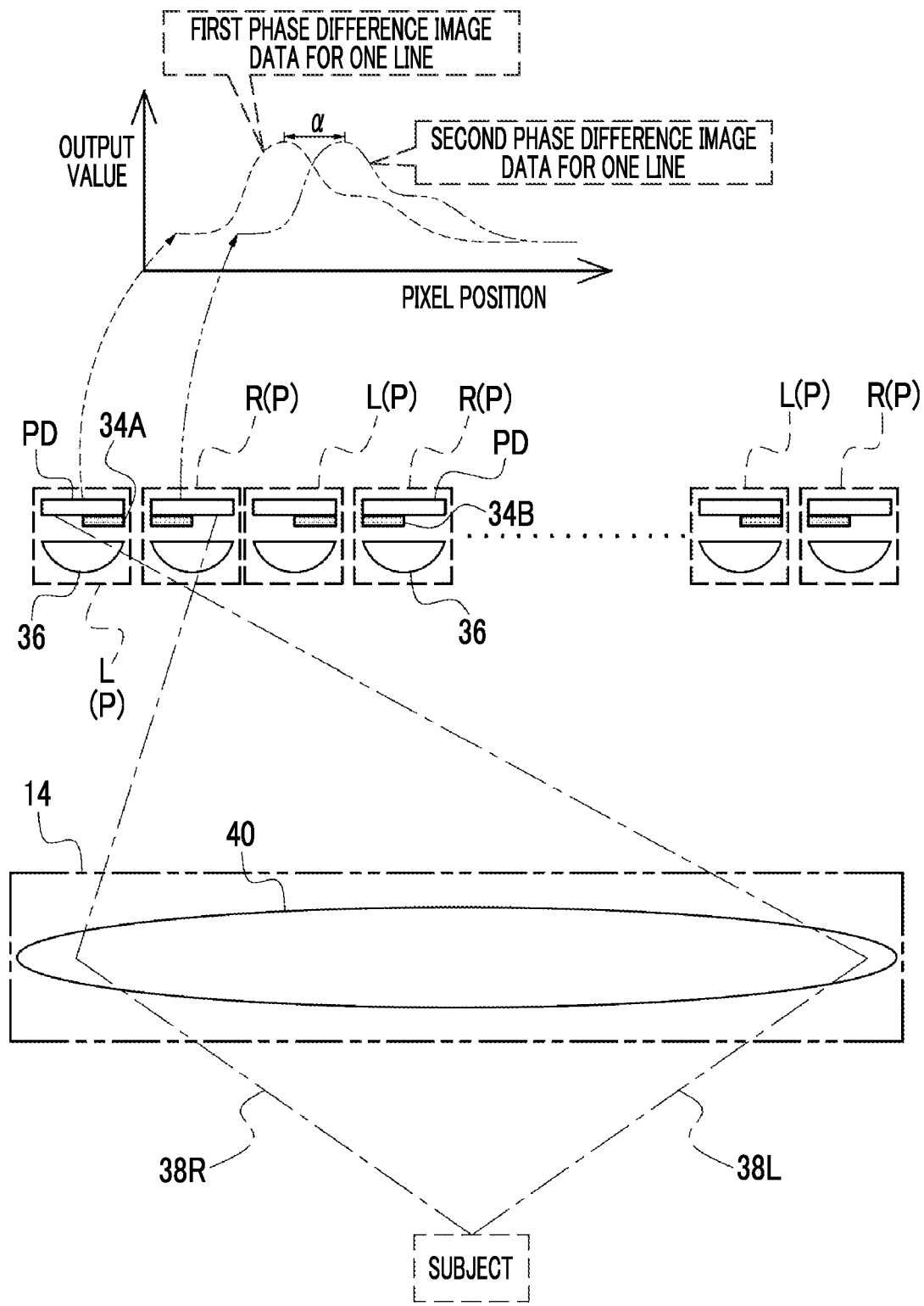
FIG. 4 is a conceptual diagram showing an example of an incidence characteristic of subject light on a first phase difference pixel and a second phase difference pixel included in the photoelectric conversion element shown in FIG. 3.

As an example, as shown in FIG. 4, the first phase difference pixel L comprises a light shielding member 34A, a microlens 36, and the photodiode PD. In the first phase difference pixel L, the light shielding member 34A is disposed between the microlens 36 and the light-receiving surface of the photodiode PD. A left half (left side in a case of facing the subject from the light-receiving surface (in other words, a right side in a case of facing the light-receiving surface from the subject)) of the light-receiving surface of the photodiode PD in the row direction is shielded against the light by the light shielding member 34A.

The second phase difference pixel R comprises a light shielding member 34B, the microlens 36, and the photodiode PD. In the second phase difference pixel R, the light shielding member 34B is disposed between the microlens 36 and the light-receiving surface of the photodiode PD. A right half (right side in a case of facing the subject from the light-receiving surface (in other words, a left side in a case of facing the light-receiving surface from the subject)) of the light-receiving surface of the photodiode PD in the row direction is shielded against the light by the light shielding member 34B. It should be noted that, in the following, for convenience of description, in a case in which the distinction is not needed, the light shielding members 34A and 34B are referred to as a "light shielding member" without designating the reference numeral.

The interchangeable lens 14 comprises an imaging lens 40. Luminous flux passing through an exit pupil of the imaging lens 40 is roughly divided into left region passing light 38L and right region passing light 38R. The left region passing light 38L refers to the left half luminous flux of the luminous flux passing through the exit pupil of the imaging lens 40 in a case of facing the subject side from the phase difference pixel P side. The right region passing light 38R refers to the right half luminous flux of the luminous flux passing through the exit pupil of the imaging lens 40 in a case of facing the subject side from the phase difference pixel P side. The luminous flux passing through the exit pupil of the imaging lens 40 is divided into the right and left by the microlens 36, the light shielding member 34A, and the light shielding member 34B functioning as a pupil division unit. The first phase difference pixel L receives the left region passing light 38L as the subject light, and the second phase difference pixel R receives the right region passing light 38R as the subject light. As a result, first phase difference image data corresponding to the subject image corresponding to the left region passing light 38L and second phase difference image data corresponding to the subject image corresponding to the right region passing light 38R are generated by the photoelectric conversion element 30.

In the imaging apparatus 10, for example, in the same phase difference pixel line 32A, the distance to the subject based on a deviation amount a between the first phase difference image data for one line and the second phase difference image data for one line, that is, a subject distance is measured. It should be noted that, since a method of deriving the subject distance from the deviation amount a is a known technology, the detailed description thereof will be omitted here.

Figure 5:
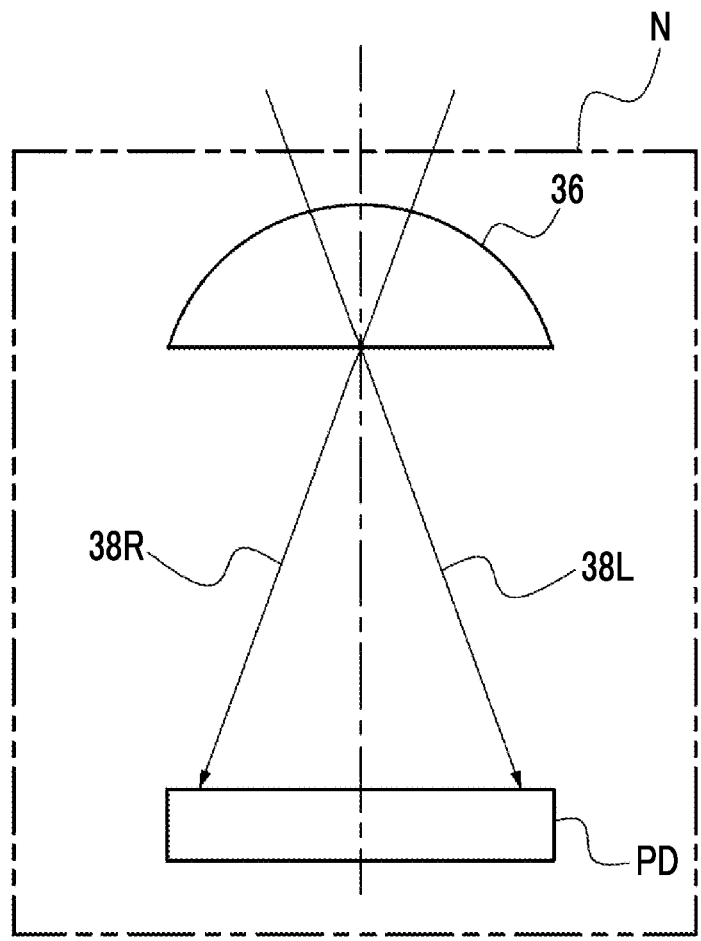
FIG. 5 is a schematic configuration diagram showing an example of a configuration of a non-phase difference pixel included in the photoelectric conversion element shown in FIG. 3.

As an example, as shown in FIG. 5, the non-phase difference pixel N is different from the phase difference pixel P in that the light shielding member is not provided. The photodiode PD of the non-phase difference pixel N receives the left region passing light 38L and the right region passing light 38R as the subject light.

Figure 6:
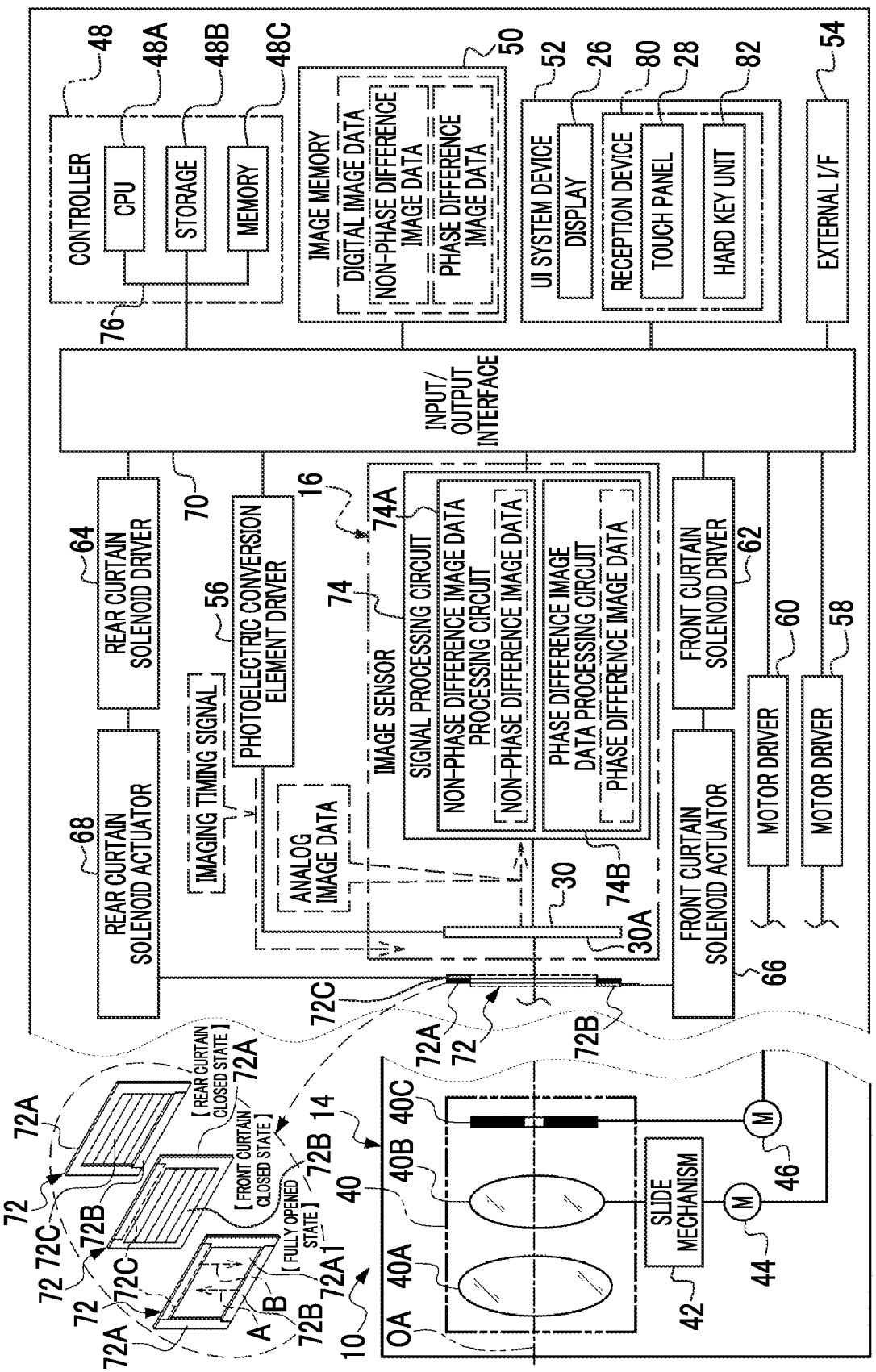
FIG. 6 is a schematic configuration diagram showing an example of a hardware configuration of the imaging apparatus according to the embodiment.

As an example, as shown in FIG. 6, the imaging lens 40 comprises an objective lens 40A, a focus lens 40B, and a stop 40C.

The objective lens 40A, the focus lens 40B, and the stop 40C are disposed in an order of the objective lens 40A, the focus lens 40B, and the stop 40C along the optical axis OA from the subject side (object side) to the imaging apparatus body 12 side (image side).

In addition, the interchangeable lens 14 comprises a slide mechanism 42, a motor 44, and a motor 46. The focus lens 40B is attached to the slide mechanism 42 in a slidable manner along the optical axis OA. In addition, the motor 44 is connected to the slide mechanism 42, and the slide mechanism 42 moves the focus lens 40B along the optical axis OA by receiving power of the motor 44 to operate. The stop 40C is a stop with an aperture having a variable size. The motor 46 is connected to the stop 40C, and the stop 40C adjusts exposure by receiving the power of the motor 46 to operate. It should be noted that a structure and/or an operation method of the interchangeable lens 14 can be changed as needed.

The motors 44 and 46 are connected to the imaging apparatus body 12 via a mount (not shown), and driving of the motors 44 and 46 is controlled in accordance with a command from the imaging apparatus body 12. It should be noted that, in the present embodiment, stepping motors are adopted as an example of the motors 44 and 46. Therefore, the motors 44 and 46 operate in synchronization with a pulse signal in accordance with the command from the imaging apparatus body 12. In addition, in the example shown in FIG. 6, the example is described in which the motors 44 and 46 are provided in the interchangeable lens 14, but the technology of the present disclosure is not limited to this. One of the motor 44 or the motor 46 may be provided in the imaging apparatus body 12, or both the motors 44 and 46 may be provided in the imaging apparatus body 12.

In the imaging apparatus 10, in a case of the imaging mode, an MF mode and an AF mode are selectively set in accordance with the instruction given to the imaging apparatus body 12. The MF mode is an operation mode for manually focusing. In the MF mode, for example, in a case in which a focus ring of the interchangeable lens 14 is operated by the user, the focus lens 40B is moved along the optical axis OA with a movement amount corresponding to an operation amount of the focus ring to adjust the focus.

In the AF mode, the imaging apparatus body 12 calculates a focus position in accordance with the subject distance, and moves the focus lens 40B toward the calculated focus position to adjust the focus. Here, the "focus position" refers to a position of the focus lens 40B on the optical axis OA in a focused state.

It should be noted that, in the following, for convenience of description, the control of aligning the focus lens 40B with the focus position is also referred to as an "AF control". In addition, in the following, for convenience of description, the calculation of the focus position is also referred to as an "AF calculation".

As an example, as shown in FIG. 6, the imaging apparatus body 12 comprises the image sensor 16, a controller 48, an image memory 50, a UI system device 52, an external I/F 54, a photoelectric conversion element driver 56, a motor driver 58, a motor driver 60, a front curtain solenoid driver 62, a rear curtain solenoid driver 64, a front curtain solenoid actuator 66, a rear curtain solenoid actuator 68, and an input/output interface 70. In addition, the imaging apparatus body 12 comprises a mechanical shutter 72. In addition, the image sensor 16 comprises a signal processing circuit 74.

The input/output interface 70 is connected to the controller 48, the image memory 50, the UI system device 52, the external I/F 54, the photoelectric conversion element driver 56, the motor driver 58, the motor driver 60, the front curtain solenoid driver 62, the rear curtain solenoid driver 64, and the signal processing circuit 74.

The controller 48 comprises a CPU 48A, a storage 48B, and a memory 48C. The CPU 48A is an example of a "processor" according to the technology of the present disclosure, the storage 48B and the memory 48C are examples of a "memory" according to the technology of the present disclosure, and the controller 48 is an example of a "control device" and a "computer" according to the technology of the present disclosure.

The CPU 48A, the storage 48B, and the memory 48C are connected via a bus 76, and the bus 76 is connected to the input/output interface 70.

It should be noted that, in the example shown in FIG. 6, one bus is shown as the bus 76 for convenience of illustration, but a plurality of buses may be used. The bus 76 may be a serial bus, or may be a parallel bus, which includes a data bus, an address bus, a control bus, and the like.

Various parameters and various programs are stored in the storage 48B. The storage 48B is a non-volatile storage device. Here, an EEPROM is adopted as an example of the storage 48B. The EEPROM is merely an example, and an HDD and/or SSD or the like may be applied as the storage 48B instead of the EEPROM or together with the EEPROM. In addition, the memory 48C transitorily stores various pieces of information and is used as a work memory. Examples of the memory 48C include a RAM, but the technology of the present disclosure is not limited to this, and other types of storage devices may be used.

Various programs are stored in the storage 48B. The CPU 48A reads out a needed program from the storage 48B, and performs the read out program on the memory 48C. The CPU 48A controls the entire imaging apparatus body 12 in accordance with the program performed on the memory 48C. In the example shown in FIG. 6, the image memory 50, the UI system device 52, the external I/F 54, the photoelectric conversion element driver 56, the motor driver 58, the motor driver 60, the front curtain solenoid driver 62, and the rear curtain solenoid driver 64 are controlled by the CPU 48A.

The photoelectric conversion element driver 56 is connected to the photoelectric conversion element 30. The photoelectric conversion element driver 56 supplies an imaging timing signal for defining a timing of the imaging performed by the photoelectric conversion element 30 to the photoelectric conversion element 30 in accordance with the instruction from the CPU 48A. The photoelectric conversion element 30 performs reset, exposure, and output of the electric signal in response to the imaging timing signal supplied from the photoelectric conversion element driver 56. Examples of the imaging timing signal include a vertical synchronizing signal and a horizontal synchronizing signal.

In a case in which the interchangeable lens 14 is mounted on the imaging apparatus body 12, the subject light incident on the imaging lens 40 is imaged on the light-receiving surface 30A by the imaging lens 40. Under the control of the photoelectric conversion element driver 56, the photoelectric conversion element 30 photoelectrically converts the subject light received by the light-receiving surface 30A, and outputs the electric signal in accordance with the light amount of the subject light to the signal processing circuit 74 as analog image data indicating the subject light. Specifically, the signal processing circuit 74 reads out the analog image data from the photoelectric conversion element 30 in one frame unit and for each horizontal line by an exposure sequential read-out method. The analog image data is roughly divided into analog phase difference image data generated by the phase difference pixel P and analog non-phase difference image data generated by the non-phase difference pixel N.

The signal processing circuit 74 digitizes the analog image data input from the photoelectric conversion element 30 to generate digital image data. The signal processing circuit 74 comprises a non-phase difference image data processing circuit 74A and a phase difference image data processing circuit 74B. The non-phase difference image data processing circuit 74A generates digital non-phase difference image data by digitizing the analog non-phase difference image data. The phase difference image data processing circuit 74B generates digital phase difference image data by digitizing the analog phase difference image data.

It should be noted that, in the following, for convenience of description, in a case in which the distinction is not needed, the digital non-phase difference image data and the digital phase difference image data are referred to as "digital image data". In addition, in the following, for convenience of description, in a case in which the distinction is not needed, the analog image data and the digital image data are referred to as "image data".

The mechanical shutter 72 is a focal plane shutter and is disposed between the stop 40C and the light-receiving surface 30A. The mechanical shutter 72 comprises a frame 72A, a front curtain 72B, and a rear curtain 72C. The frame 72A is a thin plate-shaped frame body, and transmits the subject light emitted from the imaging lens 40 and guides the subject light to the light-receiving surface 30A. The frame 72A is formed by an aperture 72A1 and a frame edge. The frame edge is formed in a rectangular shape and defines a shape, an area, and a thickness of the aperture 72A1. The aperture 72A1 has a rectangular shape and is formed in a center portion of the frame 72A. The frame 72A is disposed on the subject side with respect to the light-receiving surface 30A such that the center of the aperture 72A1 matches the optical axis OA. Each of the front curtain 72B and the rear curtain 72C comprises a plurality of blades. The front curtain 72B is disposed on the subject side with respect to the frame 72A, and the rear curtain 72C is disposed on the light-receiving surface 30A side with respect to the frame 72A.

A state of the mechanical shutter 72 transitions between the fully opened state, a front curtain closed state, and a rear curtain closed state. The fully opened state is a state in which the aperture 72A1 is fully opened by the front curtain 72B and the rear curtain 72C. In the fully opened state, the plurality of blades of the front curtain 72B are accommodated to overlap with each other on the subject side of a lower edge portion of the frame 72A, and the plurality of blades of the rear curtain 72C are accommodated to overlap with each other on the light-receiving surface 30A side of an upper edge portion of the frame 72A. In a case in which the aperture 72A1 is shielded by the front curtain 72B, the plurality of blades of the front curtain 72B are wound in a direction of a broken line arrow A, and the aperture 72A1 is shielded by the plurality of blades of the front curtain 72B. In addition, in a case in which the aperture 72A1 is shielded by the rear curtain 72C, the plurality of blades of the rear curtain 72C are pulled down in a direction of a broken line arrow B, and the aperture 72A1 is shielded by the plurality of blades of the rear curtain 72C.

The front curtain closed state is a state in which the front curtain 72B shields the aperture 72A1 and the rear curtain 72C opens the aperture 72A1. In a case in which the front curtain closed state is set from the fully opened state, the front curtain 72B is wound in the direction of the broken line arrow A. The rear curtain closed state is a state in which the rear curtain 72C shields the aperture 72A1 and the front curtain 72B opens the aperture 72A1. In a case in which the rear curtain closed state is set from the fully opened state, the rear curtain 72C is pulled down in the direction of the broken line arrow B.

Each of the front curtain solenoid actuator 66 and the rear curtain solenoid actuator 68 is an actuator having a solenoid as a power source. The front curtain solenoid driver 62 controls the front curtain solenoid actuator 66 in accordance with the instruction from the CPU 48A. The rear curtain solenoid driver 64 controls the rear curtain solenoid actuator 68 in accordance with the instruction from the CPU 48A.

The front curtain 72B is mechanically connected to the front curtain solenoid actuator 66, and the front curtain solenoid actuator 66 generates the power under the control of the front curtain solenoid driver 62 and applies the generated power to the front curtain 72B to selectively perform winding and pulling down of the front curtain 72B. The rear curtain 72C is mechanically connected to the rear curtain solenoid actuator 68, and the rear curtain solenoid actuator 68 generates the power under the control of the rear curtain solenoid driver 64, and applies the generated power to the rear curtain 72C to selectively perform winding and pulling down of the rear curtain 72C.

In the imaging apparatus 10, the imaging for the live view image and the imaging for a recording image for recording the still picture and/or the motion picture are performed by the exposure sequential read-out method (rolling shutter method). The image sensor 16 has an electronic shutter function, and the imaging for the live view image is realized by activating the electronic shutter function without operating the mechanical shutter 72 in the fully opened state.

On the other hand, the imaging for the still picture is realized by activating the electronic shutter function and operating the mechanical shutter 72 such that the mechanical shutter 72 transitions from the front curtain closed state to the rear curtain closed state. In a case in which the mechanical shutter 72 transitions from the front curtain closed state to the rear curtain closed state, the pulling down of the front curtain 72B is first started before the pulling down of the rear curtain 72C out of the front curtain 72B and the rear curtain 72C. Then, after the pulling down of the front curtain 72B is started, the pulling down of the rear curtain 72C is started later than the front curtain 72B. A time lag from the start of pulling down of the front curtain 72B to the start of pulling down of the rear curtain 72C is determined in accordance with a designated shutter speed, a gap between the front curtain 72B and the rear curtain 72C is larger as the time lag is longer, so that a time required for the main exposure is increased.

The digital image data is stored in the image memory 50. That is, the non-phase difference image data processing circuit 74A stores the non-phase difference image data in the image memory 50, and the phase difference image data processing circuit 74B stores the phase difference image data in the image memory 50. The CPU 48A acquires the digital image data from the image memory 50 and performs various pieces of processing by using the acquired digital image data.

The UI system device 52 comprises the display 26, and the CPU 48A displays various pieces of information on the display 26. In addition, the UI system device 52 comprises a reception device 80. The reception device 80 comprises the touch panel 28 and a hard key unit 82. The hard key unit 82 is a plurality of hard keys including the instruction key 24 (see FIG. 2). The CPU 48A is operated in accordance with various instructions received by the touch panel 28. It should be noted that, here, although the hard key unit 82 is provided in the UI system device 52, the technology of the present disclosure is not limited to this, and for example, the hard key unit 82 may be connected to the external I/F 54.

The external I/F 54 controls the exchange of various pieces of information with the device (hereinafter, also referred to as an "external device") that is present outside the imaging apparatus 10. Examples of the external I/F 54 include a USB interface. External devices (not shown), such as a smart device, a personal computer, a server, a USB memory, a memory card, and/or a printer, are directly or indirectly connected to the USB interface.

The motor driver 58 is connected to the motor 44 and controls the motor 44 in accordance with the instruction from the CPU 48A. The position of the focus lens 40B on the optical axis OA is controlled via the slide mechanism 42 by controlling the motor 44. The focus lens 40B is moved in accordance with the instruction from the CPU 48A while avoiding a main exposure period by the image sensor 16.

In addition, the motor driver 60 is connected to the motor 46 and controls the motor 46 in accordance with the instruction from the CPU 48A. The size of the aperture of the stop 40C is controlled by controlling the motor 46.

By the way, in a case in which the continuous imaging with the AF control is performed on a focus target region (for example, an imaging target region including a specific moving object) by the general imaging apparatus with the AF function, a time required for moving the focus lens during the continuous imaging is shorter as a frame rate for the continuous imaging is higher. In a case in which the movement time of the focus lens is shortened, it is difficult to make the focus position of the focus lens follow the focus target region. For example, even in a case in which the imaging apparatus with the AF function predicts the focus position in a frame, which is one frame ahead, for each frame of the continuous imaging and moves the focus lens toward the predicted focus position, the continuous imaging interval (for example, the time for one frame defined by the frame rate for the continuous imaging) may be too short to secure sufficient movement time of the focus lens. In such a case, a start timing of the main exposure arrives before the focus lens reaches the predicted focus position, and the focus lens has to be stopped.

Figure 7:
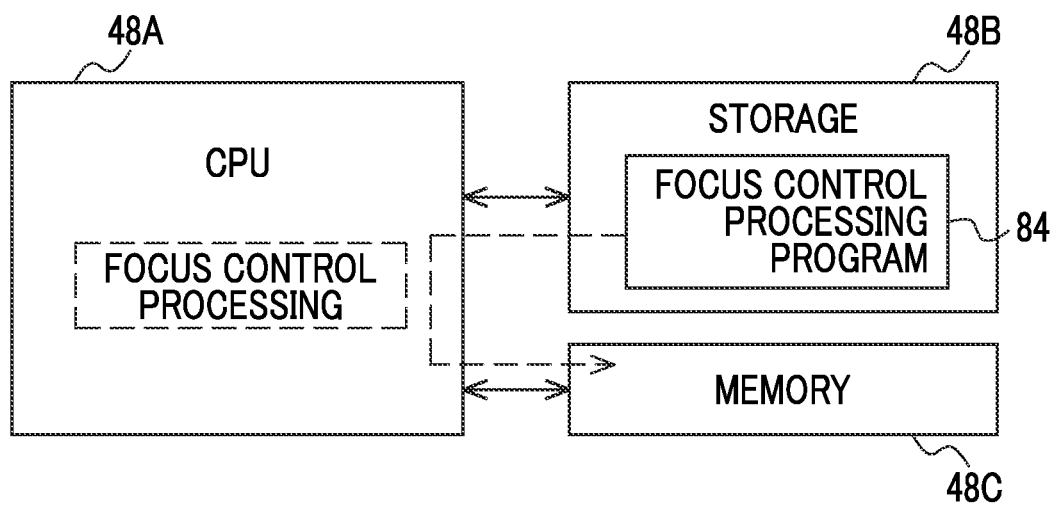
FIG. 7 is a block diagram showing an example of a configuration of a controller provided in the imaging apparatus according to the embodiment.

Therefore, in view of such circumstances, in the imaging apparatus 10 according to the present embodiment, as shown in FIG. 7, a focus control processing program 84 is stored in the storage 48B, and the focus control processing is performed by the CPU 48A in accordance with the focus control processing program 84. The focus control processing is realized by reading out the focus control processing program 84 from the storage 48B by the CPU 48A and performing the read out focus control processing program 84 on the memory 48C. The focus control processing program 84 is an example of a "program" according to the technology of the present disclosure. In the following, the configuration of the focus control processing will be specifically described.

Figure 8:
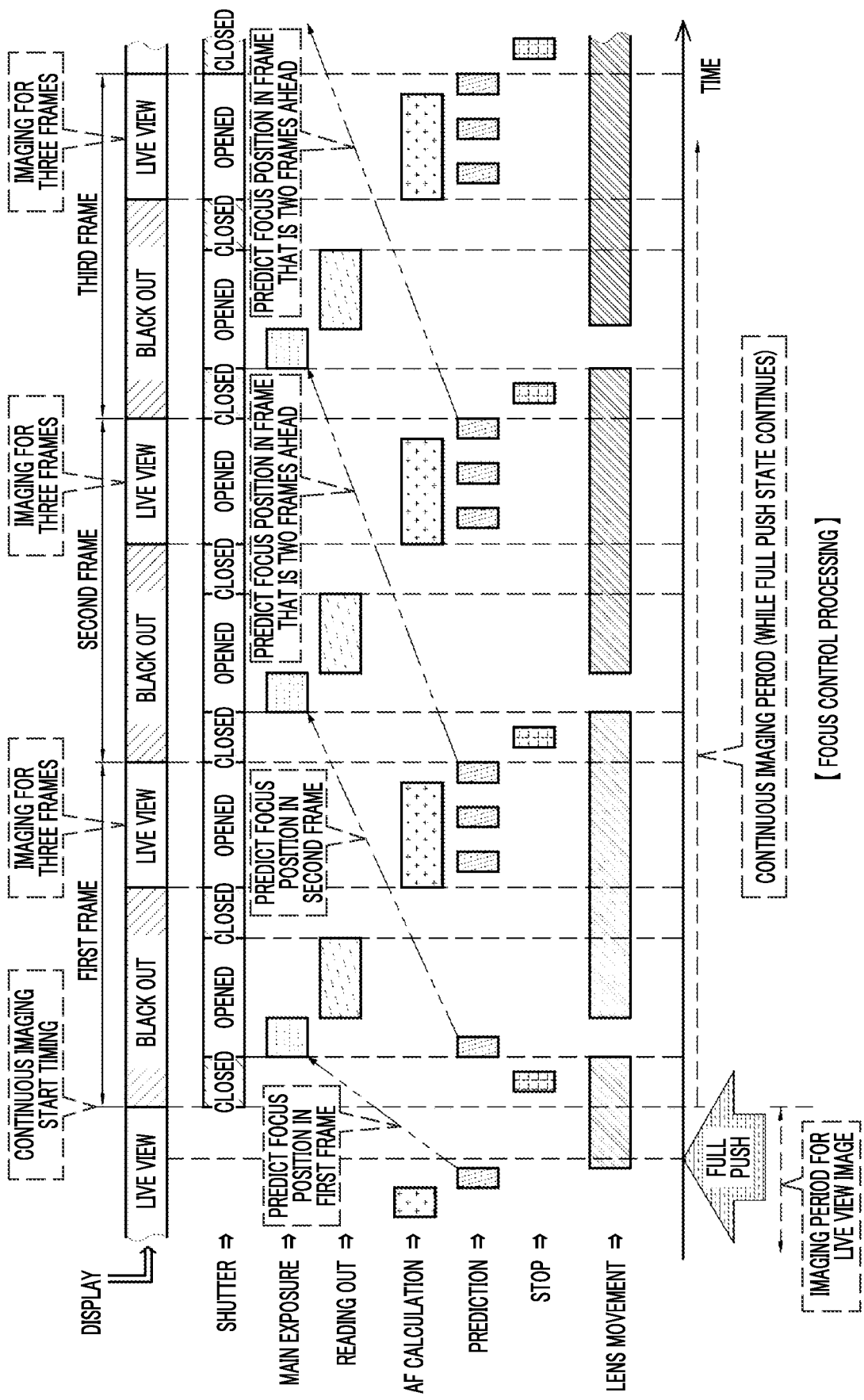
FIG. 8 is a time chart showing an example of a processing content of focus control processing according to the embodiment.

FIG. 8 shows an example of the focus control processing performed by the CPU 48A in the imaging mode in a case in which the continuous imaging is started by setting the release button 18 (see FIG. 1) in the full push state in a period (hereinafter, also referred to as an "imaging period for the live view image") in which the imaging for the live view image is performed in a previous stage of the continuous imaging.

The example shown in FIG. 8 shows an aspect in which the continuous imaging for three frames from the first frame to the third frame is performed in a period in which the imaging for the continuous imaging is performed, that is, a period (hereinafter, also referred to as a "continuous imaging period") in which the continuous imaging for the recording image is performed. In addition, in the continuous imaging period, the main exposure for one frame for the recording image is performed for each frame of the continuous imaging, and the imaging for the live view image for a plurality of frames (for three frames in the example shown below) is performed.

In addition, in the example shown in FIG. 8, "closed" refers to the front curtain closed state, and "opened" refers to a state in which the front curtain 72B is fully opened or a state during the transition of the mechanical shutter 72 from the front curtain closed state to the rear curtain closed state. The state in which the front curtain 72B is fully opened refers to the fully opened state or the rear curtain closed state. In a case in which the mechanical shutter 72 is in the fully opened state, the imaging for the live view image is performed, and in a state during the transition of the mechanical shutter 72 from the front curtain closed state to the rear curtain closed state, the main exposure is performed by the image sensor 16.

It should be noted that, in the following, for convenience of description, the description will be made on the premise that the mechanical shutter 72 is not in the fully opened state during the transition from the front curtain closed state to the rear curtain closed state, but this is merely an example. In a case in which the main exposure period is increased, the mechanical shutter 72 can be in the fully opened state during the transition from the front curtain closed state to the rear curtain closed state. As described above, even in a case in which the mechanical shutter 72 is in the fully opened state during the transition from the front curtain closed state to the rear curtain closed state, the technology of the present disclosure is established.

As an example, as shown in FIG. 8, in the imaging period for the live view image, the imaging for the live view image is performed with the mechanical shutter 72 in the fully opened state. In the imaging period for the live view image, the non-phase difference image data generated by the non-phase difference image data processing circuit 74A due to the imaging for the live view image is stored in the image memory 50. Then, the non-phase difference image data is read out from the image memory 50 by the CPU 48A, and the image indicated by the read out non-phase difference image data is displayed on the display 26 as the live view image.

In addition, in the imaging period for the live view image, the phase difference image data generated by the phase difference image data processing circuit 74B due to the imaging for the live view image is stored in the image memory 50. The CPU 48A reads out the phase difference image data from the image memory 50, and measures the subject distance with respect to the focus target region in the subject based on the read out phase difference image data. The focus target region is, for example, a region within the subject designated by the user via the reception device 80, and in the present embodiment, the center portion of the subject is adopted as the focus target region.

It should be noted that the focus target region may be a fixed region or may be a region in which a position within the imaging range is changed. The focus target region may be a region that follows a specific moving object (for example, a specific person, a specific bicycle, a specific vehicle, or a specific aircraft) recognized by the CPU 48A performing image recognition processing based on the image data.

In the imaging period for the live view image, the CPU 48A performs the AF calculation based on the measured subject distance. In addition, in the imaging period for the live view image, the CPU 48A predicts the focus position of the focus lens 40B with respect to the focus target region at a timing at which the main exposure of the first frame of the continuous imaging is started, based on the focus position obtained by performing the AF calculation. Here, in a case in which N is a natural number, an Nth frame of the continuous imaging refers to an Nth frame in which the main exposure is performed in the continuous imaging period. The prediction of the focus position is performed based on, for example, a plurality of focus positions obtained by a latest plurality of AF calculations (for example, the latest two AF calculations retroactively from the present time). The CPU 48A moves the focus lens 40B along the optical axis OA toward the predicted focus position by controlling the motor driver 58.

In a case in which the release button 18 is fully pushed and the full push state continues for a certain period of time or longer, a timing for starting the continuous imaging (hereinafter, also referred to as a "continuous imaging start timing") arrives. In a case in which the continuous imaging start timing arrives, the live view image of the display 26 is hidden. That is, the display region of the display 26 on which the live view image is displayed is blacked out. In addition, in a case in which the continuous imaging start timing arrives, the continuous imaging is started. The continuous imaging start timing is, for example, a timing at which a front curtain closing signal for giving an instruction for closing the aperture 72A1 by the front curtain 72B is output from the CPU 48A to the front curtain solenoid driver 62. In a case in which the front curtain closing signal is input, the front curtain solenoid driver 62 starts winding of the front curtain 72B such that the mechanical shutter 72 transitions from the fully opened state to the front curtain closed state. During the winding of the front curtain 72B, the size of the aperture of the stop 40C is adjusted in preparation for the main exposure.

In a case in which the mechanical shutter 72 is in the front curtain closed state, the pulling down of the front curtain 72B is started. In addition, the pulling down of the rear curtain 72C is started with a delay after the pulling down of the front curtain 72B is started. As a result, the main exposure of the first frame of the continuous imaging is started. In addition, the focus lens 40B is stopped at a timing at which the main exposure is started. This is because, in a case in which the focus lens 40B is moved during the main exposure, distortion due to the movement of the focus lens 40B occurs in the image obtained by the imaging.

While the main exposure of the first frame of the continuous imaging is performed, the CPU 48A predicts the focus position of the focus lens 40B with respect to the focus target region at a timing at which the main exposure of the second frame of the continuous imaging is performed, based on the latest focus position obtained by performing the AF calculation. In this case as well, the prediction of the focus position is performed based on, for example, a plurality of focus positions obtained by the latest plurality of AF calculations obtained in the imaging period for the live view image, and an elapsed time from the completion of the prediction of the first frame of the continuous imaging to the present time. It should be noted that, here, the form example is described in which the prediction of the second frame of the continuous imaging is performed while the main exposure of the first frame of the continuous imaging is performed, but the technology of the present disclosure is not limited to this, and the prediction of the second frame of the continuous imaging may be performed in a previous stage of the start of the main exposure of the first frame of the continuous imaging. For example, the prediction of the second frame of the continuous imaging may be performed in parallel with the prediction of the first frame of the continuous imaging.

In a case in which the main exposure of the first frame of the continuous imaging ends, the mechanical shutter 72 is in the rear curtain closed state, and the reading out of the digital image data of the first frame of the continuous imaging is started. Here, the reading out of the digital image data refers to processing up to the storage of the digital image data of the first frame of the continuous imaging in the image memory 50 and the storage of the digital image data, which is read out from the image memory 50 by the CPU 48A, in a predetermined storage region (here, as an example, the storage 48B).

In a case in which the main exposure of the first frame of the continuous imaging ends, the CPU 48A controls the motor driver 58 to restart the movement of the focus lens 40B toward the predicted focus position (focus position in the second frame in the continuous imaging period) while the main exposure of the first frame of the continuous imaging is performed.

In a case in which the reading out of the digital image data ends, the rear curtain 72C is wound, and the mechanical shutter 72 transitions from the rear curtain closed state to the front curtain closed state. In this period as well, the focus lens 40B continues to be moved toward the expected focus position while the main exposure of the first frame of the continuous imaging is performed. In a case in which the mechanical shutter 72 is in the front curtain closed state, the front curtain 72B is pulled down, the mechanical shutter 72 transitions from the front curtain closed state to the fully opened state, and the imaging for the live view image for three frames is performed, so that the image indicated by the non-phase difference image data obtained as described above is displayed on the display 26 as the live view image. It should be noted that, here, the imaging for the live view image for three frames is described, but this is merely an example, and the imaging for the live view image for one or two frames may be performed, the imaging for the live view image for four or more frames may be performed, and the imaging for the live view image for the number of frames determined in accordance with the frame rate of the imaging for the live view image.

In addition, each time the imaging for the live view image is performed, the CPU 48A performs the AF calculation based on the non-phase difference image data obtained by performing the imaging for the live view image. Then, each time the AF calculation is performed, based on a plurality of focus positions obtained from a latest plurality of AF calculations, the focus position of the focus lens 40B with respect to the focus target region at a timing at which the main exposure in a frame that is two frames ahead in the continuous imaging is performed is predicted by the CPU 48A.

On the other hand, even while the imaging for the live view image for three frames is performed, the focus lens 40B continues to be moved toward the focus position expected while the main exposure of the first frame of the continuous imaging is performed. That is, the CPU 48A continues to move the focus lens 40B toward the expected latest focus position while the imaging for the live view image for three frames is performed.

In a case in which the imaging for the live view image of the third frame ends, the CPU 48A controls the motor driver 58 to move the focus lens 40B toward the latest focus position predicted by performing the imaging for the live view image of the third frame along the optical axis OA.

In the focus control processing, in each frame of second and subsequent frames of the continuous imaging, except that, until the full push state of the release button 18 is released, the prediction of the focus position of the focus lens 40B with respect to the focus target region in the next frame (first frame of the continuous imaging in the example shown in FIG. 8) of the continuous imaging is not performed in the main exposure period, the same processing as the processing of the first frame of the continuous imaging after the arrival of the continuous imaging start timing is repeatedly performed.

Figure 9:
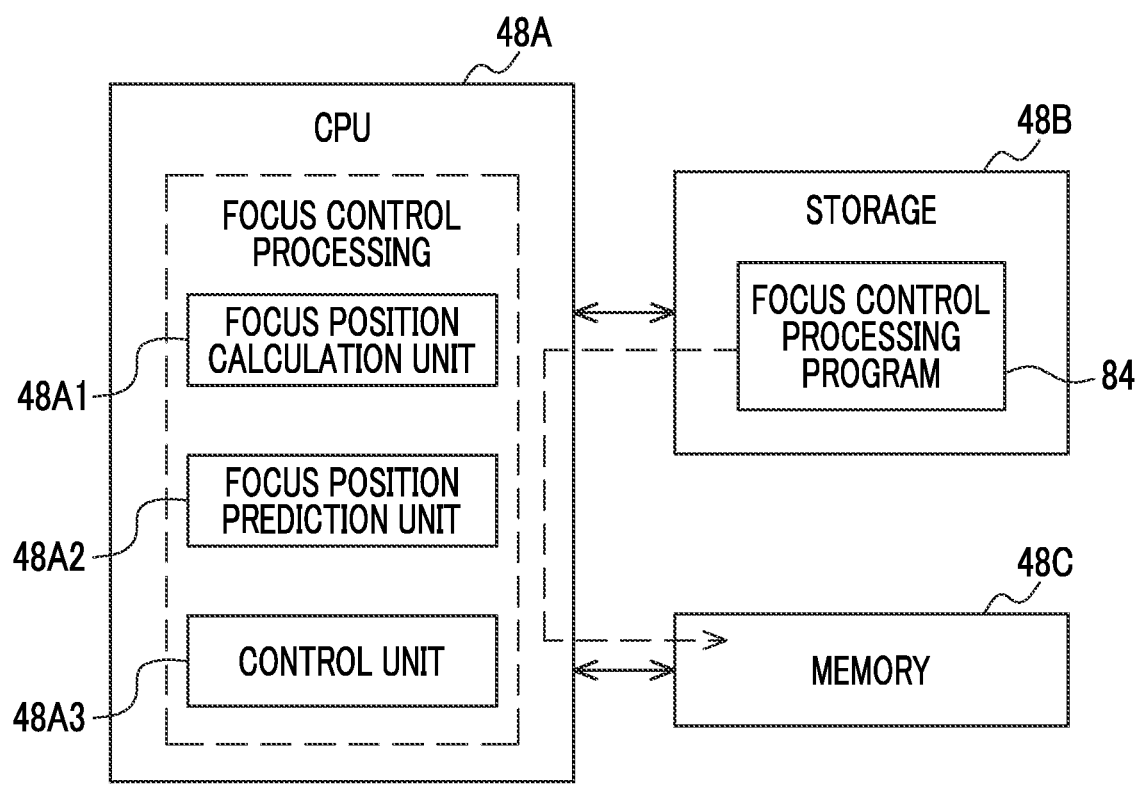
FIG. 9 is a block diagram showing an example of a main function of a CPU provided in the imaging apparatus according to the embodiment.

As an example, as shown in FIG. 9, the focus control processing is realized by a focus position calculation unit 48A1, a focus position prediction unit 48A2, and a control unit 48A3. The CPU 48A reads out the focus control processing program 84 from the storage 48B and performs the read out focus control processing program 84 on the memory 48C to operate as the focus position calculation unit 48A1, the focus position prediction unit 48A2, and the control unit 48A3.

The focus position calculation unit 48A1 calculates the focus position of the focus lens 40B with respect to the focus target region in a specific frame in which the main exposure is performed in the continuous imaging period. The focus position prediction unit 48A2 refers to the focus position calculated by the focus position calculation unit 48A1 in the continuous imaging period to predict the focus position of the focus lens 40B with respect to the focus target region in a frame ahead of the specific frame by a plurality of frames. The control unit 48A3 controls the motor 44 via the motor driver 58 to avoid the main exposure period by the image sensor 16 and move the focus lens 40B. In addition, the control unit 48A3 moves the focus lens 40B toward the focus position predicted by the focus position prediction unit 48A2. It should be noted that, here, the specific frame refers to each frame in which the main exposure is performed in the continuous imaging period. In addition, the focus target region described above is an example of a "specific subject" according to the technology of the present disclosure.

Figure 10:
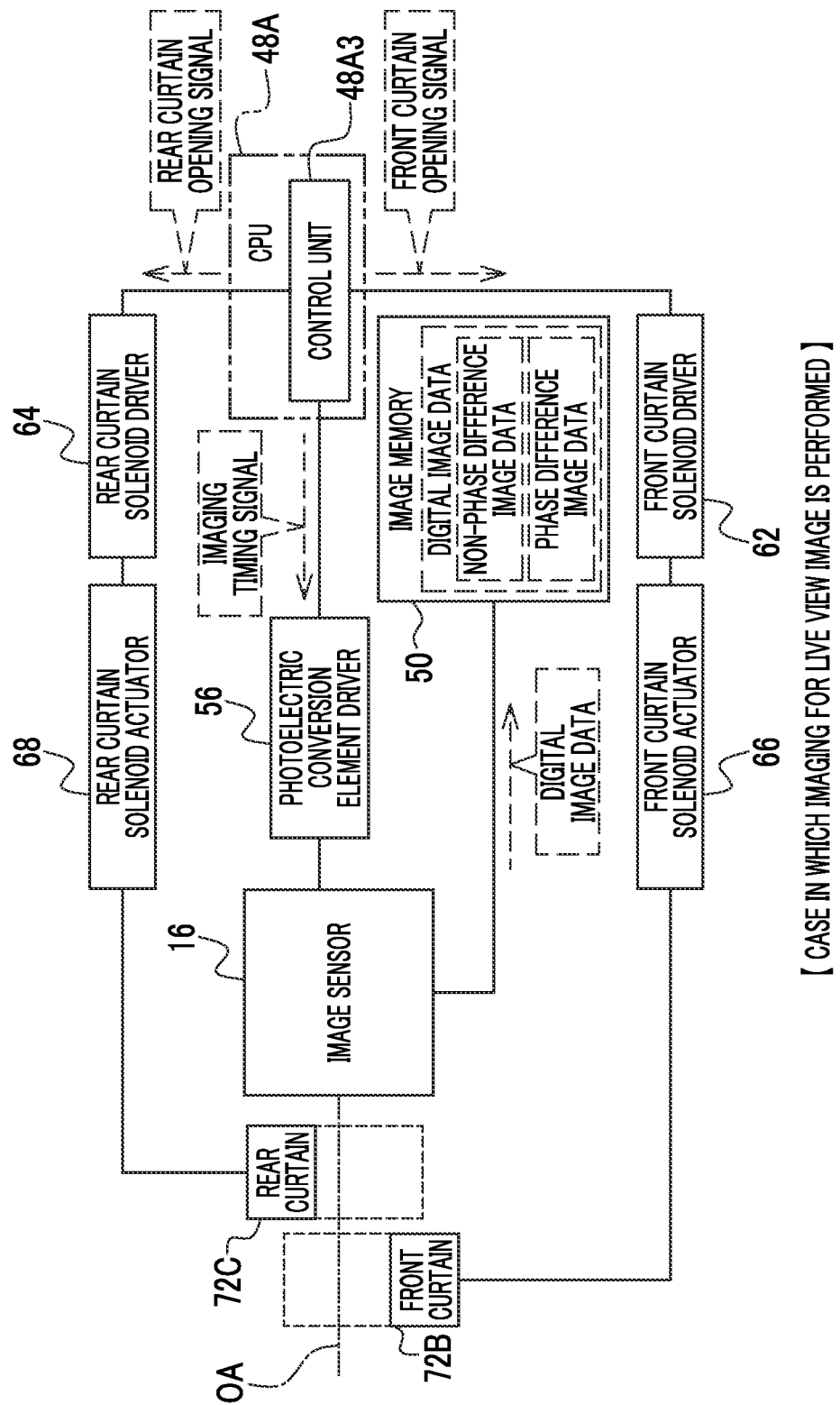
FIG. 10 is a block diagram showing an example of a processing content in a case in which imaging for a live view image is performed by the imaging apparatus according to the embodiment.

As an example, as shown in FIG. 10, in a case in which the imaging for the live view image is performed by the imaging apparatus 10, the control unit 48A3 outputs a front curtain opening signal for giving an instruction for fully opening the front curtain 72B to the front curtain solenoid driver 62, and outputs a rear curtain opening signal for giving an instruction for fully opening the rear curtain 72C to the rear curtain solenoid driver 64. The front curtain solenoid driver 62 controls the front curtain solenoid actuator 66 in response to the front curtain opening signal input from the control unit 48A3 to fully open the front curtain 72B. The rear curtain solenoid driver 64 controls the rear curtain solenoid actuator 68 in response to the rear curtain opening signal input from the control unit 48A3 to fully open the rear curtain 72C.

In addition, the control unit 48A3 outputs the imaging timing signal to the photoelectric conversion element driver 56, and the photoelectric conversion element driver 56 exposes the image sensor 16 in response to the imaging timing signal input from the control unit 48A3. The digital image data obtained by being exposed by the image sensor 16 is stored in the image memory 50. The image memory 50 stores the non-phase difference image data and the phase difference image data as the digital image data.

Figure 11:
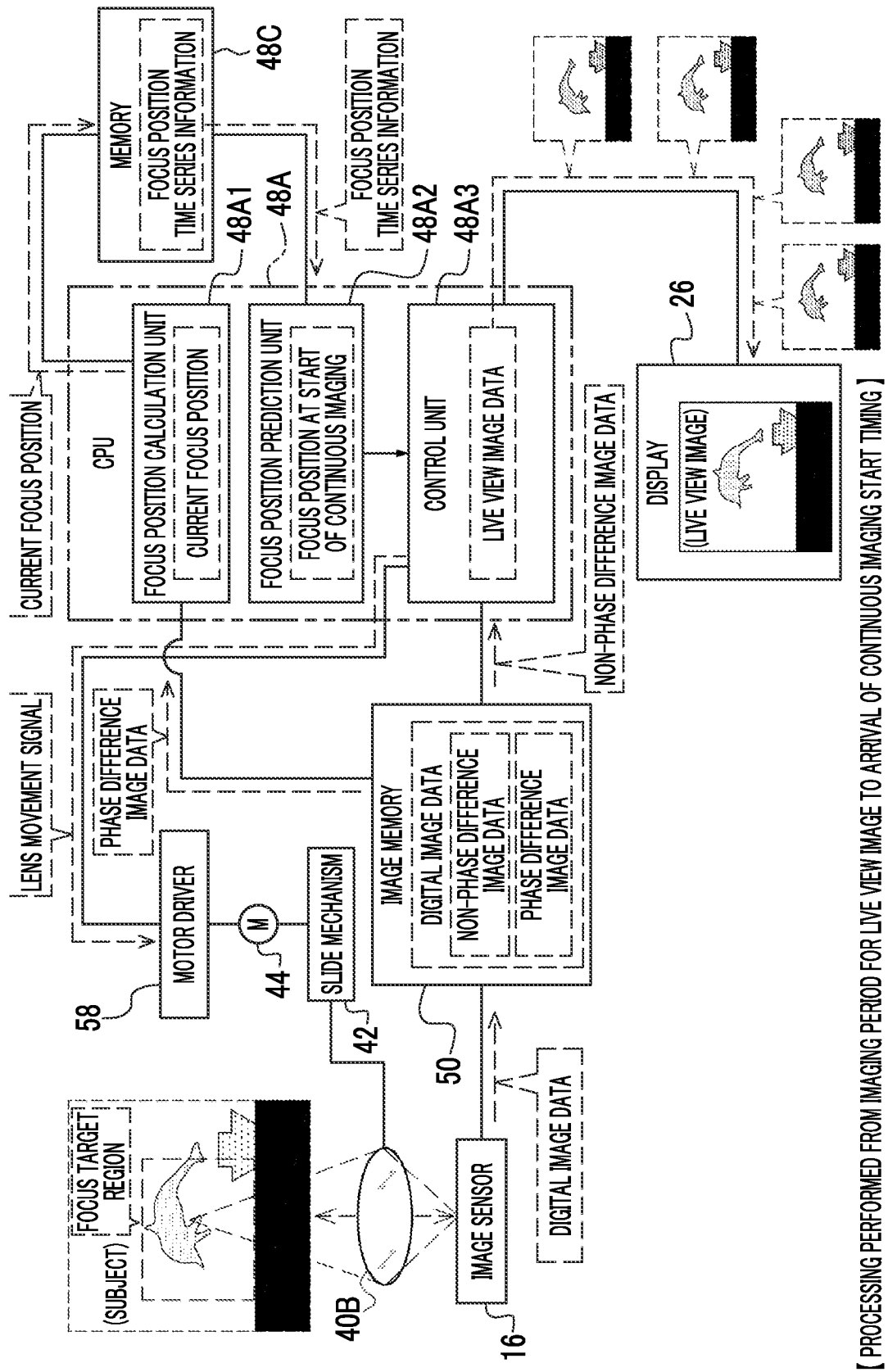
FIG. 11 is a block diagram showing an example of a content of processing performed by the imaging apparatus according to the embodiment, which is performed from an imaging period for the live view image to the arrival of a continuous imaging start timing.

As an example, as shown in FIG. 11, in a case in which the imaging for the live view image is performed by the imaging apparatus 10, the control unit 48A3 acquires the non-phase difference image data as the live view image data from the image memory 50. The control unit 48A3 displays the image indicated by the live view image data on the display 26 as the live view image.

In a period from the imaging period for the live view image to the arrival of the continuous imaging start timing, the focus position calculation unit 48A1 acquires the latest phase difference image data from the image memory 50, and measures the subject distance related to the focus target region based on the acquired phase difference image data. Then, the focus position calculation unit 48A1 performs the AF calculation based on the measured subject distance to derive a current focus position of the focus lens 40B with respect to the focus target region (hereinafter, referred to as a "current focus position").

Focus position time series information is stored in the memory 48C. The focus position time series information is information indicating the time series of the current focus position obtained each time the AF calculation is performed. The time series of the current focus position is, for example, a time series of the current focus position obtained by the AF calculation for the last three times. Each time the current focus position is derived, the focus position calculation unit 48A1 updates the focus position time series information by storing the latest current focus position obtained by derivation in the memory 48C. It should be noted that the current focus position is an example of a "first focus position" according to the technology of the present disclosure. In addition, here, as the time series of the current focus position, the time series of the current focus position obtained by the AF calculation for the last three times is described, but this is merely an example, and the time series of the current focus position need only be the time series of the current focus position obtained by the AF calculation for a plurality of times in the past. It is more preferable that the AF calculation for a plurality of times in the past is the AF calculation for a plurality of times performed in a period close to the present time.

The focus position prediction unit 48A2 predicts the focus position of the focus lens 40B with respect to the focus target region in the first frame of the continuous imaging in the previous stage of the start of the continuous imaging by the image sensor 16. Specifically, the focus position prediction unit 48A2 acquires the focus position time series information from the memory 48C, and predicts, based on the acquired focus position time series information, the focus position (hereinafter, also referred to as a "focus position at the start of the continuous imaging") of the focus lens 40B with respect to the focus target region in the first frame in a case in which the continuous imaging is started. Here, the focus position at the start of the continuous imaging is an example of a "third focus position" according to the technology of the present disclosure.

The control unit 48A3 generates a lens movement signal for giving an instruction for moving the focus lens 40B to the focus position predicted by the focus position prediction unit 48A2 and outputs the lens movement signal to the motor driver 58. In the example shown in FIG. 11, since the focus position at the start of the continuous imaging is predicted by the focus position prediction unit 48A2, the lens movement signal generated and output by the control unit 48A3 is a signal for giving the instruction for moving the focus lens 40B to the focus position at the start of the continuous imaging predicted by the focus position prediction unit 48A2. The motor driver 58 operates the slide mechanism 42 in response to the lens movement signal input from the control unit 48A3 to move the focus lens 40B along the optical axis OA toward the focus position at the start of the continuous imaging.

Figure 12:
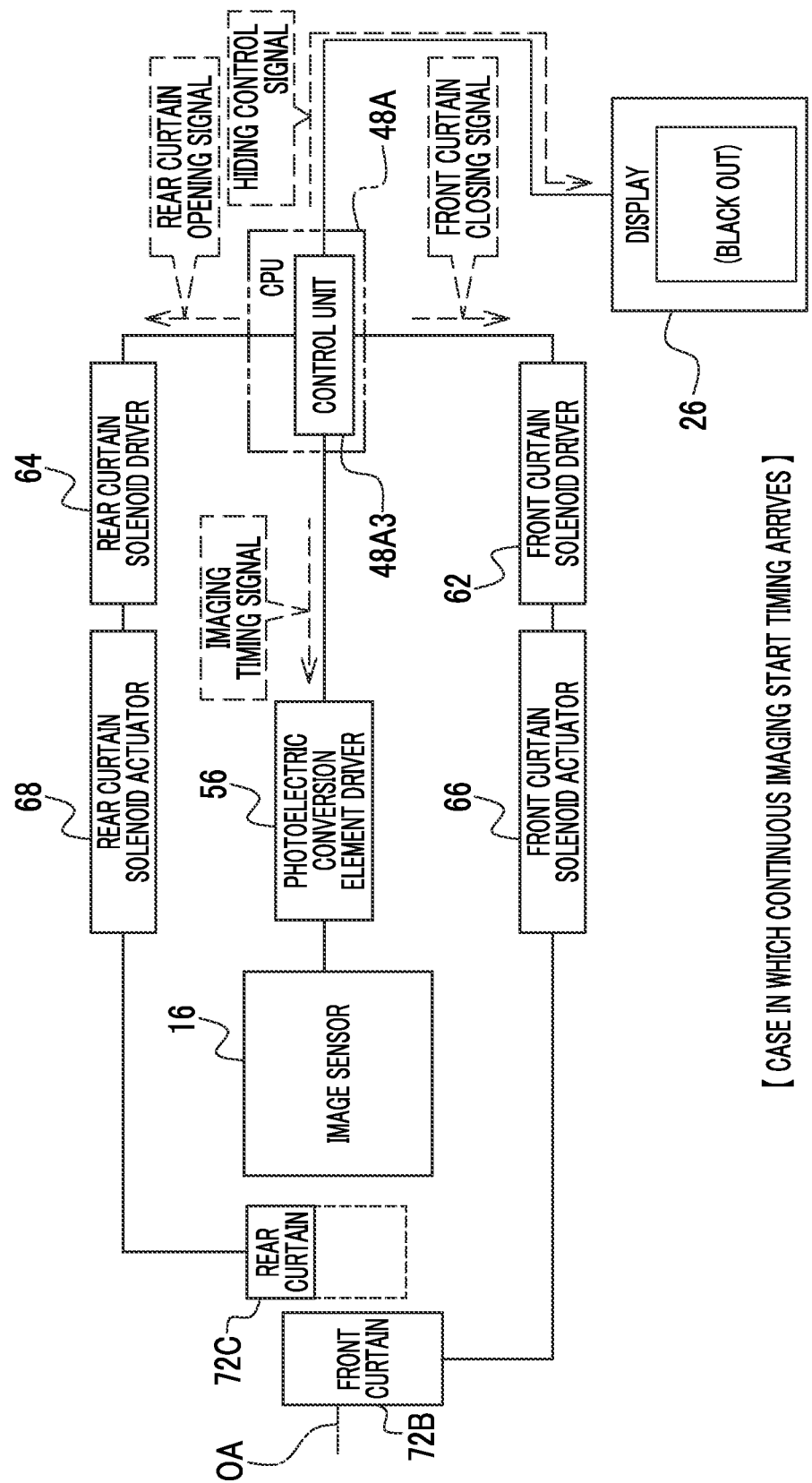
FIG. 12 is a block diagram showing an example of a processing content in a case in which the continuous imaging start timing arrives in the imaging apparatus according to the embodiment.

As an example, as shown in FIG. 12, in a case in which the continuous imaging start timing arrives, the control unit 48A3 outputs the front curtain closing signal described above to the front curtain solenoid driver 62. The front curtain solenoid driver 62 controls the front curtain solenoid actuator 66 in response to the front curtain closing signal input from the control unit 48A3 to start the winding of the front curtain 72B and cause the mechanical shutter 72 to transition from the fully opened state to the front curtain closed state. In addition, the control unit 48A3 outputs a hiding control signal indicating that the live view image of the display 26 is hidden to the display 26, so that the display 26 hides the live view image. As a result, a display screen in which the live view image is displayed in the screen of the display 26 is blacked out.

Figure 13:
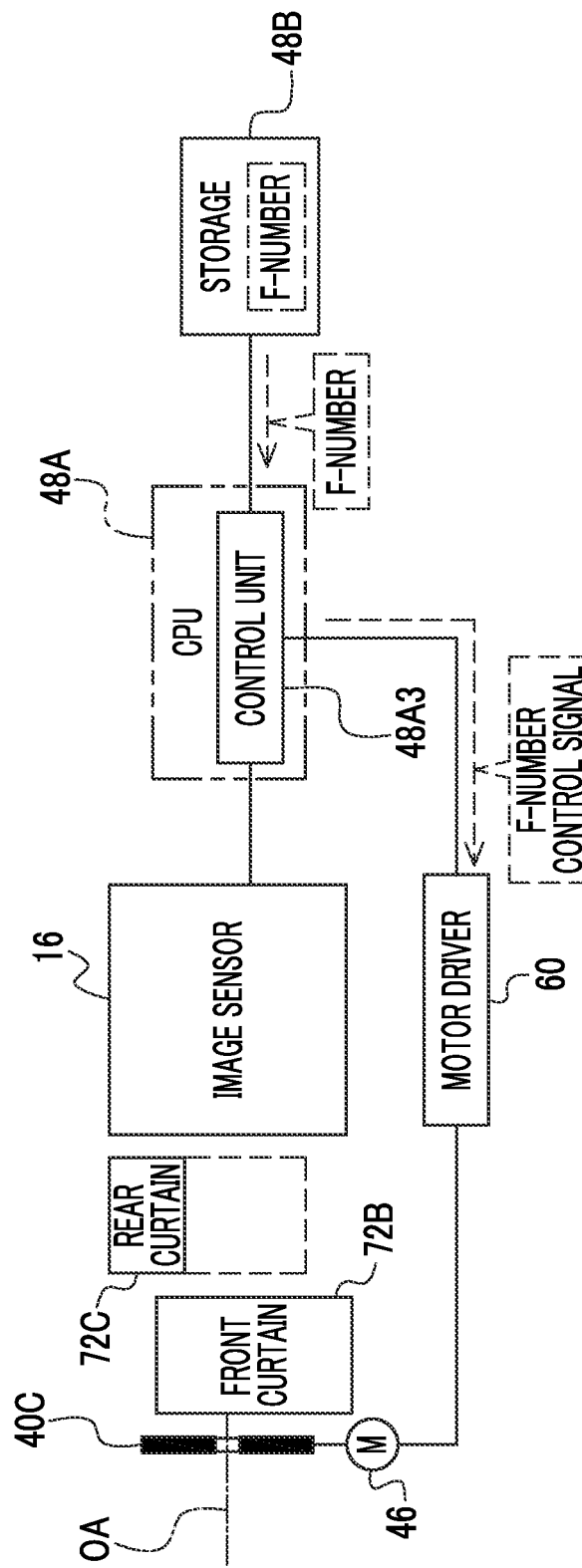
FIG. 13 is a block diagram showing an example of a content of processing performed while a mechanical shutter provided in the imaging apparatus according to the embodiment transitions from a fully opened state to a front curtain closed state.

As an example, as shown in FIG. 13, an F-number is stored in the storage 48B. The F-number stored in the storage 48B is a variable value updated in accordance with a condition (for example, an instruction received by the reception device 80 and/or the brightness of the live view image) given to the imaging apparatus 10. It should be noted that the F-number stored in the storage 48B may be a fixed value that cannot be changed.

While the mechanical shutter 72 transitions from the fully opened state to the front curtain closed state, the control unit 48A3 acquires the F-number from the storage 48B, and generates an F-number control signal for controlling the size of the aperture of the stop 40C to output the generated F-number control signal based on the acquired F-number to the motor driver 60. The F-number control signal is a signal for controlling the size of the aperture of the stop 40C to a size corresponding to the latest F-number acquired by the control unit 48A3 from the storage 48B. The motor driver 60 controls the size of the aperture of the stop 40C by controlling the motor 46 in response to the F-number control signal input from the control unit 48A3.

Figure 14:
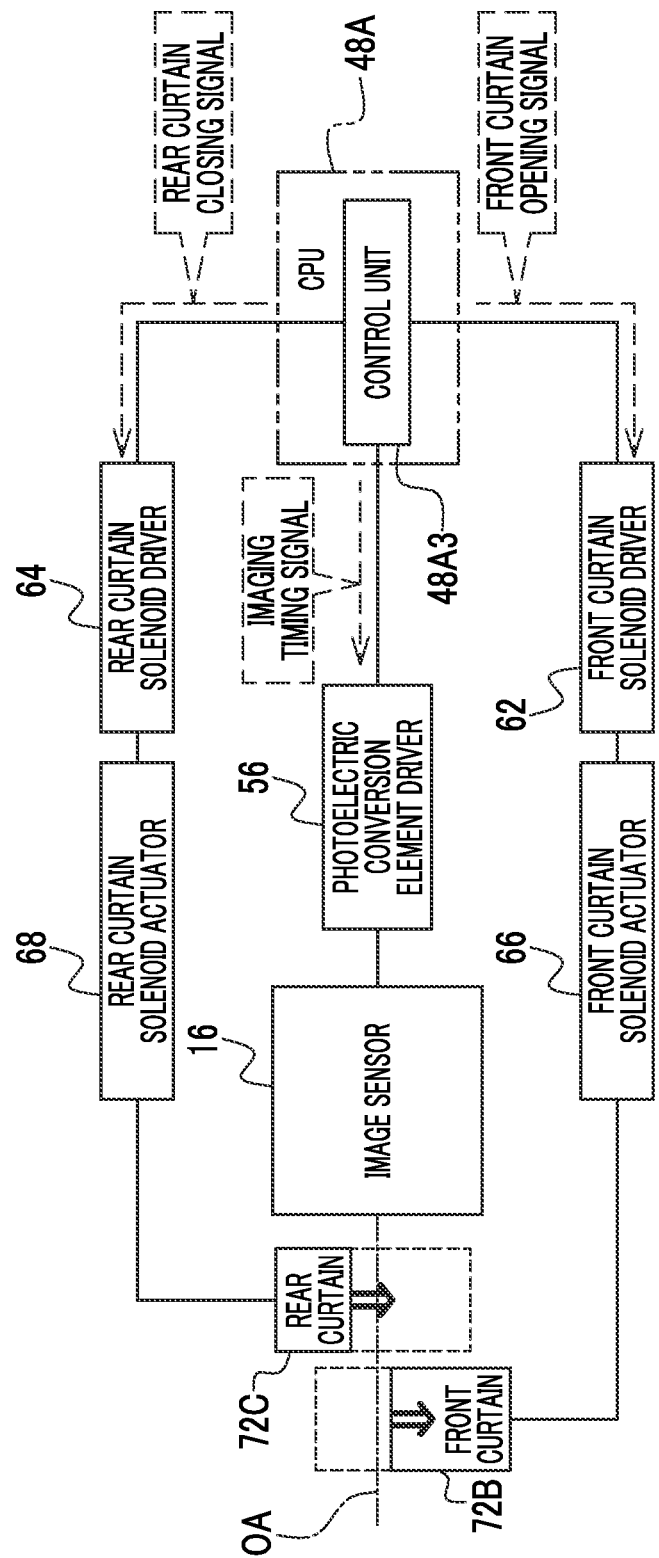
FIG. 14 is a block diagram showing an example of a content of processing performed in a main exposure period during continuous imaging in the imaging apparatus according to the embodiment.

In the period in which the main exposure is performed in the continuous imaging period (hereinafter, also referred to as a "main exposure period"), as shown in FIG. 14 as an example, the control unit 48A3 outputs the front curtain closing signal described above to the front curtain solenoid driver 62, and outputs a rear curtain closing signal to the rear curtain solenoid driver 64 with a delay of a time in accordance with a predetermined shutter speed after the front curtain closing signal is output. The rear curtain closing signal is a signal for giving an instruction for closing the aperture 72A1 by the rear curtain 72C.

The front curtain solenoid driver 62 starts the pulling down of the front curtain 72B by controlling the front curtain solenoid actuator 66 in response to the front curtain closing signal input from the control unit 48A3. The rear curtain solenoid driver 64 starts the pulling down of the rear curtain 72C by controlling the rear curtain solenoid actuator 68 in response to the rear curtain closing signal input from the control unit 48A3. As a result, the mechanical shutter 72 transitions from the front curtain closed state to the rear curtain closed state. While the mechanical shutter 72 transitions from the front curtain closed state to the rear curtain closed state, the control unit 48A3 outputs the imaging timing signal to the photoelectric conversion element driver 56, and the photoelectric conversion element driver 56 causes the image sensor 16 to perform the main exposure in response to the imaging timing signal input from the control unit 48A3.

Figure 15:
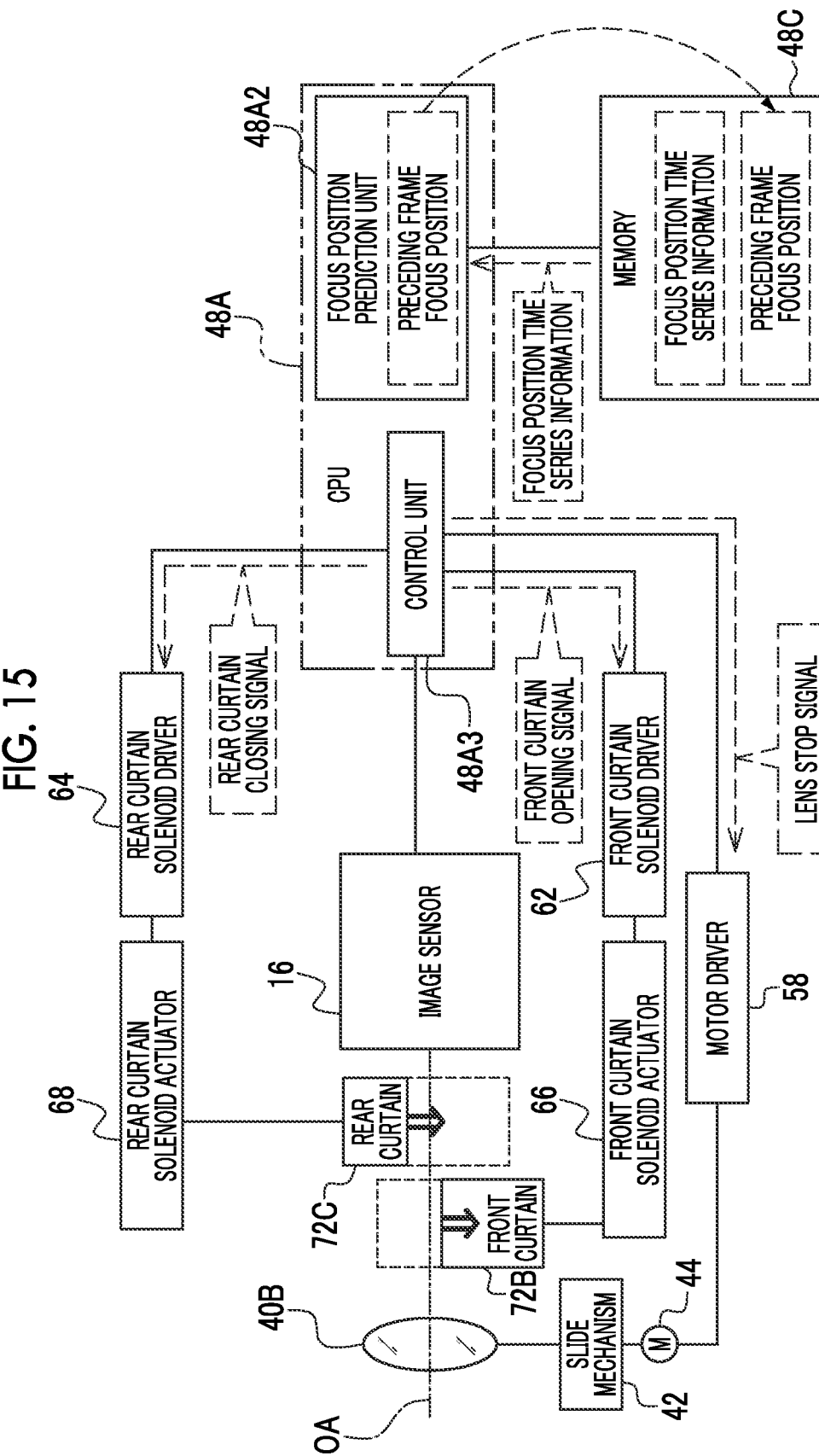
FIG. 15 is a block diagram showing an example of a content of processing performed in the main exposure period of a first frame of the continuous imaging in the imaging apparatus according to the embodiment.

In a case in which the timing at which the main exposure of the first frame of the continuous imaging is started arrives, even in a case in which the focus lens 40B does not reach the focus position at the start of the continuous imaging, as an example, as shown in FIG. 15, the control unit 48A3 outputs a lens stop signal for giving an instruction for stopping the focus lens 40B to the motor driver 58. The motor driver 58 stops the focus lens 40B by controlling the motor 44 in response to the lens stop signal input from the control unit 48A3.

In addition, the focus position prediction unit 48A2 acquires the focus position time series information from the memory 48C, and predicts, based on the acquired focus position time series information, the focus position (hereinafter, also referred to as a "preceding frame focus position") of the focus lens 40B with respect to the focus target region of the preceding frame. In the example shown in FIG. 15, as the preceding frame focus position, the focus position of the focus lens 40B with respect to the focus target region in a frame that is one frame ahead is predicted by the focus position prediction unit 48A2. Here, the focus position of the focus lens 40B with respect to the focus target region in a frame that is one frame ahead is an example of a "fourth focus position" according to the technology of the present disclosure.

The focus position prediction unit 48A2 stores the predicted preceding frame focus position in the memory 48C. The preceding frame focus position stored in the memory 48C is updated to the latest preceding frame focus position each time the preceding frame focus position is predicted by the focus position prediction unit 48A2.

Figure 16:
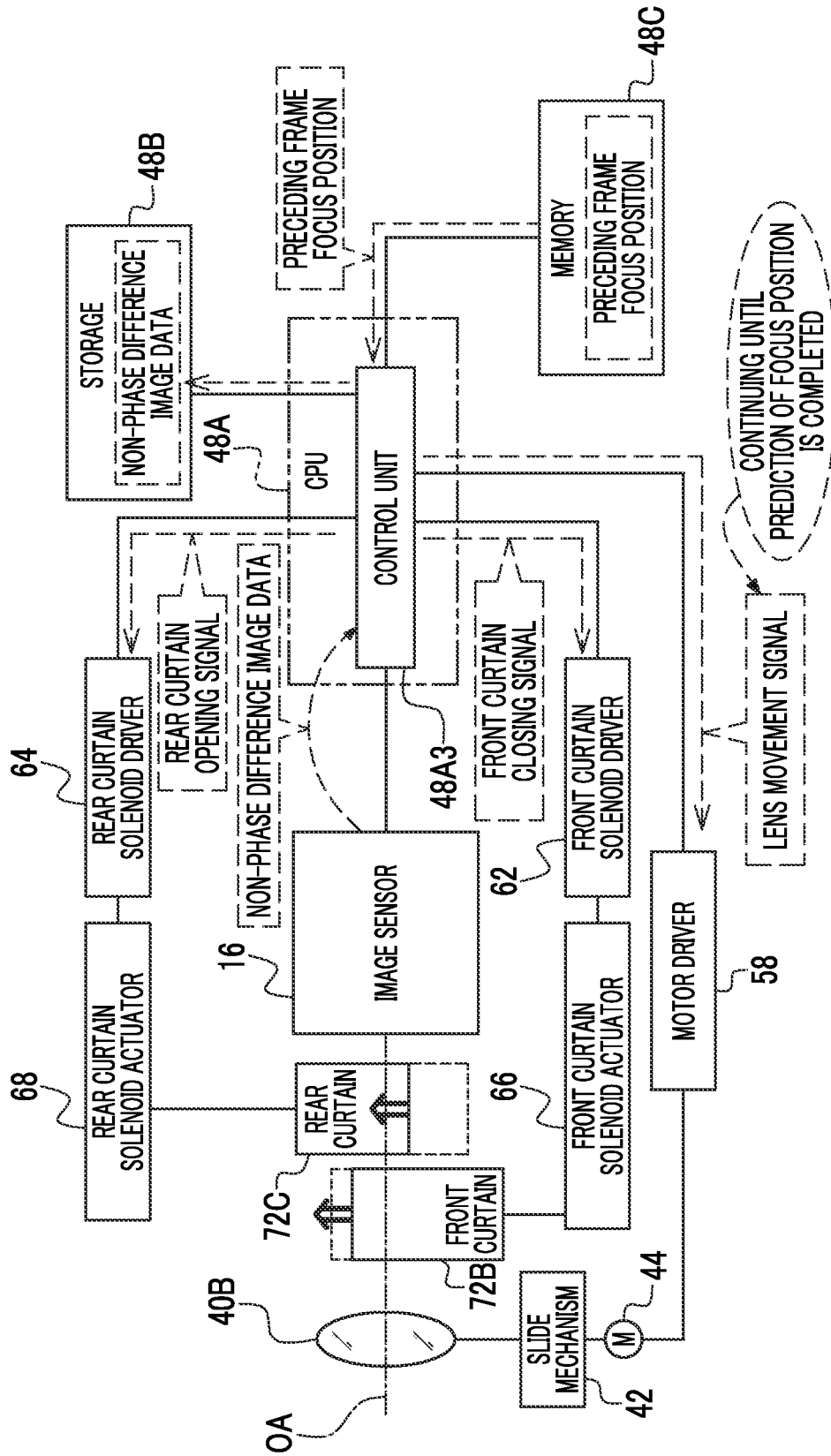
FIG. 16 is a block diagram showing an example of a content of processing from the end of the main exposure period of the first frame of the continuous imaging to the front curtain closed state in the imaging apparatus according to the embodiment.

At the end of the main exposure period of the first frame of the continuous imaging, the mechanical shutter 72 is in the rear curtain closed state. Therefore, as a preparatory stage for starting the next imaging for the live view image, as shown in FIG. 16 as an example, the control unit 48A3 outputs the front curtain closing signal to the front curtain solenoid driver 62. The front curtain solenoid driver 62 starts the winding of the front curtain 72B by controlling the front curtain solenoid actuator 66 in response to the front curtain closing signal input from the control unit 48A3. In addition, in a case in which the winding of the front curtain 72B is completed, the control unit 48A3 outputs the rear curtain closing signal to the rear curtain solenoid driver 64. The rear curtain solenoid driver 64 starts the winding of the rear curtain 72C by controlling the rear curtain solenoid actuator 68 in response to the rear curtain closing signal input from the control unit 48A3. In a case in which the winding of the rear curtain 72C is completed, the mechanical shutter 72 is in the front curtain closed state.

In a period from the end of the main exposure period of the first frame of the continuous imaging to the front curtain closed state, the control unit 48A3 acquires the latest preceding frame focus position from the memory 48C, generates the lens movement signal in accordance with the acquired preceding frame focus position, and outputs the generated lens movement signal to the motor driver 58. Here, the lens movement signal generated and output by the control unit 48A3 is a signal for giving an instruction for moving the focus lens 40B to the latest preceding frame focus position. The motor driver 58 operates the slide mechanism 42 in response to the lens movement signal input from the control unit 48A3 to move the focus lens 40B along the optical axis OA toward the latest preceding frame focus position until the main exposure of the second frame is started. It should be noted that the output of the lens movement signal based on the latest preceding frame focus position by the control unit 48A3 is continued until the prediction of the preceding frame focus position toward the frame after the next frame (for example, the third frame of the continuous imaging) of the continuous imaging is completed in the current frame (for example, the first frame of the continuous imaging) of the continuous imaging.

In addition, in a period from the end of the main exposure period of the first frame of the continuous imaging to the front curtain closed state of the mechanical shutter 72, the control unit 48A3 acquires the non-phase difference image data from the image sensor 16 via the image memory 50 and stores the acquired non-phase difference image data in the storage 48B.

In a case in which the mechanical shutter 72 reaches the front curtain closed state, the imaging for the live view image of the first frame of the continuous imaging is started. In each frame of the continuous imaging, the imaging for the live view image for three frames is performed. In the period in which the imaging for the live view image of the first frame of the continuous imaging is performed, the imaging apparatus 10 performs the same processing as the example shown in FIG. 10.

Figure 17:
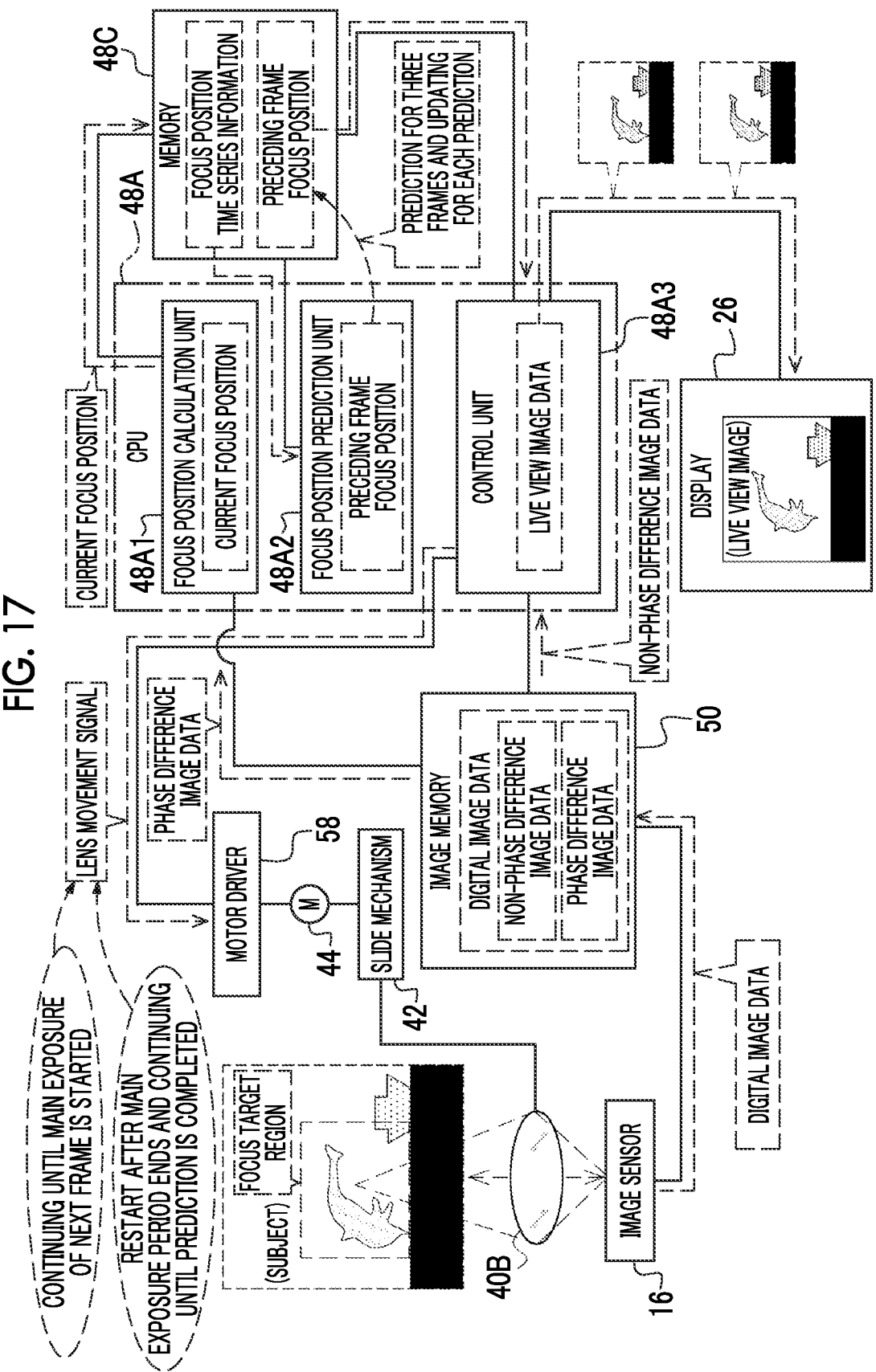
FIG. 17 is a block diagram showing an example of a content of processing in a period in which imaging for a live view image of a first frame of the continuous imaging is performed in the imaging apparatus according to the embodiment.

In addition, as an example, as shown in FIG. 17, the focus position calculation unit 48A1 acquires the phase difference image data from the image memory 50 as in the example shown in FIG. 11 while the imaging for the live view image of the first frame of the continuous imaging is performed. The focus position calculation unit 48A1 performs the AF calculation based on the acquired phase difference image data to derive the current focus position. Then, the focus position calculation unit 48A1 updates the focus position time series information in the memory 48C by storing the derived current focus position in the memory 48C, as in the example shown in FIG. 11.

It should be noted that, even in the second and subsequent frames of the continuous imaging, the current focus position is stored in the memory 48C, so that the focus position time series information in the memory 48C is updated. The focus position time series information obtained by being updated in the second and subsequent frames includes the current focus position obtained by the AF calculation in the latest frame in which the latest main exposure is performed, and the current focus position obtained by the AF calculation in the past frame temporally adjacent to the latest frame. It should be noted that, for example, in a case in which N is a natural number of 2 or more and the latest frame is the Nth frame, the past frame refers to the (N−1)th frame.

While the imaging for the live view image of the first frame of the continuous imaging is performed, the focus position prediction unit 48A2 predicts the preceding frame focus position with reference to the current focus position for a plurality of frames. Here, the focus position time series information corresponds to the current focus position for a plurality of frames. Therefore, the focus position prediction unit 48A2 acquires the focus position time series information from the memory 48C, and predicts the preceding frame focus position based on the acquired focus position time series information. Here, as the preceding frame focus position, the focus position of the focus lens 40B with respect to the focus target region in a frame that is two frames ahead in the continuous imaging is predicted by the focus position prediction unit 48A2. The focus position prediction unit 48A2 updates the preceding frame focus position in the memory 48C by storing the predicted preceding frame focus position in the memory 48C. Here, the preceding frame focus position predicted by the focus position prediction unit 48A2, that is, the focus position of the focus lens 40B with respect to the focus target region in a frame that is two frames ahead in the continuous imaging, is an example of a "second focus position" according to the technology of the present disclosure.

In the period in which the imaging for the live view image of the first frame of the continuous imaging is performed, the imaging for the live view image for three frames is performed by the image sensor 16 under the control of the CPU 48A. In addition, the live view image is displayed on the display 26 as in the example shown in FIG. 11. In the period in which imaging for the live view image of the first frame of the continuous imaging is performed, the imaging for the live view image for three frames is performed, so that the live view image for three frames is displayed on the display 26. In addition, in the second and subsequent frames of the continuous imaging, as in the first frame of the continuous imaging, the imaging for the live view image for three frames is performed. That is, the imaging for the live view image for three frames is performed in the continuous imaging interval. Here, the imaging for the live view image for three frames is performed is described, but the imaging for the live view image for one frame may be performed, the imaging for the live view image for two frames may be performed, and the imaging for the live view image for four or more frames may be performed.

In this way, the image sensor 16 performs the imaging for the live view image for three frames in the continuous imaging interval, that is, for each frame of the continuous imaging. Then, the AF calculation by the focus position calculation unit 48A1 and the prediction of the preceding frame focus position by the focus position prediction unit 48A2 are also performed three times. In this case, the focus position time series information in the memory 48C is updated each time the AF calculation is performed, and the preceding frame focus position in the memory 48C is updated each time the prediction of the preceding frame focus position is performed. The same processing is performed for each frame in the second and subsequent frames of the continuous imaging. It should be noted that the focus position time series information updated in the second and subsequent frames of the continuous imaging is an example of "a plurality of first focus positions" according to the technology of the present disclosure.

The control unit 48A3 acquires the latest preceding frame focus position from the memory 48C, generates the lens movement signal in accordance with the acquired preceding frame focus position, and outputs the generated lens movement signal to the motor driver 58. Here, the lens movement signal generated and output by the control unit 48A3 is a signal for giving an instruction for moving the focus lens 40B to the latest preceding frame focus position. Here, the latest preceding frame focus position refers to the focus position of the focus lens 40B with respect to the focus target region in a frame that is two frames ahead in the continuous imaging (two frames ahead of the frame in which the main exposure for the continuous imaging is performed). Therefore, in the period in which the imaging for the live view image is performed, the motor driver 58 operates the slide mechanism 42 in response to the lens movement signal input from the control unit 48A3 to move the focus lens 40B along the optical axis OA toward the latest preceding frame focus position.

In addition, the output of the lens movement signal based on the latest preceding frame focus position by the control unit 48A3 is continued until the start of the main exposure of the next frame. For example, in a case in which the current frame of the continuous imaging is the first frame, the control unit 48A3 continues to output the lens movement signal based on the latest preceding frame focus position until the start of the main exposure of the second frame of the continuous imaging. Then, after the end of the main exposure period of the next frame, the output of the lens movement signal based on the latest preceding frame focus position by the control unit 48A3 is restarted and continued until the prediction (prediction of the third frame in the prediction for three frames of the imaging for the live view image) of the preceding frame focus position in the next frame is completed. In a case in which the current frame of the continuous imaging is the first frame, after the main exposure period of the second frame ends, the output of the lens movement signal based on the latest preceding frame focus position by the control unit 48A3 is restarted and continued until the prediction (prediction of the third frame in the prediction for three frames of the imaging for the live view image) of the preceding frame focus position in the second frame is completed.

Figure 18:
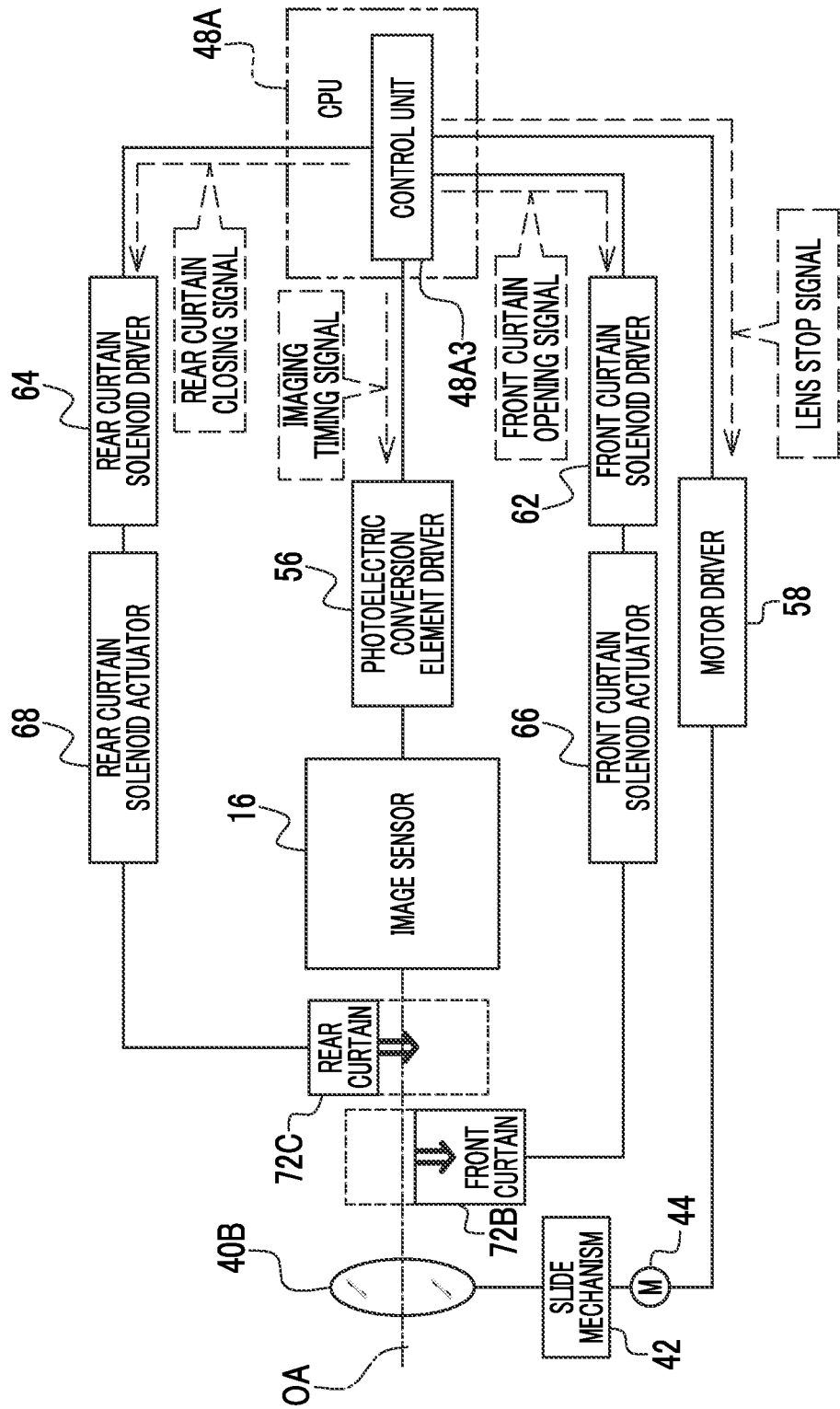
FIG. 18 is a block diagram showing an example of a content of processing performed in the main exposure period of second and subsequent frames of the continuous imaging in the imaging apparatus according to the embodiment.

Even in the second frame of the continuous imaging, first, as shown in FIG. 12 as an example, the mechanical shutter 72 is in the front curtain closed state. The same applies to the third and subsequent frames of the continuous imaging. In the main exposure period in the second and subsequent frames of the continuous imaging, as shown in FIG. 18 as an example, the control unit 48A3 operates the front curtain solenoid actuator 66 as in the example shown in FIG. 14 to start the pulling down of the front curtain 72B, and then operates the rear curtain solenoid actuator 68 with a delay to start the pulling down of the rear curtain 72C.

In this way, in a case in which the timing for starting the main exposure arrives, even in a case in which the focus lens 40B does not reach the latest preceding frame focus position, the control unit 48A3 outputs the lens stop signal to the motor driver 58 as in the example shown in FIG. 15. The motor driver 58 stops the focus lens 40B by controlling the motor 44 in response to the lens stop signal input from the control unit 48A3.

Next, the action of the imaging apparatus 10 will be described with reference to FIGS. 19A to 19D.

FIGS. 19A to 19D show examples of a flow of the focus control processing performed by the CPU 48A. It should be noted that, in the following, for convenience of description, the description will be made on premise that the imaging mode is set for the imaging apparatus 10. In addition, in the following description, for convenience of description, the description will be made on premise that the continuous imaging is started in a case in which the release button 18 is in the full push state. In addition, in the following, for convenience of description, the description will be made on premise that the mechanical shutter 72 is in the fully opened state as the premise that the imaging for the live view image is performed. In addition, in the following, for convenience of description, the description will be made on premise that the frame rate of the imaging for the live view image is 60 fps, and the frame rate of the continuous imaging is 8 fps.

In the focus control processing shown in FIG. 19A, first, in step ST100, the control unit 48A3 determines whether or not the imaging timing for the live view image arrives. The imaging timing for the live view image refers to, for example, a timing for each time interval defined by the frame rate of the imaging for the live view image. In step ST100, in a case in which the imaging timing for the live view image does not arrive, a negative determination is made, and the focus control processing proceeds to step ST114. In step ST100, in a case in which the imaging timing for the live view image arrives, a positive determination is made, and the focus control processing proceeds to step ST102.

In step ST102, the control unit 48A3 causes the image sensor 16 to perform the imaging for the live view image, and then the focus control processing proceeds to step ST104. The non-phase difference image data and the phase difference image data obtained by performing the imaging for the live view image by the image sensor 16 are stored in the image memory 50. The image indicated by the non-phase difference image data is displayed on the display 26 as the live view image.

In step ST104, the focus position calculation unit 48A1 acquires the latest phase difference image data from the image memory 50, and then the focus control processing proceeds to step ST106.

In step ST106, the focus position calculation unit 48A1 derives the current focus position by performing the AF calculation based on the phase difference image data acquired in step ST104, and then the focus control processing proceeds to step ST108.

In step ST108, the focus position calculation unit 48A1 updates the focus position time series information by storing the current focus position derived in step ST106 in the memory 48C, and then the focus control processing proceeds to step ST110.

In step ST110, the focus position prediction unit 48A2 acquires the focus position time series information from the memory 48C to predict the focus position at the start of the continuous imaging based on the acquired focus position time series information, and then the focus control processing proceeds to step ST112.

In step ST112, the control unit 48A3 controls the motor 44 via the motor driver 58 to start the movement of the focus lens 40B toward the focus position at the start of the continuous imaging predicted in step ST110, and then the focus control processing proceeds to step ST114.

In step ST114, the control unit 48A3 determines whether or not the continuous imaging start timing arrives. In step ST114, in a case in which the continuous imaging start timing does not arrive, a negative determination is made, and the focus control processing proceeds to step ST100. In step ST114, in a case in which the continuous imaging start timing arrives, a positive determination is made, and the focus control processing proceeds to step ST116.

In step ST116, the control unit 48A3 controls the front curtain solenoid actuator 66 via the front curtain solenoid driver 62 to start the winding of the front curtain 72B and to start the transition of the mechanical shutter 72 from the fully opened state to the front curtain closed state, and then the focus control processing proceeds to step ST118.

In step ST118, the control unit 48A3 determines whether or not the mechanical shutter 72 is in the front curtain closed state. In step ST118, in a case in which the mechanical shutter 72 is not in the front curtain closed state, a negative determination is made, and the determination in step ST118 is made again. In step ST118, in a case in which the mechanical shutter 72 is in the front curtain closed state, a positive determination is made, and the focus control processing proceeds to step ST120.

In step ST120, the control unit 48A3 determines whether or not the F-number at the present time of the stop 40C is the predetermined value. Here, the predetermined value refers to, for example, the F-number stored in the storage 48B. In step ST120, in a case in which the F-number at the present time of the stop 40C is the predetermined value, a negative determination is made, and the focus control processing proceeds to step ST124. In step ST120, in a case in which the F-number at the present time of the stop 40C is not the predetermined value, a positive determination is made, and the focus control processing proceeds to step ST122.

In step ST122, the control unit 48A3 controls the motor 46 to set the F-number of the stop 40C to the predetermined value, and then the focus control processing proceeds to step ST124.

In step ST124, the control unit 48A3 controls the motor 44 via the motor driver 58 to stop the focus lens 40B, and then the focus control processing proceeds to step ST126.

In step ST126, the control unit 48A3 operates the front curtain solenoid actuator 66 via the front curtain solenoid driver 62 to start the pulling down of the front curtain 72B, and then operates the rear curtain solenoid actuator 68 via the rear curtain solenoid driver 64 with a delay to start the pulling down of the rear curtain 72C. As a result, the mechanical shutter 72 is opened by the front curtain 72B and the rear curtain 72C, and the main exposure is started by the image sensor 16.

In next step ST128, the focus position prediction unit 48A2 acquires the focus position time series information from the memory 48C, and then the focus control processing proceeds to step ST130.

In step ST130, the focus position prediction unit 48A2 predicts the focus position in the second frame of the continuous imaging as the preceding frame focus position based on the focus position time series information acquired in step ST128, and then the focus control processing proceeds to step ST132.

In step ST132, the control unit 48A3 determines whether or not the main exposure by the image sensor 16 ends. In step ST132, in a case in which the main exposure by the image sensor 16 does not end, a negative determination is made, and the determination in step ST132 is made again. In step ST132, in a case in which the main exposure by the image sensor 16 ends, a positive determination is made, and the focus control processing proceeds to step ST134.

In step ST134, the control unit 48A3 causes the signal processing circuit 74 to output the non-phase difference image data to the image memory 50. As a result, the non-phase difference image data is stored in the image memory 50. Then, the control unit 48A3 reads out the non-phase difference image data from the image memory 50, and stores the read out non-phase difference image data in the storage 48B. After the processing of this step ST134 is performed, the focus control processing proceeds to step ST136.

In step ST136, the control unit 48A3 controls the motor 44 via the motor driver 58 to start the movement of the focus lens 40B toward the preceding frame focus position predicted in step ST130, and then the focus control processing proceeds to step ST138.

At the end of the main exposure, the mechanical shutter 72 is in the rear curtain closed state. Therefore, in step ST138, the control unit 48A3 starts the transition of the mechanical shutter 72 from the rear curtain closed state to the front curtain closed state. Specifically, first, the control unit 48A3 winds the front curtain 72B by controlling the front curtain solenoid actuator 66 via the front curtain solenoid driver 62. In a case in which the winding of the front curtain 72B is completed, the control unit 48A3 winds the rear curtain 72C by controlling the rear curtain solenoid actuator 68 via the rear curtain solenoid driver 64. In a case in which the winding of the rear curtain 72C is completed, the mechanical shutter 72 is in the front curtain closed state. After the processing of step ST138 is performed, the focus control processing proceeds to step ST140 shown in FIG. 19C.

Figure 19B:
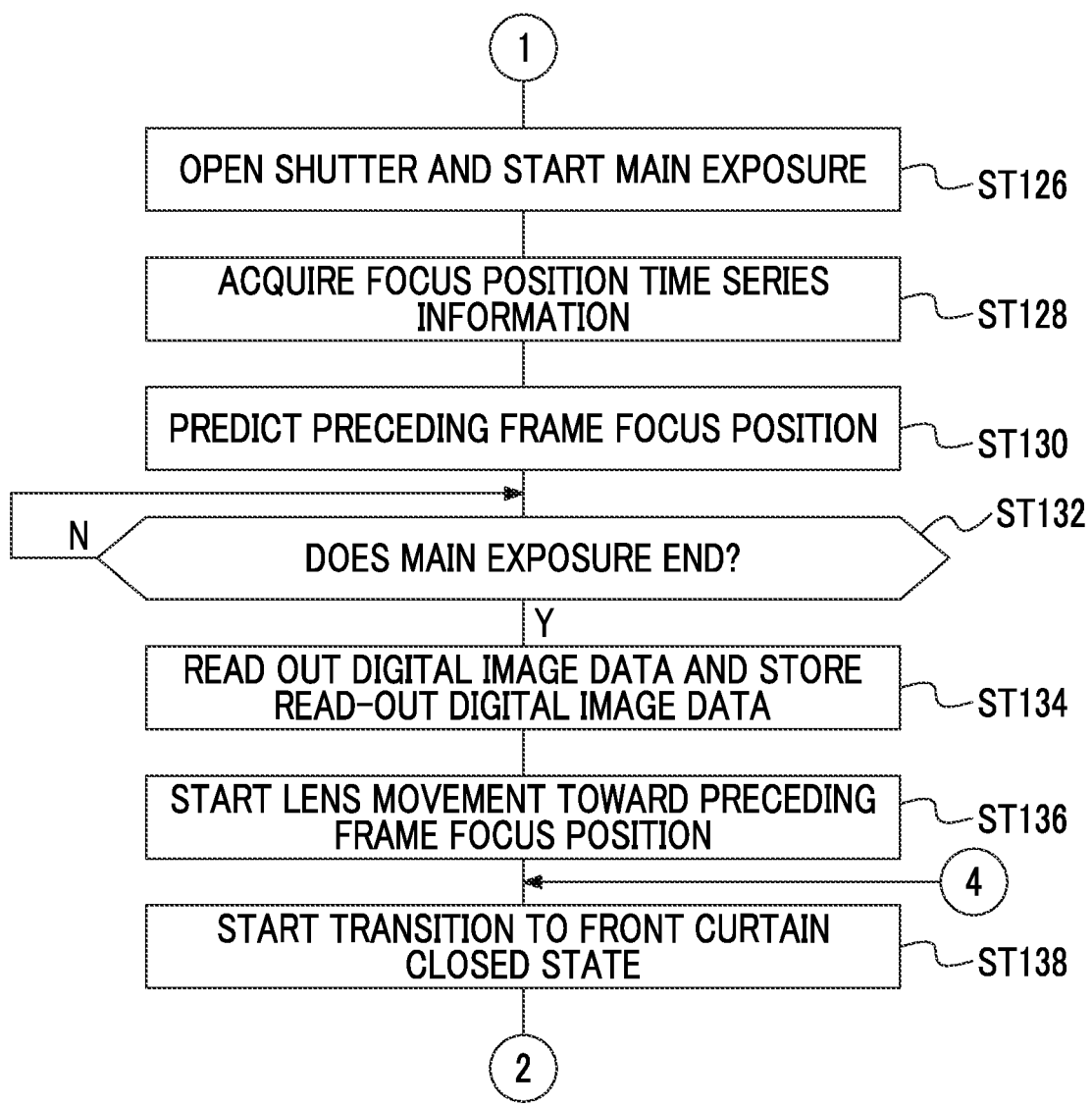
FIG. 19B is a continuation of the flowchart shown in FIG. 19A.
Figure 19C:
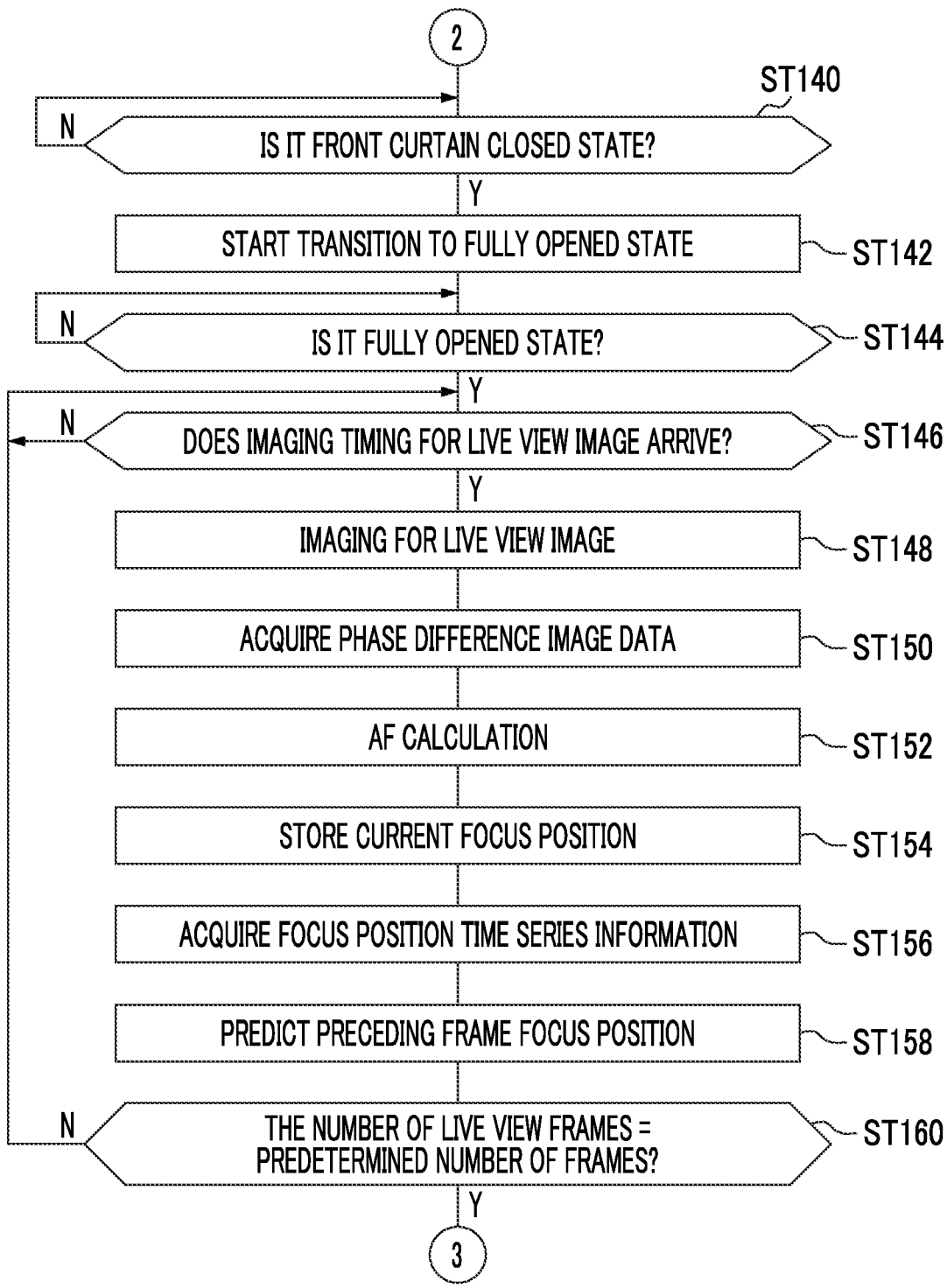
FIG. 19C is a continuation of the flowchart shown in FIG. 19B.

In step ST140 shown in FIG. 19C, the control unit 48A3 determines whether or not the mechanical shutter 72 is in the front curtain closed state. In step ST140, in a case in which the mechanical shutter 72 is not in the front curtain closed state, a negative determination is made, and the determination in step ST140 is made again. In step ST140, in a case in which the mechanical shutter 72 is in the front curtain closed state, a positive determination is made, and the focus control processing proceeds to step ST142.

In step ST142, the control unit 48A3 starts the transition of the mechanical shutter 72 from the front curtain closed state to the fully opened state. That is, the control unit 48A3 starts the pulling down of the front curtain 72B by controlling the front curtain solenoid actuator 66 via the front curtain solenoid driver 62, and then the focus control processing proceeds to step ST144.

In step ST144, a determination is made as to whether or not the mechanical shutter 72 is in the fully opened state. In step ST144, in a case in which the mechanical shutter 72 is not in the fully opened state, a negative determination is made, and the determination in step ST144 is made again. In step ST144, in a case in which the mechanical shutter 72 is in the fully opened state, a positive determination is made, and the focus control processing proceeds to step ST146.

In step ST146, the control unit 48A3 determines whether or not the imaging timing for the live view image described above arrives. In step ST146, in a case in which the imaging timing for the live view image does not arrive, a negative determination is made, and the determination in step ST146 is made again. In step ST146, in a case in which the imaging timing for the live view image arrives, a positive determination is made, and the focus control processing proceeds to step ST148.

In step ST148, the control unit 48A3 causes the image sensor 16 to perform the imaging for the live view image, and then the focus control processing proceeds to step ST150. The non-phase difference image data and the phase difference image data obtained by performing the imaging for the live view image by the image sensor 16 are stored in the image memory 50. The image indicated by the non-phase difference image data is displayed on the display 26 as the live view image.

In step ST150, the focus position calculation unit 48A1 acquires the latest phase difference image data from the image memory 50, and then the focus control processing proceeds to step ST152.

In step ST152, the focus position calculation unit 48A1 derives the current focus position by performing the AF calculation based on the phase difference image data acquired in step ST150, and then the focus control processing proceeds to step ST154.

In step ST154, the focus position calculation unit 48A1 updates the focus position time series information by storing the current focus position derived in step ST152 in the memory 48C, and then the focus control processing proceeds to step ST156.

In step ST156, the focus position prediction unit 48A2 acquires the focus position time series information from the memory 48C, and then the focus control processing proceeds to step ST158.

In step ST158, the focus position prediction unit 48A2 predicts the focus position in a frame that is two frames ahead in the continuous imaging as the preceding frame focus position based on the focus position time series information acquired in step ST156, and then the focus control processing proceeds to step ST160. The preceding frame focus position predicted by the focus position prediction unit 48A2 in this step ST158 is stored in the memory 48C, and the preceding frame focus position in the memory 48C is updated.

In step ST160, the control unit 48A3 determines whether or not the number of frames (hereinafter, referred to as "the number of live view frames") in which the imaging for the live view image of step ST148 is performed reaches a predetermined number of frames in a period from when the positive determination is made in step ST144 to the present time. Here, three frames are adopted as the predetermined number of frames. In step ST160, in a case in which the number of live view frames is smaller than the predetermined number of frames, a negative determination is made, and the focus control processing proceeds to step ST146. In step ST160, in a case in which the number of live view frames reaches the predetermined number of frames, a positive determination is made, and the focus control processing proceeds to step ST162 shown in FIG. 19D.

Figure 19D:
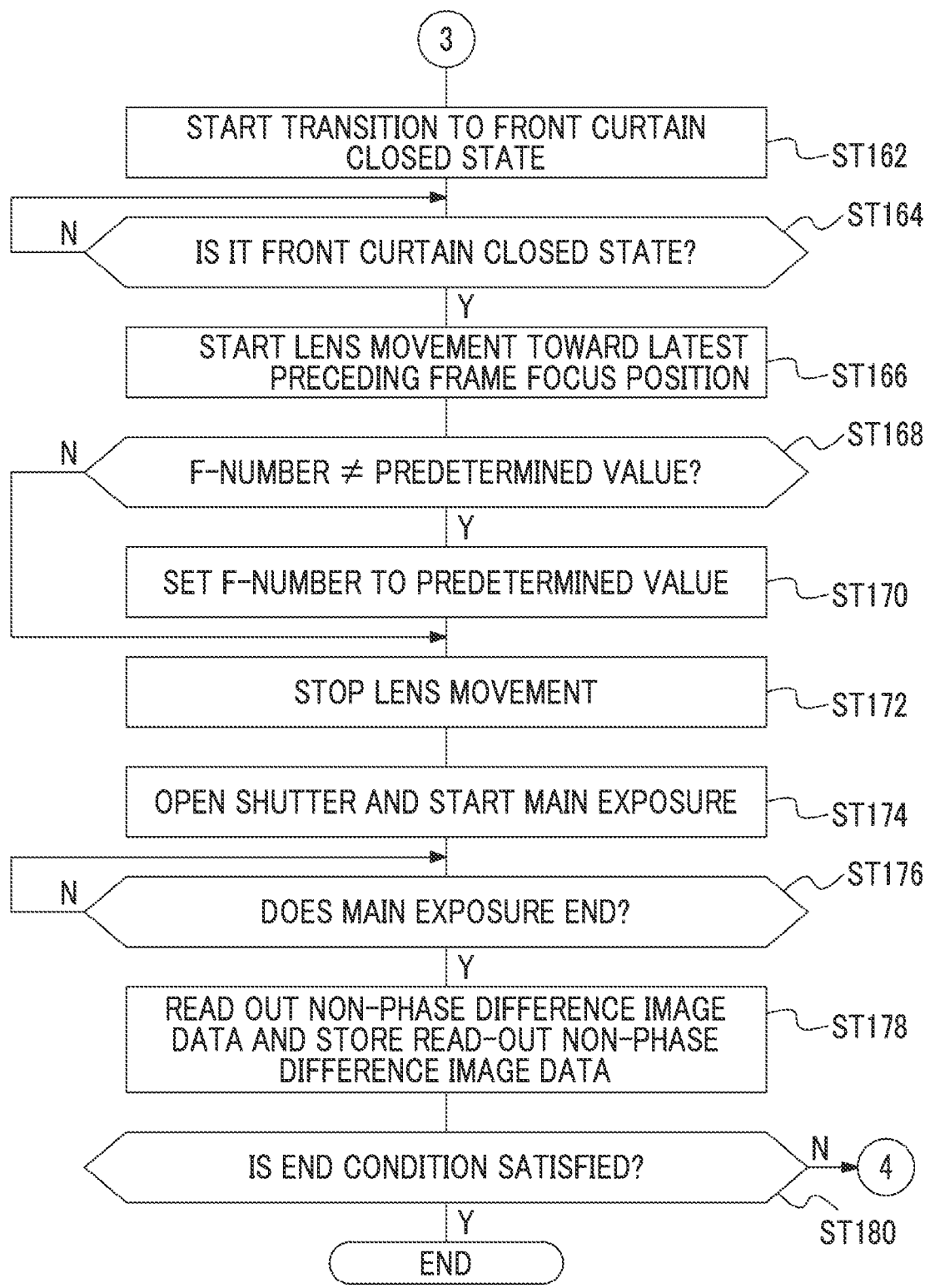
FIG. 19D is a continuation of the flowchart shown in FIG. 19C.

In step ST162 shown in FIG. 19D, the control unit 48A3 controls the front curtain solenoid actuator 66 via the front curtain solenoid driver 62 to start the winding of the front curtain 72B and to start the transition of the mechanical shutter 72 from the fully opened state to the front curtain closed state, and then the focus control processing proceeds to step ST164.

In step ST164, the control unit 48A3 determines whether or not the mechanical shutter 72 is in the front curtain closed state. In step ST164, in a case in which the mechanical shutter 72 is not in the front curtain closed state, a negative determination is made, and the determination in step ST164 is made again. In step ST164, in a case in which the mechanical shutter 72 is in the front curtain closed state, a positive determination is made, and the focus control processing proceeds to step ST166.

In step ST166, the control unit 48A3 acquires the latest preceding frame focus position from the memory 48C and controls the motor 44 via the motor driver 58 to start the movement of the focus lens 40B toward the latest preceding frame focus position, and then the focus control processing proceeds to step ST168.

In step ST168, the control unit 48A3 determines whether or not the F-number at the present time of the stop 40C is the predetermined value. In step ST168, in a case in which the F-number at the present time of the stop 40C is the predetermined value, a negative determination is made, and the focus control processing proceeds to step ST172. In step ST168, in a case in which the F-number at the present time of the stop 40C is not the predetermined value, a positive determination is made, and the focus control processing proceeds to step ST170.

In step ST170, the control unit 48A3 controls the motor 46 to set the F-number of the stop 40C to the predetermined value, and then the focus control processing proceeds to step ST172.

In step ST172, the control unit 48A3 controls the motor 44 via the motor driver 58 to stop the focus lens 40B, and then the focus control processing proceeds to step ST174.

In step ST174, the control unit 48A3 operates the front curtain solenoid actuator 66 via the front curtain solenoid driver 62 to start the pulling down of the front curtain 72B, and then operates the rear curtain solenoid actuator 68 via the rear curtain solenoid driver 64 with a delay to start the pulling down of the rear curtain 72C. As a result, the mechanical shutter 72 is opened by the front curtain 72B and the rear curtain 72C, and the main exposure is started by the image sensor 16.

In next step ST176, the control unit 48A3 determines whether or not the main exposure by the image sensor 16 ends. In step ST176, in a case in which the main exposure by the image sensor 16 does not end, a negative determination is made, and the determination in step ST176 is made again. In step ST176, in a case in which the main exposure by the image sensor 16 ends, a positive determination is made, and the focus control processing proceeds to step ST178.

In step ST178, the control unit 48A3 causes the signal processing circuit 74 to output the non-phase difference image data to the image memory 50. As a result, the non-phase difference image data is stored in the image memory 50. Then, the control unit 48A3 reads out the non-phase difference image data from the image memory 50, and stores the read out non-phase difference image data in the storage 48B. After the processing of this step ST178 is performed, the focus control processing proceeds to step ST180.

In step ST180, the control unit 48A3 determines whether or not a condition for ending the focus control processing (hereinafter, also referred to as an "end condition") is satisfied. Examples of the end condition include a condition that the full push state of the release button 18 is released. In step ST180, in a case in which the end condition is not satisfied, a negative determination is made, and the focus control processing proceeds to step ST138 shown in FIG. 19B. In step ST180, in a case in which the end condition is satisfied, a positive determination is made, and the focus control processing ends.

As described above, in the imaging apparatus 10, the current focus position of the focus lens 40B with respect to the focus target region is calculated in each frame in which the main exposure is performed in the continuous imaging period, and the preceding frame focus position with respect to the focus target region in a frame that is two frames ahead is predicted based on the current focus position in the continuous imaging period. Then, the focus lens 40B is moved toward the preceding frame focus position while avoiding the main exposure period.

For example, in a case in which N is a natural number, in a case in which the preceding frame focus position (for example, the focus position in a frame that is two frames ahead in the continuous imaging) is predicted at the completion of the Nth frame of the continuous imaging, in a period from the completion of the prediction of the preceding frame focus position at the completion of the Nth frame of the continuous imaging to the completion of the prediction of the preceding frame focus position (for example, the focus position in a frame that is two frames ahead in the continuous imaging) at the completion of the (N+1)th frame of the continuous imaging, the focus lens 40B is moved toward the latest preceding frame focus position while avoiding the main exposure period. Therefore, in the imaging apparatus 10 according to the present embodiment, a long movement distance of the focus lens 40B can be secured as compared with a case in which the focus lens 40B is moved toward the focus position predicted for a frame, which is one frame ahead, for each frame in which the main exposure is performed in the continuous imaging period. As a result, it is possible to bring the focus lens 40B close to the predicted preceding frame focus position as compared with a case in which the focus lens 40B is moved toward the focus position predicted for a frame, which is one frame ahead, for each frame in which the main exposure is performed in the continuous imaging period.

Therefore, with the present configuration, in a case in which the continuous imaging is performed with respect to the focus target region, it is possible to make the focus position of the focus lens 40B follow the focus target region without increasing the time interval of the continuous imaging (without reducing the frame rate for the continuous imaging).

In addition, in the imaging apparatus 10, the current focus position is calculated for each frame in which the main exposure is performed in the continuous imaging period, and the preceding frame focus position with respect to the focus target region in a frame that is two frames ahead is predicted based on the calculated current focus position. Therefore, with the present configuration, it is possible to improve the followability of the focus position of the focus lens 40B to the focus target region as compared with a case in which the current focus position is calculated after the main exposure is performed a plurality of times and in which the preceding frame focus position is predicted based on the calculated current focus position.

In addition, in the imaging apparatus 10, the focus position in a frame ahead of the current frame by two frames is predicted with reference to the current focus position in the continuous imaging period. As a result, the focus lens 40B can be moved toward the predicted focus position in a frame that is two frames ahead. Therefore, with the present configuration, it is possible to make the focus lens 40B easily reach the predicted focus position as compared with a case in which the focus position in a frame ahead of the current frame by one frame is predicted and the focus lens 40B is moved toward the predicted focus position. It should be noted that the focus position in a frame, which is three or more frames ahead, may be predicted based on the calculated current focus position, and in this case, the same effect can be obtained.

In addition, in the imaging apparatus 10, the preceding frame focus position is predicted for each frame in which the main exposure is performed in the continuous imaging period. Therefore, with the present configuration, it is possible to improve the followability of the focus lens 40B to the focus target region as compared with a case in which the preceding frame focus position is not predicted for each frame in which the main exposure is performed.

In addition, in the imaging apparatus 10, the focus lens 40B is moved toward the latest predicted preceding frame focus position in the continuous imaging period. Therefore, with the present configuration, it is possible to accurately focus on the focus target region as compared with a case in which the focus lens 40B is moved toward the preceding frame focus position predicted and obtained in the past from the latest preceding frame focus position.

In addition, in the imaging apparatus 10, the AF calculation is performed based on the focus position time series information, and the preceding frame focus position is predicted with reference to the current focus position obtained by performing the AF calculation. The focus position time series information is the information indicating the time series of the current focus position. That is, the preceding frame focus position is predicted with reference to the current focus position for a plurality of frames. Therefore, with the present configuration, it is possible to improve the prediction accuracy of the preceding frame focus position as compared with a case in which the preceding frame focus position is predicted with reference to the current focus position for one frame.

In addition, in the imaging apparatus 10, the AF calculation is performed for each frame of the continuous imaging, and the current focus position obtained by performing the AF calculation is stored in the memory 48C, so that the focus position time series information is updated. Therefore, the focus position time series information updated in the second and subsequent frames of the continuous imaging includes the current focus position obtained by the AF calculation in the latest frame in which the latest main exposure is performed, and the current focus position obtained by the AF calculation in the past frame temporally adjacent to the latest frame. Then, in the imaging apparatus 10, the preceding frame focus position is predicted with reference to the focus position time series information. Therefore, with the present configuration, it is possible to improve the prediction accuracy of the preceding frame focus position (for example, the focus position in a frame that is two frames ahead in the continuous imaging) as compared with a case in which the preceding frame focus position (for example, the focus position in a frame that is two frames ahead in the continuous imaging) is predicted with reference to only a plurality of current focus positions obtained by the AF calculation in the frame of the main exposure performed later than the latest main exposure.

In addition, in the imaging apparatus 10, the imaging for the live view image is performed in the continuous imaging interval (between the frames of the continuous imaging). Therefore, with the present configuration, the live view image can be obtained even during the continuous imaging.

In addition, in the imaging apparatus 10, based on the phase difference image data obtained by performing the imaging for the live view image in the continuous imaging interval, the current focus position is calculated in the period in which the imaging for the live view image is performed in the continuous imaging interval. Therefore, with the present configuration, it is possible to quickly obtain the current focus position as compared with a case in which the current focus position is calculated after waiting for the end of the period in which the imaging for the live view image is performed. Then, since the current focus position is calculated, and then the preceding frame focus position is predicted with reference to the obtained current focus position, it is possible to quickly obtain the preceding frame focus position as compared with a case in which the preceding frame focus position is predicted with reference to the current focus position calculated and obtained after the period in which the imaging for the live view image is performed elapses.

In addition, in the imaging apparatus 10, the focus lens 40B is moved toward the preceding frame focus position by using the period in which the imaging for the live view image is performed. Therefore, with the present configuration, the focus lens 40B can be moved over a long distance as compared with a case in which the focus lens 40B is moved after waiting for the end of the imaging period for the live view image.

In addition, in the imaging apparatus 10, the imaging for the live view image for three frames is performed in the continuous imaging interval, and the current focus position is calculated each time the imaging for the live view image is performed. Therefore, with the present configuration, it is possible to increase the options of the current focus position used for predicting the preceding frame focus position as compared with a case in which only one current focus position is calculated while the imaging for the live view image for a plurality of frames is performed in the continuous imaging interval.

It should be noted that, in the present embodiment, the current focus position is calculated based on the phase difference image data obtained by performing the imaging for the live view image of the third frame in the imaging for the live view image for three frames in the continuous imaging interval, but the technology of the present disclosure is not limited to this, and the current focus position may be calculated based on the phase difference image data obtained by performing the imaging for the live view image of the first frame, the second frame, and/or the third frame. The current focus position may be calculated based on composite image data obtained by combining a plurality of phase difference image data obtained by performing the imaging for the live view image for a plurality of frames.

In addition, the imaging for the live view image for four or more frames may be performed in the continuous imaging interval, and in this case as well, the current focus position may be calculated based on the composite image data obtained by combining a plurality of phase difference image data obtained by performing the imaging for the live view image for a plurality of frames.

In addition, in the imaging apparatus 10, the current focus position is calculated based on the phase difference image data. Therefore, with the present configuration, the current focus position can be calculated more quickly as compared with a case in which the current focus position is calculated by a contrast AF method.

In addition, in the imaging apparatus 10, the lens stop signal is output to the motor driver 58 in a case in which the start timing of the main exposure arrives before the focus lens 40B reaches the preceding frame focus position. As a result, the focus lens 40B is stopped, and the main exposure is started in a state in which the focus lens 40B is stopped. Therefore, with the present configuration, it is possible to obtain an image with less distortion due to the movement of the focus lens 40B by the continuous imaging as compared with a case in which the focus lens 40B is moved even in a case in which the main exposure is started.

In addition, in the imaging apparatus 10, the focus position at the start of the continuous imaging is predicted in the previous stage of the start of the continuous imaging by the image sensor 16. The focus position at the start of the continuous imaging is the focus position of the focus lens 40B with respect to the focus target region in the first frame in a case in which the continuous imaging is started. Then, the focus lens 40B is moved toward the focus position at the start of the continuous imaging before the main exposure of the first frame of the continuous imaging is started. Therefore, with the present configuration, it is possible to focus on the focus target region even for the first frame of the continuous imaging by the image sensor 16.

In addition, in the imaging apparatus 10, the lens stop signal is output to the motor driver 58 in a case in which the start timing of the main exposure arrives before the focus lens 40B reaches the focus position at the start of the continuous imaging. As a result, the focus lens 40B is stopped, and the main exposure is started in a state in which the focus lens 40B is stopped. Therefore, with the present configuration, it is possible to obtain an image with less distortion due to the movement of the focus lens 40B by the imaging of the first frame of the continuous imaging by the image sensor 16, as compared with a case in which the focus lens 40B is moved even in a case in which the main exposure of the first frame of the continuous imaging by the image sensor 16 is started.

In addition, in the imaging apparatus 10, the preceding frame focus position of the focus lens 40B with respect to the focus target region in the second frame of the continuous imaging is predicted while the main exposure of the first frame of the continuous imaging is performed. The preceding frame focus position predicted here is the focus position of the focus lens 40B with respect to the focus target region in a frame that is one frame ahead, that is, the focus position of the focus lens 40B with respect to the focus target region in the second frame of the continuous imaging. Then, the focus lens 40B is moved toward the preceding frame focus position before the main exposure of the second frame of the continuous imaging is started. Therefore, with the present configuration, it is possible to focus on the focus target region even for the second frame of the continuous imaging by the image sensor 16.

Further, in the imaging apparatus 10, the lens stop signal is output to the motor driver 58 in a case in which the start timing of the main exposure arrives before the focus lens 40B reaches the preceding frame focus position predicted as the focus position in the second frame of the continuous imaging. As a result, the focus lens 40B is stopped, and the main exposure is started in a state in which the focus lens 40B is stopped. Therefore, with the present configuration, it is possible to obtain an image with less distortion due to the movement of the focus lens 40B by the imaging of the second frame of the continuous imaging by the image sensor 16, as compared with a case in which the focus lens 40B is moved even in a case in which the main exposure of the second frame of the continuous imaging by the image sensor 16 is started.

It should be noted that, in the embodiment described above, the form example is described in which the preceding frame focus position of the focus lens 40B with respect to the focus target region in the second frame of the continuous imaging is predicted while the main exposure of the first frame of the continuous imaging is performed, but the technology of the present disclosure is not limited to this. For example, the preceding frame focus position of the focus lens 40B with respect to the focus target region in the second frame of the continuous imaging may be predicted in a previous stage (for example, the imaging period for the live view image shown in FIG. 8) before the continuous imaging by the image sensor 16 is started, and the movement of the focus lens 40B toward the preceding frame focus position predicted here may be started. As a result, it is possible to focus on the focus target region even for the second frame of the continuous imaging by the image sensor 16. In addition, the preceding frame focus position of the focus lens 40B with respect to the focus target region of the second frame of the continuous imaging may be predicted between a timing at which the continuous imaging by the image sensor 16 is started and a timing at which the main exposure of the first frame of the continuous imaging is started (for example, while the mechanical shutter 72 transitions from the fully opened state to the front curtain closed state). In this case as well, the same effect can be expected.

Figure 20:
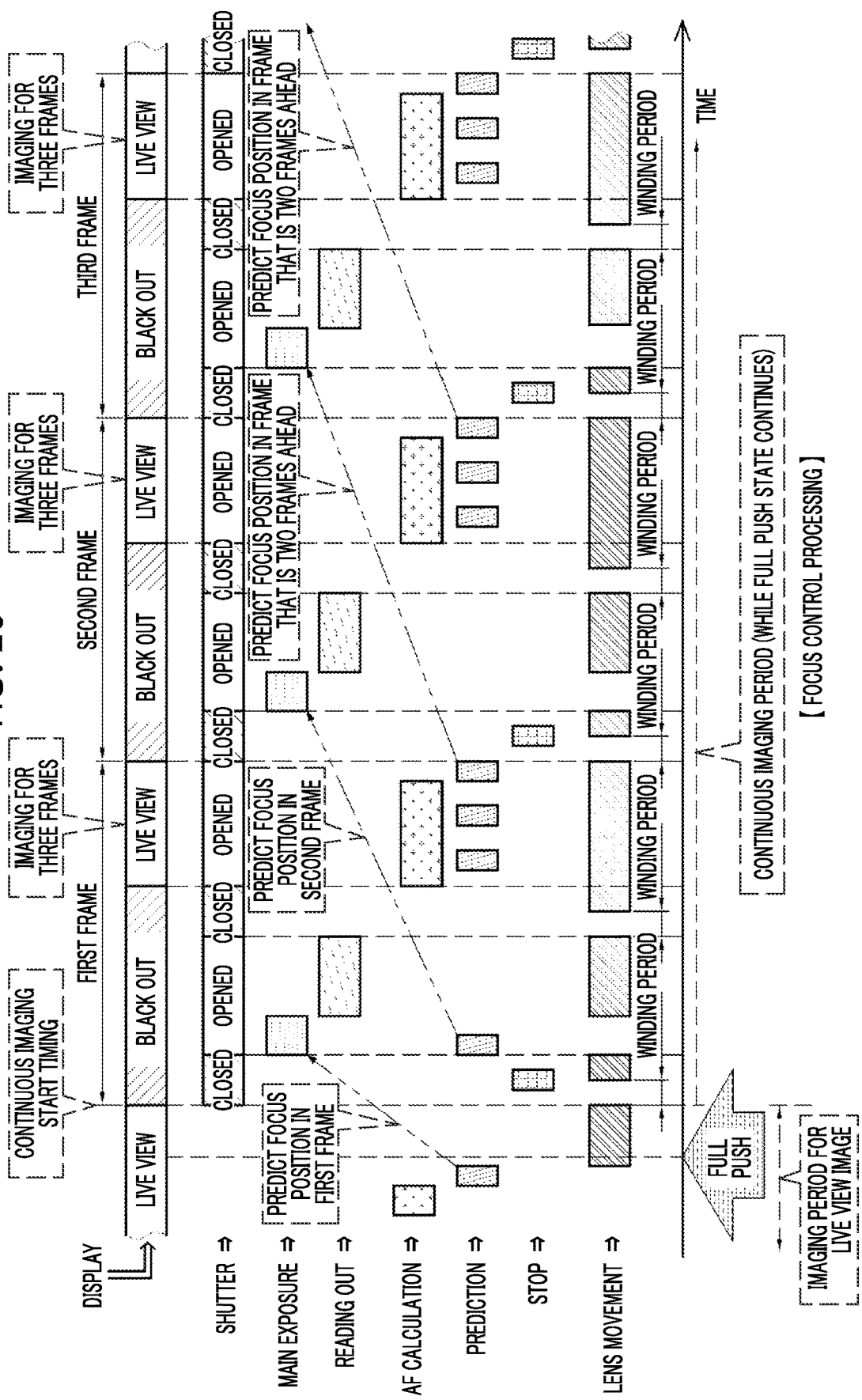
FIG. 20 is a time chart showing a first modification example of the processing content of the focus control processing according to the embodiment.

In addition, in the embodiment described above, for example, the form example is described in which the focus lens 40B is moved even in a period in which the front curtain 72B and the rear curtain 72C are wound in a case in which the mechanical shutter 72 transitions from the fully opened state to the front curtain closed state, but the technology of the present disclosure is not limited to this. For example, as shown in FIG. 20, the control unit 48A3 may control the motor 44 via the motor driver 58 to move the focus lens 40B while avoiding a winding period required for winding at least one of the front curtain 72B or the rear curtain 72C. Therefore, with the present configuration, the power consumption of the imaging apparatus 10 can be reduced as compared with a case in which the focus lens 40B is continuously moved even in the winding period.

Figure 21:
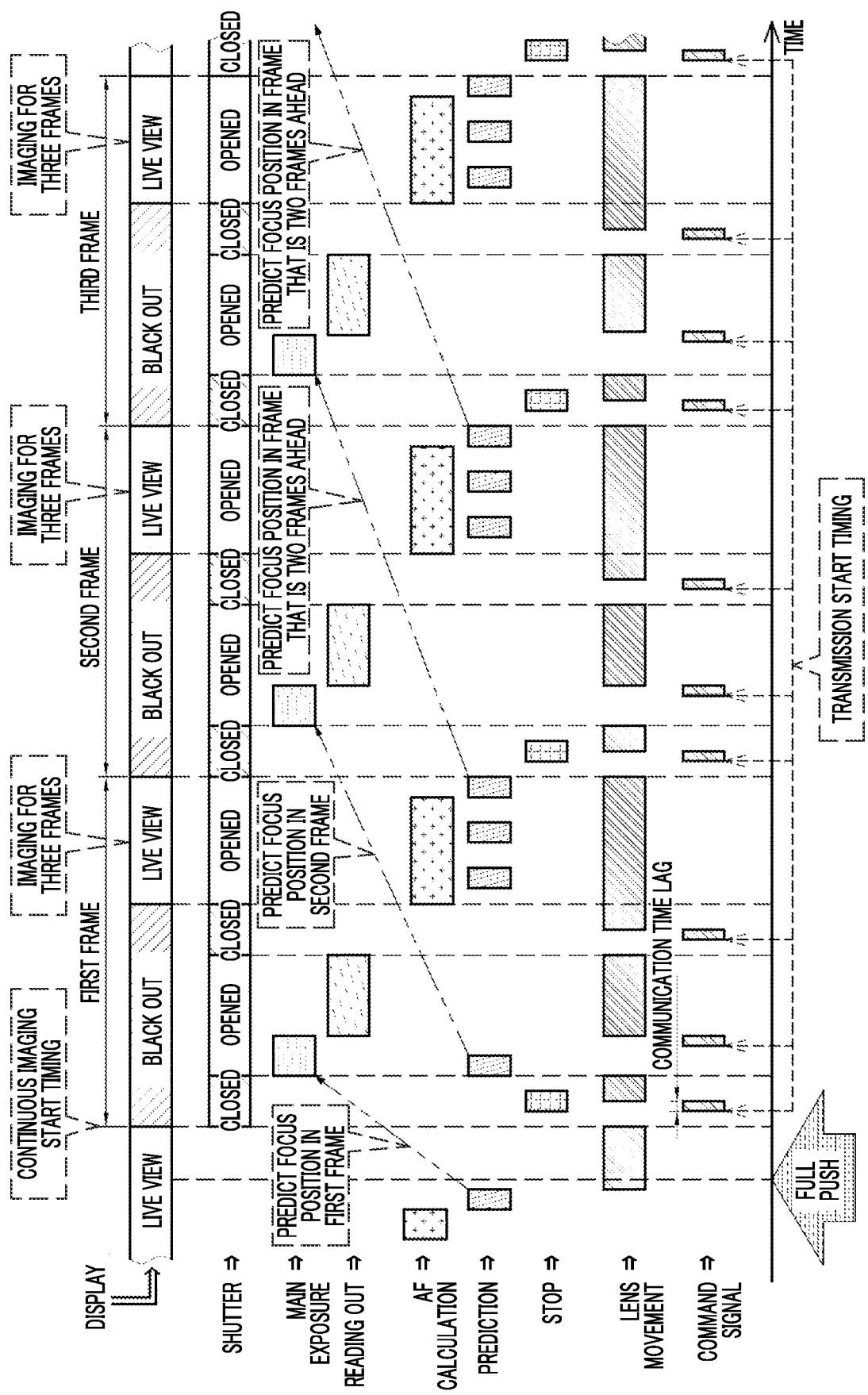
FIG. 21 is a time chart showing a second modification example of the processing content of the focus control processing according to the embodiment.

In addition, in a case in which the focus lens 40B is moved while avoiding the winding period, as shown in FIG. 21 as an example, the control unit 48A3 may transmit a command signal for giving an instruction for moving the focus lens 40B to the imaging lens 40 at a predetermined transmission start timing in consideration of a communication time lag between the control unit 48A3 and the imaging lens 40. That is, the control unit 48A3 need only transmit the command signal to the imaging lens 40 earlier than the end of the winding of the mechanical shutter 72 by the communication time lag between the control unit 48A3 and the imaging lens 40. It should be noted that, here, the command signal includes the lens movement signal described above and a signal generated by the motor driver 58 based on the lens movement signal and output to the motor 44. In this way, by transmitting the command signal to the imaging lens 40 earlier than the end of the winding of the mechanical shutter 72 by the communication time lag between the control unit 48A3 and the imaging lens 40, it is possible to secure a long movement time of the focus lens 40B as compared with a case in which the command signal is transmitted to the imaging lens 40 without considering the communication time lag between the control unit 48A3 and the imaging lens 40.

In addition, in the embodiment described above, the use of the F-number stored in the storage 48B is not limited, but the use of the F-number stored in the storage 48B is various. For example, the F-number stored in the storage 48B may be an F-number for imaging and an F-number for AF, the control unit 48A3 may set the size of the stop 40C to a size indicated by the F-number for imaging in the main exposure period, and the control unit 48A3 may set the size of the stop 40C to a size indicated by the F-number for AF in a period in which the AF calculation is performed, that is, the period in which the imaging for the live view image is performed.

In the period in which the imaging for the live view image is performed, the phase difference image data obtained by the imaging for the live view image is used for the AF calculation. Therefore, in order to improve the focus accuracy, it is preferable that the aperture of the stop 40C be larger than the size of the aperture used in the main exposure period. Therefore, in the storage 48B, the F-number for imaging and the F-number for AF, which are determined to have "the size of the aperture for the main exposure (hereinafter, referred to as a "first size")<the size of the aperture for the AF calculation (hereinafter, referred to as a "second size")", are stored. The F-number for imaging is an F-number indicating the first size, and the F-number for AF is an F-number indicating the second size.

Figure 22:
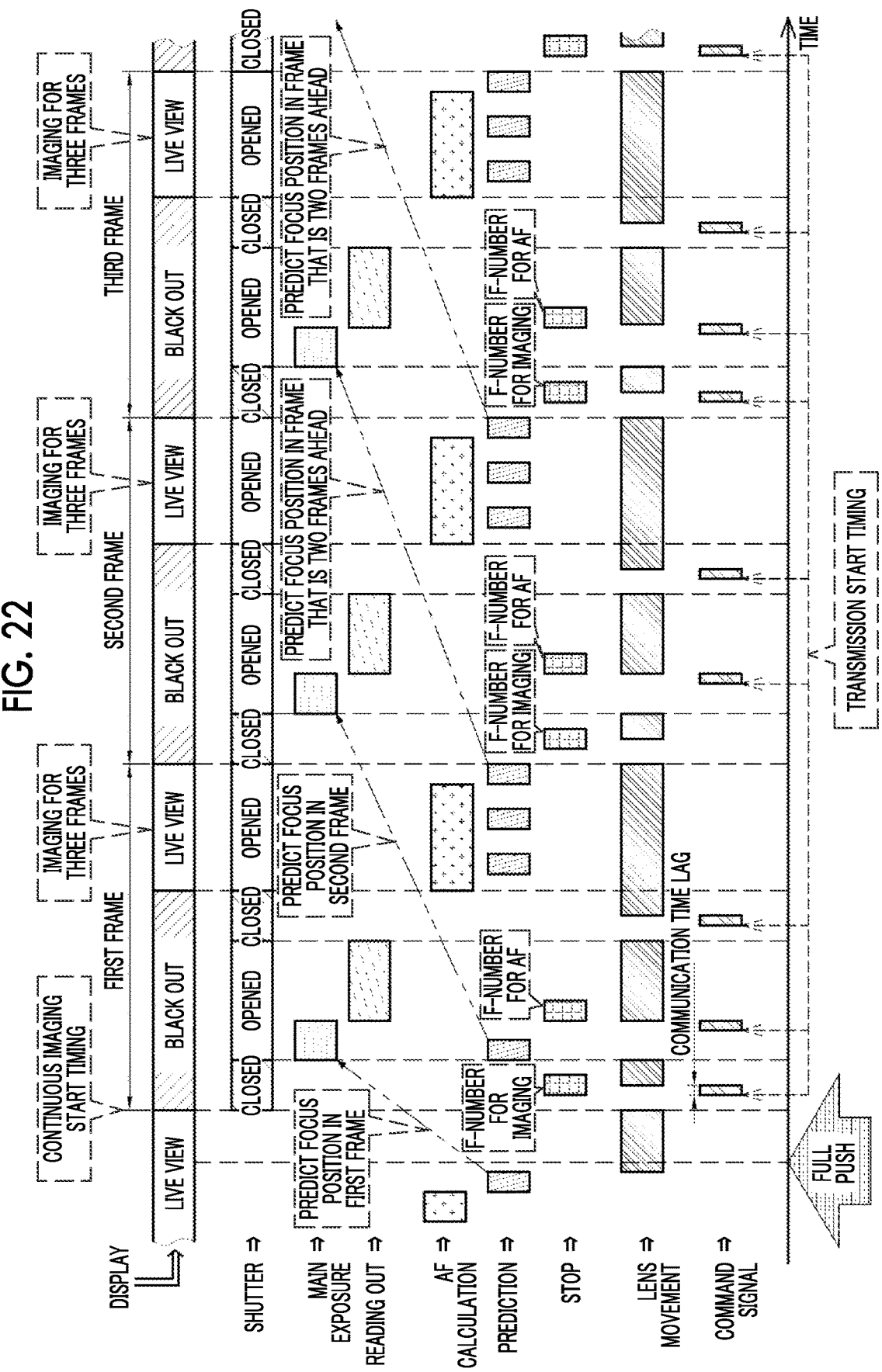
FIG. 22 is a time chart showing a third modification example of the processing content of the focus control processing according to the embodiment.

Then, as shown in FIG. 22 as an example, in a previous stage of the start of the main exposure in the specific frame of the continuous imaging, the control unit 48A3 controls the aperture of the stop 40C to have the first size in accordance with the F-number for imaging in the storage 48B, and in a period from the end of the main exposure period to the start of the imaging for the live view image, the control unit 48A3 controls the aperture of the stop 40C to have the second size in accordance with the F-number for AF in the storage 48B. Here, the specific frame of the continuous imaging is, for example, each frame of the continuous imaging, and the previous stage of the start of the main exposure is, for example, a period in which the mechanical shutter 72 transitions from the fully opened state to the front curtain closed state. In addition, the period from the end of the main exposure period to the start of the imaging for the live view image is, for example, a period for reading out the digital image data. With the present configuration, it is possible to improve an image quality of the image obtained by performing the main exposure as compared with a case in which the aperture of the stop 40C in the imaging period for the live view image is made to be smaller than the aperture of the stop 40C in the main exposure period.

Figure 23:
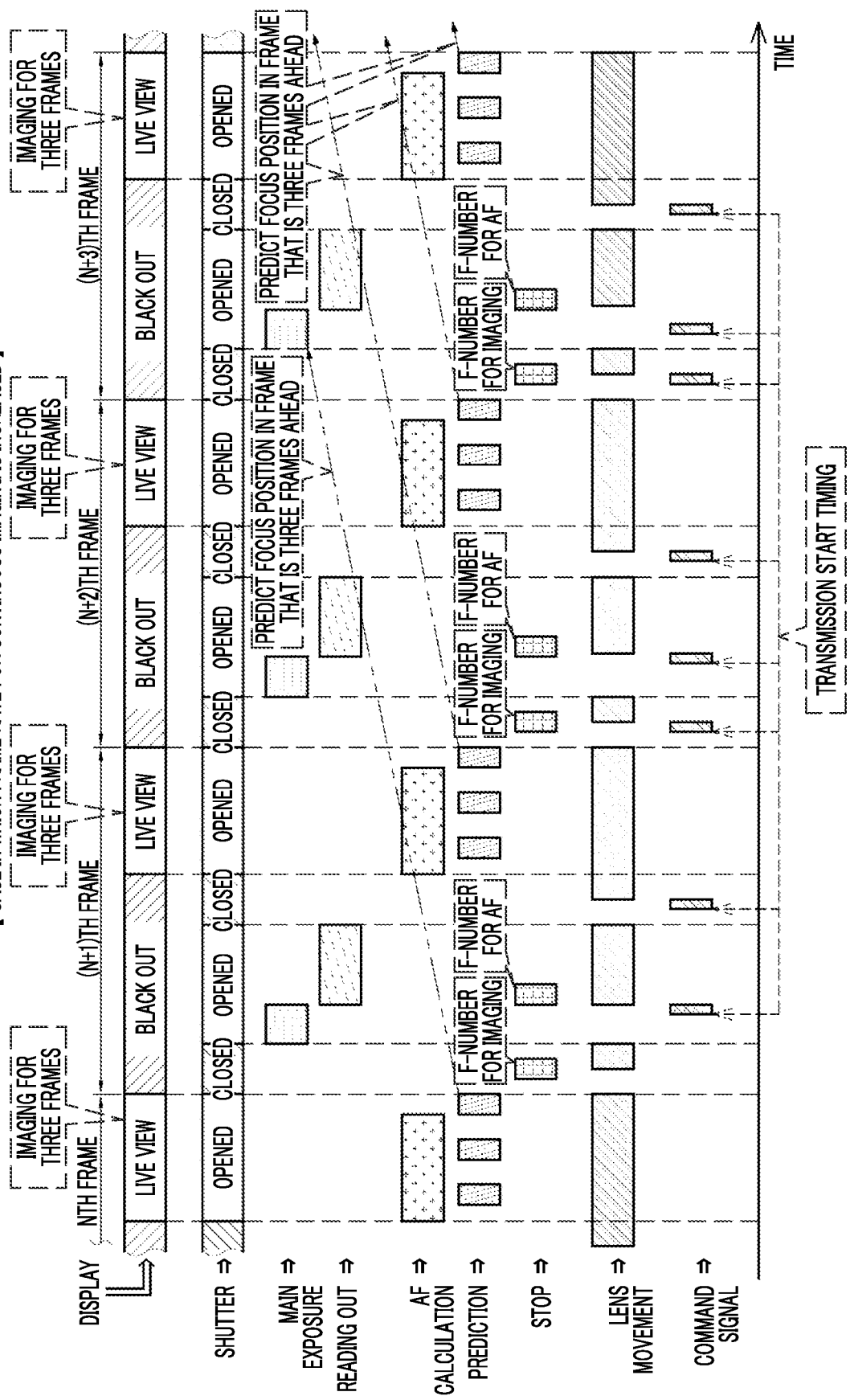
FIG. 23 is a time chart showing a fourth modification example of the processing content of the focus control processing according to the embodiment.

In addition, in the embodiment described above, the form example is described in which the focus position at the main exposure in a frame that is two frames ahead in the continuous imaging is predicted by the focus position prediction unit 48A2, but the technology of the present disclosure is not limited to this. For example, the focus position prediction unit 48A2 may increase the number of frames from the specific frame (for example, each frame of the continuous imaging) to a destination frame in which the focus position is predicted, as the frame rate for the continuous imaging by the image sensor 16 is increased. For example, as shown in FIG. 23, the focus position prediction unit 48A2 may increase the destination frame in which the focus position is predicted from a frame that is two frames ahead to a frame that is three frames ahead, or may increase the destination frame in which the focus position is predicted four or more frames ahead.

In this way, by increasing the number of frames from the specific frame to the destination frame in which the focus position is predicted (for example, increasing from two frames to three frames or more) as the frame rate for the continuous imaging is increased, it is possible to make the focus position of the focus lens 40B follow the focus target region even in a case in which the frame rate for the continuous imaging is increased.

In addition, in the embodiment described above, the form example is described in which the non-phase difference pixel divided region 30N and the phase difference pixel divided region 30P are used in combination, but the technology of the present disclosure is not limited to this. For example, an area sensor may be used in which the phase difference image data and the non-phase difference image data are selectively generated and read out instead of the non-phase difference pixel divided region 30N and the phase difference pixel divided region 30P. In this case, on the area sensor, a plurality of photosensitive pixels are two-dimensionally arranged. For the photosensitive pixels included in the area sensor, for example, a pair of independent photodiodes in which the light shielding member is not provided are used. In a case in which the non-phase difference image data is generated and read out, the photoelectric conversion is performed by the entire region of the photosensitive pixels (pair of photodiodes), and in a case in which the phase difference image data is generated and read out (for example, a case in which passive method distance measurement is performed), the photoelectric conversion is performed by at one photodiode of the pair of photodiodes. Here, one photodiode of the pair of photodiodes is a photodiode corresponding to the first phase difference pixel L described in the above embodiment, and the other photodiode of the pair of photodiodes is a photodiode corresponding to the second phase difference pixel R described in the above embodiment. It should be noted that the phase difference image data and the non-phase difference image data may be selectively generated and read out by all the photosensitive pixels included in the area sensor, but the technology of the present disclosure is not limited to this, and the phase difference image data and the non-phase difference image data may be selectively generated and read out by a part of the photosensitive pixels included in the area sensor.

In addition, in the embodiment described above, the image plane phase difference pixel is described as the phase difference pixel P, but the technology of the present disclosure is not limited to this. For example, the non-phase difference pixels N may be disposed in place of the phase difference pixels P included in the photoelectric conversion element 30, and a phase difference AF plate including a plurality of phase difference pixels P may be provided in the imaging apparatus body 12 separately from the photoelectric conversion element 30. In addition, in the embodiment described above, an AF method using the distance measurement result based on the phase difference image data, that is, the phase difference AF method is described, but the technology of the present disclosure is not limited to this. For example, the contrast AF method may be adopted instead of the phase difference AF method. In addition, the AF method based on the distance measurement result using the parallax of a pair of images obtained from a stereo camera, or the AF method using a TOF method distance measurement result using a laser beam or the like may be adopted.

In addition, in the embodiment described above, the imaging method by the rolling shutter method is described, but the technology of the present disclosure is not limited to this, and an imaging method using a global shutter system may be used.

In addition, in the embodiment described above, the focal plane shutter is described as an example of the mechanical shutter 72, but the technology of the present disclosure is not limited to this, and the technology of the present disclosure is established even in a case in which another type of mechanical shutter, such as a lens shutter, is applied instead of the focal plane shutter.

In addition, in the embodiment described above, the continuous imaging performed in accordance with the frame rate of several fps is described, but the technology of the present disclosure is not limited to this. For example, the technology of the present disclosure can be applied to the continuous imaging performed in accordance with the frame rate of several tens of fps to several hundreds of fps, that is, the imaging for a recording motion picture.

Figure 24:
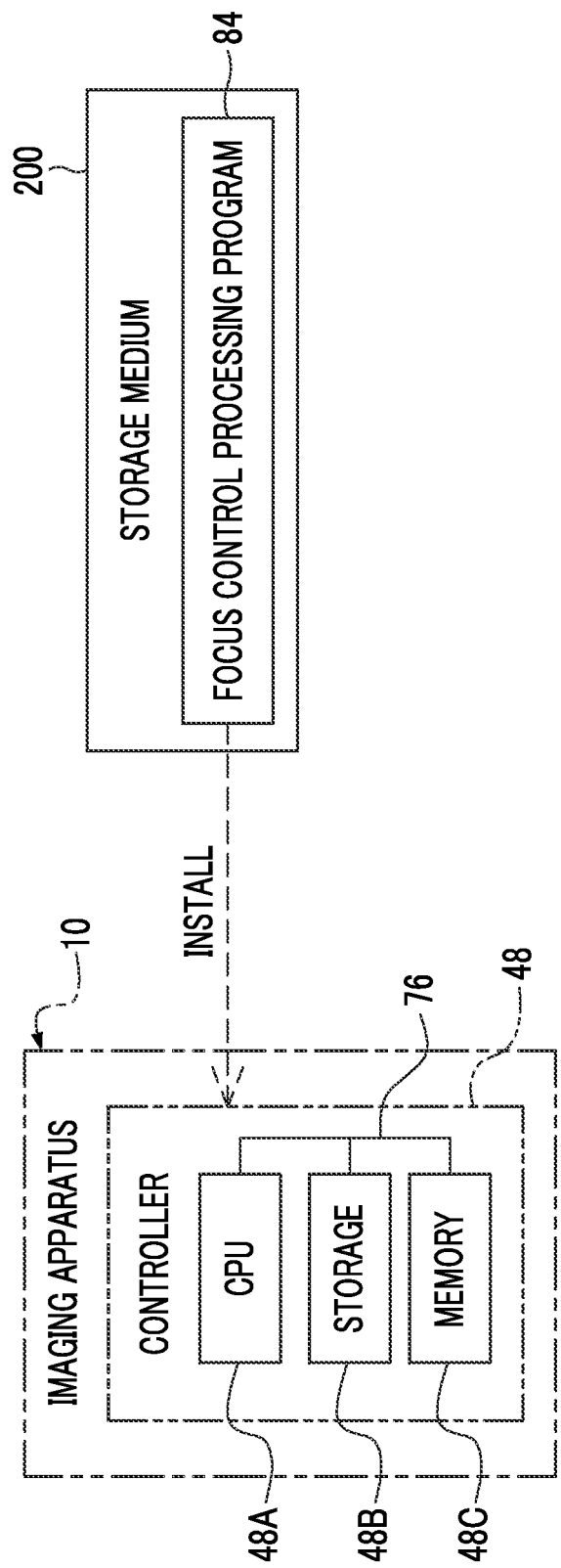
FIG. 24 is a block diagram showing an example of an aspect in which a focus control processing program according to the embodiment is installed in the controller in the imaging apparatus from a storage medium that stores the focus control processing program.

In addition, in the embodiment described above, the form example is described in which the focus control processing program 84 is stored in the storage 48B, but the technology of the present disclosure is not limited to this. For example, as shown in FIG. 24, the focus control processing program 84 may be stored in a storage medium 200. The storage medium 200 is a non-transitory storage medium. Examples of the storage medium 200 include any portable storage medium, such as an SSD or a USB memory.

The focus control processing program 84, which is stored in the storage medium 200, is installed in the controller 48. The CPU 48A performs the focus control processing in accordance with the focus control processing program 84.

In addition, the focus control processing program 84 may be stored in the storage unit of another computer or server device connected to the controller 48 via a communication network (not shown), and the focus control processing program 84 may be downloaded in response to a request of the imaging apparatus 10 to be installed in the controller 48.

It should be noted that it is not required to store the entire focus control processing program 84 in the storage unit or the storage 48B of another computer or server device connected to the controller 48, and a part of the focus control processing program 84 may be stored.

In the example shown in FIG. 24, the aspect example is described in which the controller 48 is built in the imaging apparatus 10, but the technology of the present disclosure is not limited to this, and for example, the controller 48 may be provided outside the imaging apparatus 10.

In the example shown in FIG. 24, the CPU 48A is a single CPU, but may be a plurality of CPUs. In addition, a GPU may be applied instead of the CPU 48A.

In the example shown in FIG. 24, the controller 48 is described, but the technology of the present disclosure is not limited to this, and a device including an ASIC, an FPGA, and/or a PLD may be applied instead of the controller 48. In addition, a hardware configuration and a software configuration may be used in combination, instead of the controller 48.

As a hardware resource for performing the focus control processing described in the embodiment, the following various processors can be used. Examples of the processor include a CPU which is a general-purpose processor functioning as the hardware resource for performing the focus control processing by performing software, that is, a program. In addition, examples of the processor include a dedicated electric circuit which is a processor having a circuit configuration designed to be dedicated to performing specific processing, such as the FPGA, the PLD, or the ASIC. A memory is built in or connected to any processor, and any processor performs the focus control processing by using the memory.

The hardware resource for performing the focus control processing may be composed of one of these various processors, or may be composed of a combination (for example, a combination of a plurality of FPGAs or a combination of a CPU and an FPGA) of two or more processors of the same type or different types. In addition, the hardware resource for performing the focus control processing may be one processor.

As a configuring example of one processor, first, there is a form in which one processor is composed of a combination of one or more CPUs and software and the processor functions as the hardware resource for performing the focus control processing. Secondly, as represented by SoC, there is a form in which a processor that realizes the functions of the entire system including a plurality of hardware resources for performing the focus control processing with one IC chip is used. As described above, the focus control processing is realized by using one or more of the various processors as the hardware resources.

Further, as the hardware structure of these various processors, more specifically, it is possible to use an electric circuit in which circuit elements, such as semiconductor elements, are combined. In addition, the focus control processing described above is merely an example. Therefore, it is needless to say that the deletion of an unneeded step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unneeded parts may be deleted, new elements may be added, or replacements may be made with respect to the description contents and the shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

With respect to the embodiment described above, the following supplementary notes will be further disclosed.

(Supplementary Note 1)

A control device comprising a processor, and a memory built in or connected to the processor, in which the control device is applied to an imaging apparatus in which a focus lens is moved while avoiding a period of main exposure by an image sensor in which light is imaged by an imaging lens including the focus lens in accordance with an instruction of the processor and the main exposure is continuously performed by the image sensor at a predetermined time interval to perform continuous imaging, and the processor calculates a first focus position of the focus lens with respect to a specific subject in a specific frame in which the main exposure is performed in a continuous imaging period, predicts a second focus position of the focus lens with respect to the specific subject in a frame ahead of the specific frame by a plurality of frames with reference to the first focus position in the continuous imaging period, and moves the focus lens toward the second focus position.

(Supplementary Note 2)

The control device according to Supplementary Note 1, in which the specific frame is each frame in which the main exposure is performed.

(Supplementary Note 3)

The control device according to Supplementary Note 1 or 2, in which the processor predicts the second focus position in a frame ahead of the specific frame by two or more frames with reference to the first focus position.

(Supplementary Note 4)

The control device according to Supplementary Note 3, in which the processor predicts the second focus position in a frame ahead of the specific frame by two frames with reference to the first focus position.

(Supplementary Note 5)

The control device according to Supplementary Note 3, in which the processor predicts the second focus position in a frame ahead of the specific frame by three or more frames with reference to the first focus position.

(Supplementary Note 6)

The control device according to any one of Supplementary Notes 3 to 5, in which the processor predicts the second focus position for each frame in which the main exposure is performed.

(Supplementary Note 7)

The control device according to any one of Supplementary Notes 1 to 6, in which the processor moves the focus lens toward a predicted latest second focus position.

(Supplementary Note 8)

The control device according to Supplementary Note 1 or 2, in which the processor increases the number of frames from the specific frame to a destination frame in which the second focus position is predicted, as a frame rate for the continuous imaging by the image sensor is increased.

(Supplementary Note 9)

The control device according to any one of Supplementary Notes 1 to 8, in which the processor predicts the second focus position with reference to the first focus position for a plurality of frames.

(Supplementary Note 10)

The control device according to Supplementary Note 9, in which the processor predicts the second focus position with reference to a plurality of the first focus positions including the first focus position obtained by calculation in a latest frame in which a latest main exposure is performed and the first focus position obtained by calculation in a past frame temporally adjacent to the latest frame.

(Supplementary Note 11)

The control device according to any one of Supplementary Notes 1 to 10, in which the processor causes the image sensor to perform imaging for a live view image in a continuous imaging interval.

(Supplementary Note 12)

The control device according to Supplementary Note 11, in which the processor calculates the first focus position within an imaging period for the live view image based on image data obtained by imaging by the image sensor in the imaging period.

(Supplementary Note 13)

The control device according to Supplementary Note 12, in which the processor uses the imaging period to move the focus lens.

(Supplementary Note 14)

The control device according to Supplementary Note 13, in which the processor controls a stop with an aperture having a variable size to set the aperture in the period in which the main exposure is performed to have a first size and to set the aperture in the imaging period to have a second size larger than the first size.

(Supplementary Note 15)

The control device according to any one of Supplementary Notes 11 to 14, in which the processor causes the image sensor to perform the imaging for the live view image for a plurality of frames in the continuous imaging interval, and calculates the first focus position each time the image sensor is caused to perform the imaging for the live view image.

(Supplementary Note 16)

The control device according to any one of Supplementary Notes 1 to 15, in which the image sensor includes a phase difference pixel group, and the processor calculates the first focus position based on phase difference pixel data obtained by imaging with the phase difference pixel group.

(Supplementary Note 17)

The control device according to any one of Supplementary Notes 1 to 16, in which the processor moves the focus lens while avoiding a winding period required for winding a mechanical shutter.

(Supplementary Note 18)

The control device according to Supplementary Note 17, in which the processor transmits a command signal for instructing the imaging lens including the focus lens to move the focus lens, and the processor transmits the command signal to the imaging lens earlier than end of the winding by a communication time lag with the imaging lens.

(Supplementary Note 19)

The control device according to any one of Supplementary Notes 1 to 18, in which, before the focus lens reaches the second focus position, in a case in which a start timing of the main exposure arrives, the processor stops the focus lens and causes the image sensor to start the main exposure.

(Supplementary Note 20)

The control device according to any one of Supplementary Notes 1 to 19, in which the processor predicts a third focus position of the focus lens with respect to the specific subject in a first frame of the continuous imaging in a previous stage of start of the continuous imaging by the image sensor, and moves the focus lens toward the third focus position before the main exposure of the first frame is started.

(Supplementary Note 21)

The control device according to Supplementary Note 20, in which, in a case in which a start timing of the main exposure of the first frame arrives before the focus lens reaches the third focus position, the processor stops the focus lens and causes the image sensor to start the main exposure.

(Supplementary Note 22)

The control device according to any one of Supplementary Notes 1 to 21, in which the processor predicts a fourth focus position of the focus lens with respect to the specific subject in a second frame of the continuous imaging in a previous stage of start of the continuous imaging by the image sensor or while the main exposure of a first frame of the continuous imaging is performed, and moves the focus lens toward the fourth focus position before the main exposure of the second frame is started.

(Supplementary Note 23)

The control device according to Supplementary Note 22, in which, in a case in which a start timing of the main exposure of the second frame arrives before the focus lens reaches the fourth focus position, the processor stops the focus lens and causes the image sensor to start the main exposure.

EXPLANATION OF REFERENCES

10: imaging apparatus
12: imaging apparatus body
14: interchangeable lens
16: image sensor
18: release button
20: dial
22: touch panel display 24: instruction key
26: display
28: touch panel
30: photoelectric conversion element
30A: light-receiving surface
30N: non-phase difference pixel divided region
30P: phase difference pixel divided region
32A: phase difference pixel line
32B: non-phase difference pixel line
34A: light shielding member
34B: light shielding member
36: microlens
38L: left region passing light
38R: right region passing light
40: imaging lens
40A: objective lens
40B: focus lens
40C: stop
42: slide mechanism
44: motor
46: motor
48: controller
48A1: focus position calculation unit
48A2: focus position prediction unit
48A3: control unit
48B: storage
48C: memory
50: image memory
52: UI system device
54: external I/F
56: photoelectric conversion element driver
58: motor driver
60: motor driver
62: front curtain solenoid driver
64: rear curtain solenoid driver
66: front curtain solenoid actuator
68: rear curtain solenoid actuator
70: input/output interface
72: mechanical shutter
72A: frame
72A1: aperture
72B: front curtain
72C: rear curtain
74: signal processing circuit
74A: non-phase difference image data processing circuit
74B: phase difference image data processing circuit
76: bus
80: reception device
82: hard key unit
84: focus control processing program
200: storage medium
a: deviation amount
A: broken line arrow
B: broken line arrow
L: phase difference pixel
N: non-phase difference pixel
OA: optical axis
P: phase difference pixel
PD: photodiode
R: phase difference pixel

What is claimed is:

1. An imaging apparatus comprising:
a processor; and
an image sensor in which light is imaged by an imaging lens including a focus lens,
wherein the focus lens is moved while avoiding a period of main exposure by the image sensor in accordance with an instruction of the processor and the main exposure is continuously performed by the image sensor at a predetermined time interval to perform continuous imaging, and
the processor
calculates a first focus position of the focus lens with respect to a specific subject in a specific frame in which the main exposure is performed in a continuous imaging period,
predicts a second focus position of the focus lens with respect to the specific subject in a frame ahead of the specific frame by a plurality of frames with reference to the first focus position in the continuous imaging period, and
moves the focus lens toward the second focus position.

2. The imaging apparatus according to claim 1, wherein the specific frame is each frame in which the main exposure is performed.

3. The imaging apparatus according to claim 1, wherein the processor predicts the second focus position in a frame ahead of the specific frame by two or more frames with reference to the first focus position.

4. The imaging apparatus according to claim 3, wherein the processor predicts the second focus position in a frame ahead of the specific frame by two frames with reference to the first focus position.

5. The imaging apparatus according to claim 3, wherein the processor predicts the second focus position in a frame ahead of the specific frame by three or more frames with reference to the first focus position.

6. The imaging apparatus according to claim 3, wherein the processor predicts the second focus position for each frame in which the main exposure is performed.

7. The imaging apparatus according to claim 1, wherein the processor moves the focus lens toward a predicted latest second focus position.

8. The imaging apparatus according to claim 1, wherein the processor increases the number of frames from the specific frame to a destination frame in which the second focus position is predicted, as a frame rate for the continuous imaging by the image sensor is increased.

9. The imaging apparatus according to claim 1, wherein the processor predicts the second focus position with reference to the first focus position for a plurality of frames.

10. The imaging apparatus according to claim 9, wherein the processor predicts the second focus position with reference to a plurality of the first focus positions including the first focus position obtained by calculation in a latest frame in which a latest main exposure is performed and the first focus position obtained by calculation in a past frame temporally adjacent to the latest frame.

11. The imaging apparatus according to claim 1, wherein the processor causes the image sensor to perform imaging for a live view image in a continuous imaging interval.

12. The imaging apparatus according to claim 11, wherein the processor calculates the first focus position within an imaging period for the live view image based on image data obtained by imaging by the image sensor in the imaging period.

13. The imaging apparatus according to claim 12, wherein the processor uses the imaging period to move the focus lens.

14. The imaging apparatus according to claim 13, further comprising:
a stop with an aperture having a variable size,
wherein the processor controls the stop to set the aperture in the period in which the main exposure is performed to have a first size and to set the aperture in the imaging period to have a second size larger than the first size.

15. The imaging apparatus according to claim 11, wherein the processor
causes the image sensor to perform the imaging for the live view image for a plurality of frames in the continuous imaging interval, and
calculates the first focus position each time the image sensor is caused to perform the imaging for the live view image.

16. The imaging apparatus according to claim 1,
wherein the image sensor includes a phase difference pixel group, and
the processor calculates the first focus position based on phase difference pixel data obtained by imaging with the phase difference pixel group.

17. The imaging apparatus according to claim 1, further comprising:
a mechanical shutter,
wherein the processor moves the focus lens while avoiding a winding period required for winding the mechanical shutter.

18. The imaging apparatus according to claim 17, wherein the processor
transmits a command signal for instructing the imaging lens including the focus lens to move the focus lens, and
transmits the command signal to the imaging lens earlier than end of the winding by a communication time lag with the imaging lens.

19. The imaging apparatus according to claim 1,
wherein, in a case in which a start timing of the main exposure arrives before the focus lens reaches the second focus position, the processor stops the focus lens and causes the image sensor to start the main exposure.

20. The imaging apparatus according to claim 1, wherein the processor
predicts a third focus position of the focus lens with respect to the specific subject in a first frame of the continuous imaging in a previous stage of start of the continuous imaging by the image sensor, and
moves the focus lens toward the third focus position before the main exposure of the first frame is started.

21. The imaging apparatus according to claim 20,
wherein, in a case in which a start timing of the main exposure of the first frame arrives before the focus lens reaches the third focus position, the processor stops the focus lens and causes the image sensor to start the main exposure.

22. The imaging apparatus according to claim 1, wherein the processor
predicts a fourth focus position of the focus lens with respect to the specific subject in a second frame of the continuous imaging in a previous stage of start of the continuous imaging by the image sensor or while the main exposure of a first frame of the continuous imaging is performed, and
moves the focus lens toward the fourth focus position before the main exposure of the second frame is started.

23. The imaging apparatus according to claim 22,
wherein, in a case in which a start timing of the main exposure of the second frame arrives before the focus lens reaches the fourth focus position, the processor stops the focus lens and causes the image sensor to start the main exposure.

24. A control device comprising:
a processor; and
a memory built in or connected to the processor,
wherein the control device is applied to an imaging apparatus in which a focus lens is moved while avoiding a period of main exposure by an image sensor in which light is imaged by an imaging lens including the focus lens in accordance with an instruction of the processor and the main exposure is continuously performed by the image sensor at a predetermined time interval to perform continuous imaging, and
the processor
calculates a first focus position of the focus lens with respect to a specific subject in a specific frame in which the main exposure is performed in a continuous imaging period,
predicts a second focus position of the focus lens with respect to the specific subject in a frame ahead of the specific frame by a plurality of frames with reference to the first focus position in the continuous imaging period, and
moves the focus lens toward the second focus position.

25. An operation method of an imaging apparatus including a processor, and an image sensor in which light is imaged by an imaging lens including a focus lens, in which the focus lens is moved while avoiding a period of main exposure by the image sensor in accordance with an instruction of the processor and the main exposure is continuously performed by the image sensor at a predetermined time interval to perform continuous imaging, the method comprising:
calculating a first focus position of the focus lens with respect to a specific subject in a specific frame in which the main exposure is performed in a continuous imaging period;
predicting a second focus position of the focus lens with respect to the specific subject in a frame ahead of the specific frame by a plurality of frames with reference to the first focus position in the continuous imaging period; and
moving the focus lens toward the second focus position.

26. A non-transitory computer recording medium storing a program causing a computer applied to an imaging apparatus including a processor, and an image sensor in which light is imaged by an imaging lens including a focus lens, in which the focus lens is moved while avoiding a period of main exposure by the image sensor in accordance with an instruction of the processor and the main exposure is continuously performed by the image sensor at a predetermined time interval to perform continuous imaging, the program causing the computer to perform a process comprising:
calculating a first focus position of the focus lens with respect to a specific subject in a specific frame in which the main exposure is performed in a continuous imaging period;
predicting a second focus position of the focus lens with respect to the specific subject in a frame ahead of the specific frame by a plurality of frames with reference to the first focus position in the continuous imaging period; and
moving the focus lens toward the second focus position.

* * * * *